US011125961B2

(12) United States Patent
Takeuchi et al.

(10) Patent No.: US 11,125,961 B2
(45) Date of Patent: Sep. 21, 2021

(54) OPTICAL FIBER DISTRIBUTION SYSTEM

(71) Applicant: Go!Foton Holdings, Inc., Somerset, NJ (US)

(72) Inventors: Kenichiro Takeuchi, North Brunswick, NJ (US); David Zhi Chen, Dallas, TX (US); Alla Shtabnaya, Hillsborough, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 16/564,045

(22) Filed: Sep. 9, 2019

(65) Prior Publication Data
US 2020/0081216 A1 Mar. 12, 2020

Related U.S. Application Data

(60) Provisional application No. 62/812,330, filed on Mar. 1, 2019, provisional application No. 62/728,190, filed on Sep. 7, 2018.

(51) Int. Cl.
*G02B 6/00* (2006.01)
*G02B 6/44* (2006.01)

(52) U.S. Cl.
CPC .......... *G02B 6/4455* (2013.01); *G02B 6/445* (2013.01); *G02B 6/4452* (2013.01)

(58) Field of Classification Search
CPC .... G02B 6/4455; G02B 6/445; G02B 6/4452; G02B 6/483; G02B 6/4444; G02B 6/3825
See application file for complete search history.

(56) References Cited

U.S. PATENT DOCUMENTS

| 4,428,645 | A | * | 1/1984 | Korbelak | G02B 6/4457 156/502 |
| 5,402,515 | A | | 3/1995 | Vidacovich et al. | |
| 5,790,741 | A | * | 8/1998 | Vincent | G02B 6/4446 385/135 |
| 5,946,440 | A | | 8/1999 | Puetz | |
| 6,263,141 | B1 | | 7/2001 | Smith | |

(Continued)

OTHER PUBLICATIONS

International Search Report including Written Opinion for Application No. PCT/US2019/050199, dated Jan. 6, 2020, 18 pages.

*Primary Examiner* — Ellen E Kim
(74) *Attorney, Agent, or Firm* — Lerner, David, Littenberg, Krumholz & Mentlik, LLP

(57) ABSTRACT

An optical fiber distribution system may include a housing that includes an end cap unit, a main cabinet unit, and a fiber termination unit. The main cabinet unit may have a door that opens to provide access to the interior of the main cabinet unit, which may include a plurality of cassettes in a stacked arrangement within the main cabinet unit. The cassettes may be rotatably coupled to a cassette support so that, when the door is open, the cassettes may be individually rotated at least partially out of the main cabinet unit to provide access to the cassettes for maintenance. The fiber distribution system may be mountable to a strand so that the system hangs in a suspended state, and a plurality of the main cabinet units may be coupled to one another in a cascading fashion to provide increased cassette capacity.

29 Claims, 58 Drawing Sheets

(56) References Cited

U.S. PATENT DOCUMENTS

| | | | |
|---|---|---|---|
| 6,402,539 B1* | 6/2002 | Toth | H01R 13/443 439/138 |
| 6,766,094 B2* | 7/2004 | Smith | G02B 6/445 385/135 |
| 7,186,929 B2 | 3/2007 | Cox et al. | |
| 7,333,706 B2* | 2/2008 | Parikh | G02B 6/4442 385/134 |
| 7,442,884 B2 | 10/2008 | Ball et al. | |
| 7,660,508 B2* | 2/2010 | Mures | G02B 6/445 385/135 |
| 7,697,812 B2 | 4/2010 | Parikh et al. | |
| 7,738,759 B2 | 6/2010 | Parikh et al. | |
| 8,009,954 B2* | 8/2011 | Bran de Leon | G02B 6/4454 385/135 |
| 8,073,302 B2 | 12/2011 | Allen et al. | |
| 8,111,966 B2* | 2/2012 | Holmberg | G02B 6/4455 385/135 |
| 8,184,939 B2 | 5/2012 | Parikh et al. | |
| 8,467,651 B2* | 6/2013 | Cao | G02B 6/445 385/135 |
| 8,755,663 B2 | 6/2014 | Makrides-Saravanos et al. | |
| 8,798,427 B2 | 8/2014 | Cox et al. | |
| 8,873,924 B2 | 10/2014 | Wei et al. | |
| 8,879,882 B2* | 11/2014 | Conner | G02B 6/4471 385/135 |
| 8,879,883 B2 | 11/2014 | Parikh et al. | |
| 9,323,020 B2 | 4/2016 | Cao et al. | |
| 9,395,506 B2 | 7/2016 | Simmons | |
| 9,494,760 B2 | 11/2016 | Simmons et al. | |
| 9,513,451 B2 | 12/2016 | Corbille et al. | |
| 9,535,226 B2 | 1/2017 | Simmons | |
| 9,864,156 B1 | 1/2018 | Menguy | |
| 9,939,602 B2* | 4/2018 | Allen | G02B 6/483 |
| 10,012,814 B2* | 7/2018 | Hill | G02B 6/4442 |
| 2005/0175307 A1* | 8/2005 | Battey | G02B 6/3897 385/135 |
| 2005/0213921 A1 | 9/2005 | Mertesdorf et al. | |
| 2011/0123165 A1 | 5/2011 | Barth et al. | |
| 2011/0211799 A1 | 9/2011 | Conner et al. | |
| 2013/0034333 A1* | 2/2013 | Holmberg | G02B 6/4441 385/135 |
| 2013/0236141 A1* | 9/2013 | Yamauchi | G02B 6/444 385/75 |
| 2014/0354131 A1 | 12/2014 | Takeuchi et al. | |
| 2014/0355217 A1 | 12/2014 | Takeuchi et al. | |
| 2014/0357118 A1 | 12/2014 | Takeuchi et al. | |
| 2015/0253528 A1* | 9/2015 | Corbille | G02B 6/4452 385/135 |
| 2015/0357809 A1* | 12/2015 | Coenegracht | H02G 3/088 277/616 |
| 2016/0033056 A1* | 2/2016 | Bishop | F16L 3/1075 385/135 |
| 2016/0047999 A1 | 2/2016 | Alexi et al. | |
| 2018/0335595 A1* | 11/2018 | Takeuchi | G02B 6/445 |

\* cited by examiner

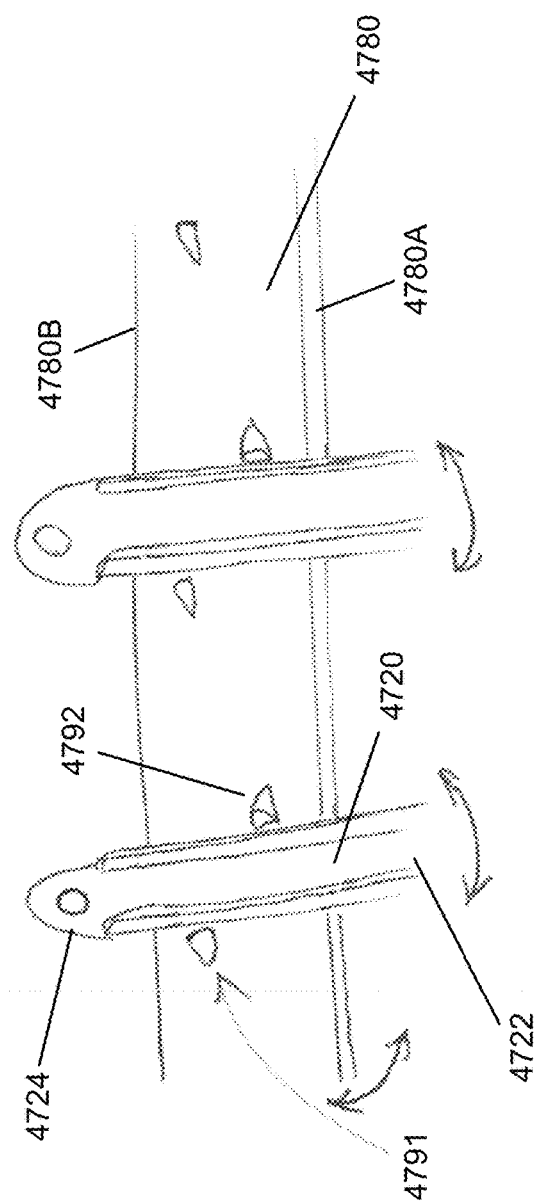
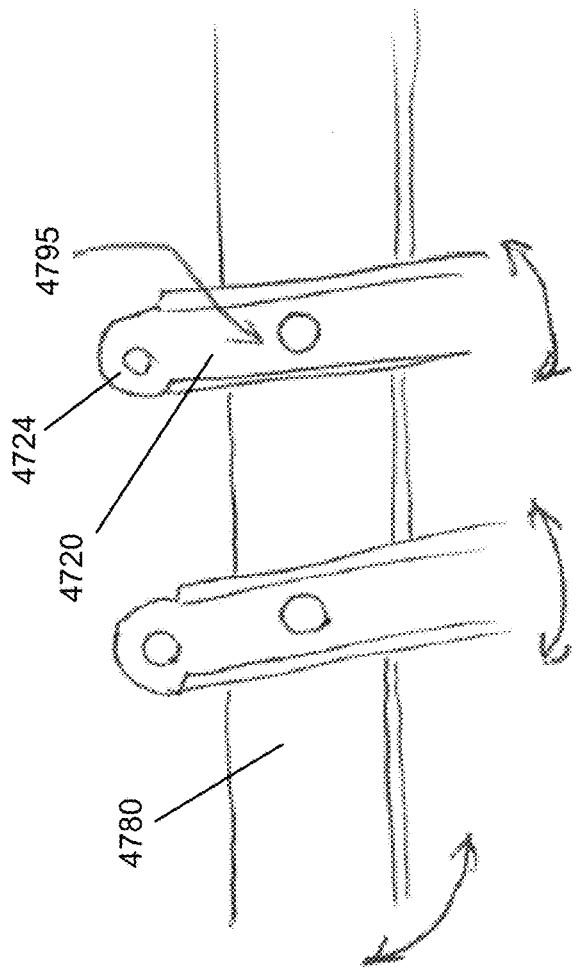

OPTICAL FIBER DISTRIBUTION SYSTEM

CROSS-REFERENCE TO RELATED APPLICATIONS

The present application claims the benefit of the filing date of U.S. Provisional Patent Application Nos. 62/812,330, filed Mar. 1, 2019 and 62/728,190, filed Sep. 7, 2018, the disclosure of which is hereby incorporated herein by reference.

BACKGROUND OF THE DISCLOSURE

The present disclosure generally relates to a device and a system for routing and managing cables coupled to communication connectors, adapters, and/or ports.

In communications cabinets and racks, a multitude of cables are interconnected to one another through connectors, e.g., adapters. A cable organization unit typically has a tray or a shelf or a similar platform, which supports the connectors. Examples of cable organization units include patch panels.

A patch panel houses cable connectors and in the majority of cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

There is a continuing need for new devices and systems to facilitate storing and accessing communication adapters and/or cables supported by communication patching devices and systems.

BRIEF SUMMARY

According to one embodiment of the disclosure, an optical fiber distribution system may include a housing having at least one main cabinet unit and at least one hanging element configured to engage a strand to suspend the housing from the strand. A door may be coupled to the at least one main cabinet unit and have a closed condition in which an inside of the at least one main cabinet unit is substantially unexposed, and an open condition in which the inside of the at least one main cabinet unit is exposed. A plurality of cassettes may be positioned within the at least one main cabinet unit in a stacked arrangement. A cassette support may be inside the at least one main cabinet unit and may be coupled to the at least one main cabinet unit, the cassette support extending along a first support axis. The plurality of cassettes may be rotatably coupled to the cassette support so that, when the door is in the open condition, each of the plurality of cassettes is individually rotatable about the first support axis to a position at least partially outside of the at least one main cabinet unit. The system may include a sealing member configured to create a seal between the door and the at least one main cabinet unit by interfacing with a surface of the door and a surface of the at least one main cabinet unit when the door is in the closed condition. The housing may be tubular with a transverse cross-section that is generally oval-shaped or generally circular. The plurality of cassettes may include a plurality of patch panel cassettes and at least one storage cassette. Each of the plurality of patch panel cassettes may include a plurality of adapters for receiving cables therein, each of the adapters configured to extend along an adapter axis that is obliquely angled with respect to a longitudinal center axis of the housing when the plurality of patch panel cassettes is within the inside of the main cabinet unit and the door is in the closed condition. The plurality of adapters may be pivotably coupled to trays of corresponding patch panel cassettes. A given tray of a corresponding patch panel cassette may include a plurality of extension members. Each adapter coupled to the tray may be mounted to a respective extension member, and each extension member may have a fixed end hingedly coupled to the tray. The fixed ends of the plurality of extension members may be aligned along a width of the tray. The tray may further include a guide bar coupled to each of the extension members and configured to translate in a width direction of the tray. Translation of the guide bar may cause each extension member to pivot about its respective fixed end. The plurality of extension members may have a storage condition in which the adapters do not extend over an edge of the tray, and an access condition in which the adapters extend over the edge of the tray. The main cabinet unit may include a plurality of splitters positioned therein, each of the splitters extending along a splitter axis between a front face and a rear face. The splitter axis may be obliquely angled relative to a longitudinal center axis of the housing. The splitters may be positioned transversely adjacent to the plurality of cassettes and the cassette support. The door may include an interior surface that confronts the inside of the at least one main cabinet unit when the door is in the closed condition, the interior surface of the door including a cable guide configured to support cables thereon. The main cabinet unit may include a plurality of splitters positioned therein. The splitters may be positioned transversely adjacent to the plurality of cassettes and the cassette support. The cable guide may be configured to support cables extending from each of the plurality of cassettes and the splitters. The interior surface of the door may include a plurality of cable guides aligned longitudinally and in parallel to one another. A first one of the cable guides may be adapted to receive a cable from the splitters. A second one of the cable guides may be adapted to receive a cable from the plurality of cassettes. The cassette support may include a plurality of cylindrical members spaced apart from one another along the first support axis, and each of the cassettes may include a tray having an arcuate recess configured to receive a corresponding one of the cylindrical members therein. The cassette support may include a plurality of intermediate members spaced apart from one another along the first support axis, each of the cylindrical members being positioned between a pair of adjacent intermediate members, the intermediate members having a diameter that is larger than a diameter of the cylindrical members. The cassette support may include a cylindrical bar member extending along the first support axis, and a plurality of platforms rotatably coupled to the cylindrical bar at spaced apart locations along the first support axis, each of the platforms including a cylindrical member extending along a second support axis parallel to the first support axis and spaced apart from the first support axis. Each of the cassettes may include a tray having an arcuate recess configured to receive a corresponding one of the cylindrical members therein so that each of the cassettes is rotatable about both the first and second support axes. Each of the cylindrical members may terminate in an enlarged member having a diameter that is greater than a diameter of the cylindrical member. The at least one main cabinet unit may include a main body portion that is substantially "C"-shaped in transverse cross-section, and the door is substantially "C"-shaped in transverse cross-section. A first end of the door may be hingedly coupled to a first end of the main body portion, and a second end of the door may be adapted to be fastened to a second end of the main body portion. In the open condition of the door, substantially an entire height dimension of the main body portion may extend from the first end of the main body portion and the second end of the main body portion is exposed.

According to another embodiment of the disclosure, a main cabinet unit for use in an optical fiber distribution system may include a door that may be coupled to the main cabinet unit and may have a closed condition in which an inside of the main cabinet unit is substantially unexposed, and an open condition in which the inside of the main cabinet unit is exposed. A plurality of cassettes may be positioned within the main cabinet unit in a stacked arrangement, the plurality of cassettes being moveable relative to the main cabinet unit so that, when the door is in the open condition, each of the plurality of cassettes is individually moveable to a position at least partially outside of the main cabinet unit. A first terminal end of the main cabinet unit may have a first configuration, and a second terminal end opposite the first terminal end of the main cabin unit may have a second configuration adapted to mate with a structure having a shape and size corresponding to the first configuration. The main cabinet unit may be tubular with a transverse cross-section that is generally oval-shaped or generally circular. The first terminal end may include a peripheral edge having a plurality of arcuate projections and an arcuate first recess positioned between each pair of adjacent ones of the projections, and the second terminal end may include a peripheral rim coupled to an outer surface of a main body of the main cabinet unit by a plurality of ribs, each rib extending substantially orthogonally to the main body and being spaced apart along a circumference of the main body to form a second recess positioned between each pair of adjacent ribs, each of the second recesses having a shape and size that corresponds to a shape and size of each of the projections. The first terminal end may include a continuous peripheral edge having a diameter that is larger than a diameter of a main body of the main cabinet unit, and the second terminal end may include a continuous circumferential rib forming a continuous circumferential recess, the continuous peripheral edge having a size and shape corresponding to a size and shape of the continuous circumferential recess. An optical fiber distribution system may include a first one of the main cabinet units, and a second one of the main cabinet units, wherein the first terminal end of the first main cabinet unit is directly coupled to the second main cabinet unit so that a first central longitudinal axis of the first main cabinet unit substantially coincides with a second central longitudinal axis of the second main cabinet unit. The first main cabinet unit may contain a plurality of cassettes, and the second main cabinet unit contains a plurality of splitters. An aperture between the first and second main cabinets may be provided to permit routing of cables between the plurality of cassettes and the plurality of splitters. A first end of the door may be hingedly coupled to a first end of the main cabinet unit. A second end of the door may be adapted to be fastened to a second end of the main cabinet unit. The main cabinet unit may further include a protrusion extending from one of the first end or the second end, a recess formed in an opposite one of the first end or the second end, the protrusion being adapted to engage the recess to form a seal, a latch hingedly coupled to an outer surface of the main cabinet unit in proximity to an edge of the door, and a groove formed in the outer surface of the main cabinet unit and adapted to receive a free end of the latch. The latch may be configured to lock the door in the closed condition when the free end is engaged to the groove. The protrusion may include a tapered lower portion extending from the first end or second end, and a not-tapered upper portion extending from the lower portion. The recess may include a tapered shallow portion, and a not-tapered deep portion formed in the shallow portion, the tapered portion of the protrusion being adapted to fit into the tapered portion of the recess, and the not-tapered portion of the protrusion being adapted to fit into the not-tapered portion of the recess. A height of the not-tapered portion of the protrusion may be less than a depth of the not-tapered portion of the recess. The main cabinet unit may further include an O-ring positioned in the not-tapered portion of the recess.

According to another embodiment of the disclosure, a cabinet unit for use in an optical fiber distribution system may include a housing having a cavity, a plurality of extension portions contained within the housing, and a support structure. Each extension portion may be adapted to support an adapter for receiving cables aligned lengthwise with the extension portion. The support structure may be formed on an inner surface of the housing. Each extension portion may be mounted to the housing by the support structure and extend away from the inner surface of the housing. The plurality of extension portions may be hingedly coupled to the support structure, and a clearance between two adjacent extension portions of a given support bar may be configured to be adjusted by rotating the adjacent extension portions along their respective hinged connections. The support structure may include a plurality of support bars mounted to the inner surface of the housing in a stacked arrangement. Each extension portion may be hingedly coupled to one of the plurality of support bars. Each of the support bars may include a plurality of apertures at fixed intervals, and each aperture may be configured to receive a corresponding extension portion.

BRIEF DESCRIPTION OF THE DRAWINGS

FIGS. 23C-23D are zoomed perspective views of additional embodiments of arms mounted to a patch panel device.

DETAILED DESCRIPTION

Figure 1A:
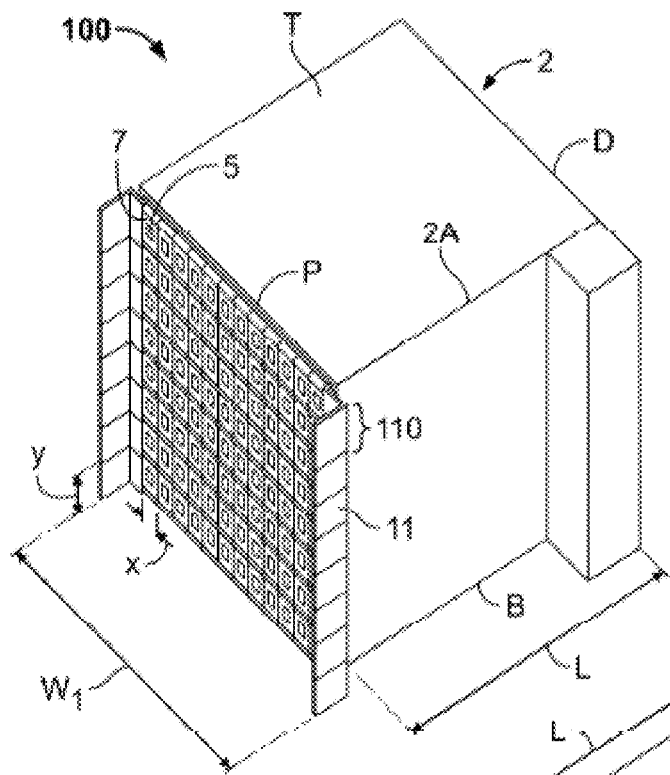
FIG. 1A is a front perspective view of a communication patching system including multiple patch panel devices shown in a first state.

Particular embodiments of the present disclosure are described with reference to the accompanying drawings. In the figures and in the description that follow, in which like reference numerals identify similar or identical elements, the term "proximal" refers to the end of the device that is closest to the operator or user during use, while the term "distal" refers to the end of the device that is farther from the operator or user during use.

Figure 1B:
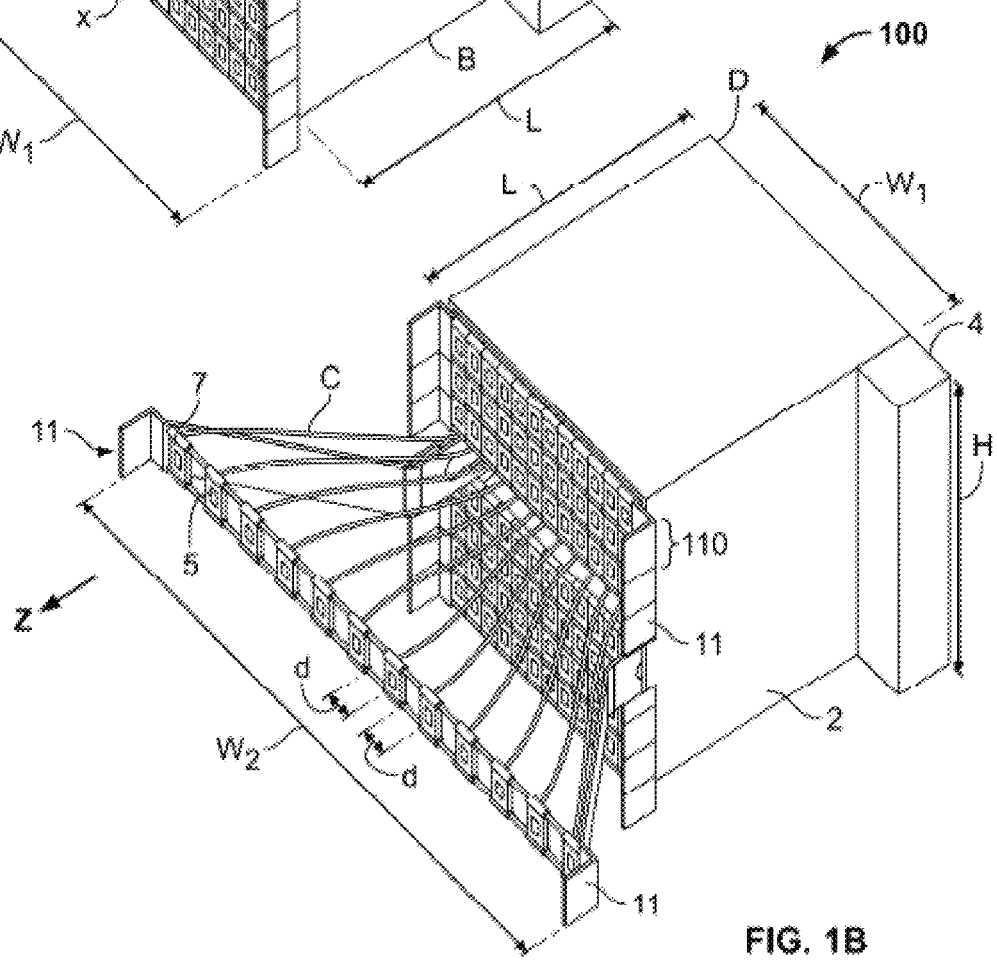
FIG. 1B is the communication patching system of FIG. 1A shown in a second state.
Figure 1C:
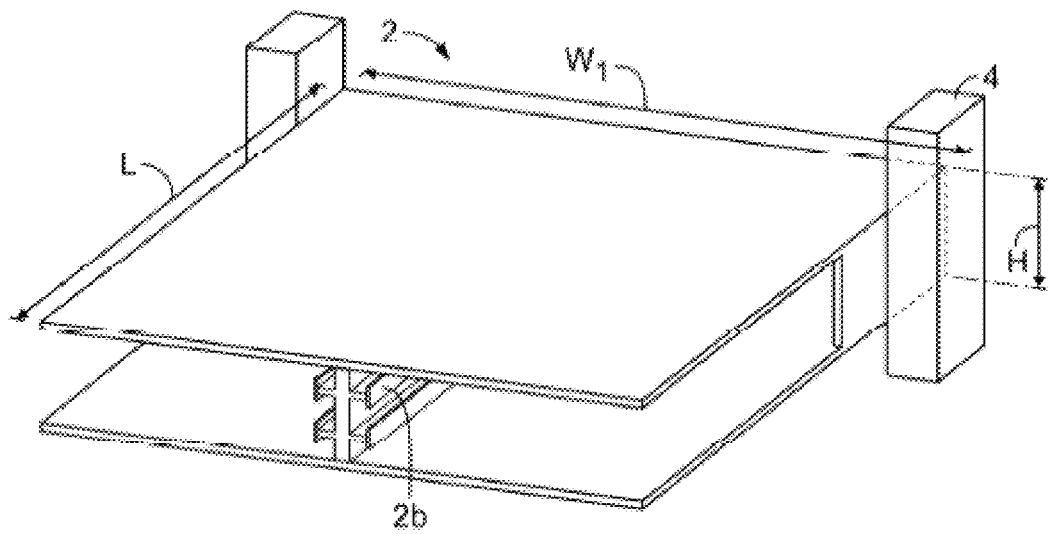
FIG. 1C is a front perspective view of a housing and cable trough, without a patch panel device placed therein.

Now referring to FIGS. 1A-C, a communication system 100 may include a housing 2, e.g., a rack or a cabinet. The housing 2 may define a length L, a height H, and a width W1. The housing 2 may support one or more patch panel devices 110, with each device 110 held in vertical alignment with a guide rail 2b (FIG. 1C), a plurality of which may also be disposed in vertical alignment along at least one side of the housing 2. A cable trough 4 may be positioned adjacent to the housing 2, for example at a proximal corner, a distal corner, or intermediate the proximal and distal corners. The cable trough 4, which may be attached to the frame of the system 100 (which may include, e.g., poles, walls, and other supports), may be configured to receive therein a plurality of cables C extending vertically therethrough. The cable trough 4 may take any suitable form to house and guide cables including, for example, a plurality of guide rings, a groove or other hollow passageway.

Each patch panel device 110 may include a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or in a duplex configuration. The port 7 may include a mounting portion 51 that frames the port 7 and facilitates securing of the port 7, or the receptacle 5, to connection means, e.g., rails 41, 43 (FIG. 2C). In some embodiments, the mounting portion 51 of the port 7 may be integrally formed with the port 7 or may be a separate component coupled to the receptacle 5, and in some embodiments the mounting portion 51 may form a part of a connection means to which the receptacle 5 is connected, as described below.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width W1.

The communication patching system 100 may be transitionable between a first state (FIG. 1A) and a second state (FIG. 1B). In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be disposed proximally in the direction of arrow Z away from the proximal end or face P of the housing 2. As the patch panel device 110 is moved proximally, the ports 7 may be transitioned to be spaced apart from one another by a gap or spacing distance d (FIG. 1B).

Figure 2A:
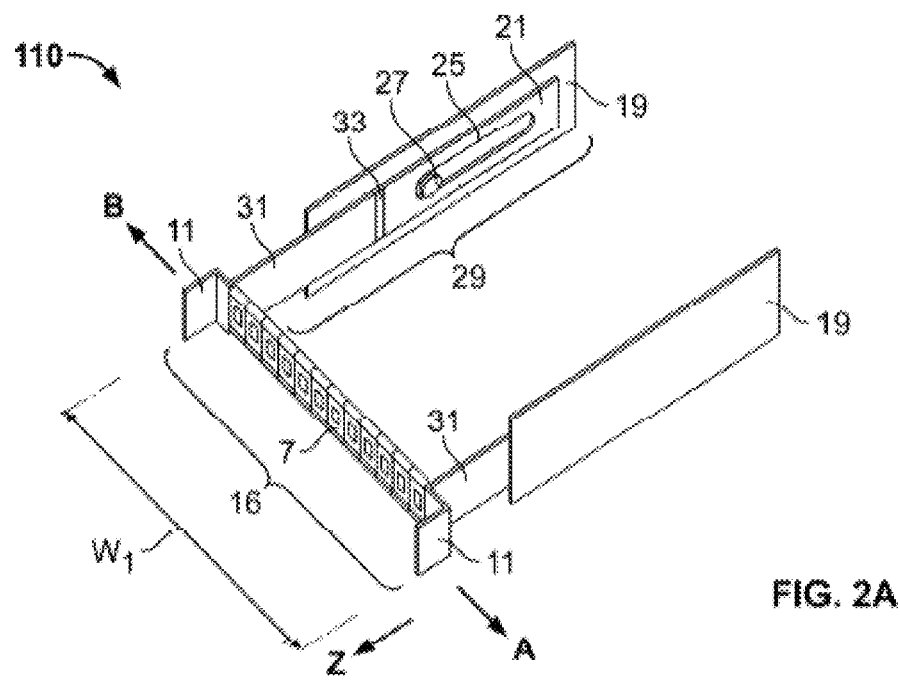
FIG. 2A is one of the patch panel devices of FIG. 1A shown in a first state.
Figure 2B:
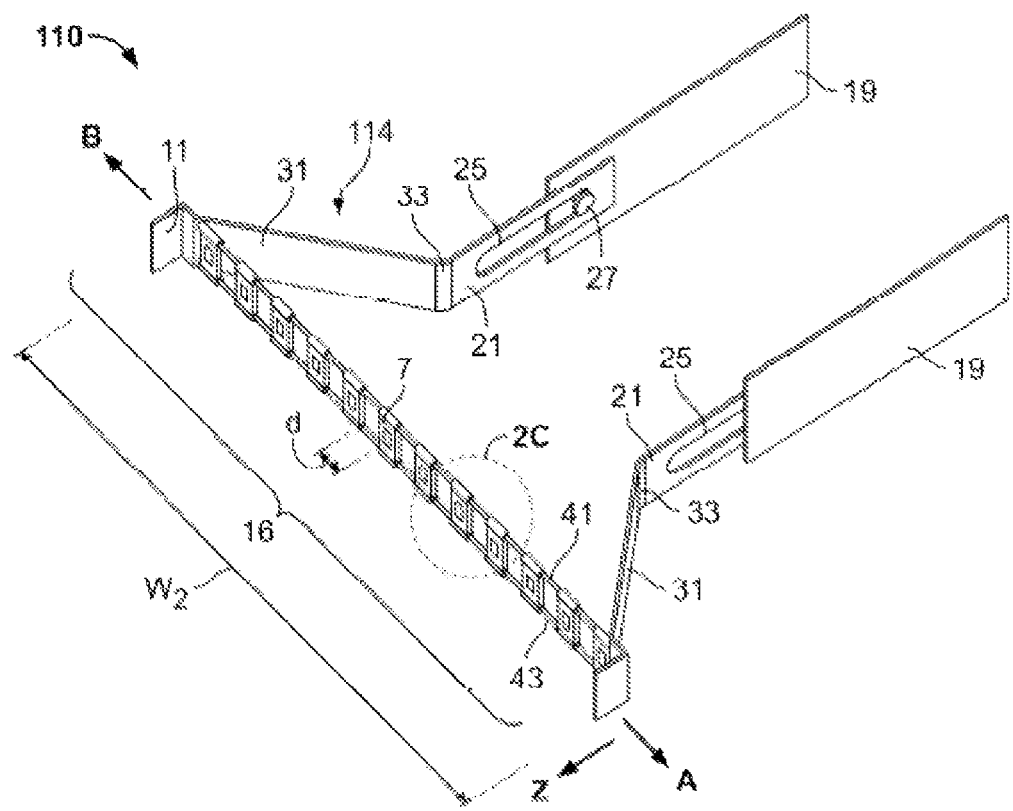
FIG. 2B is the patch panel device of FIG. 2A shown in a second state.
Figure 2C:
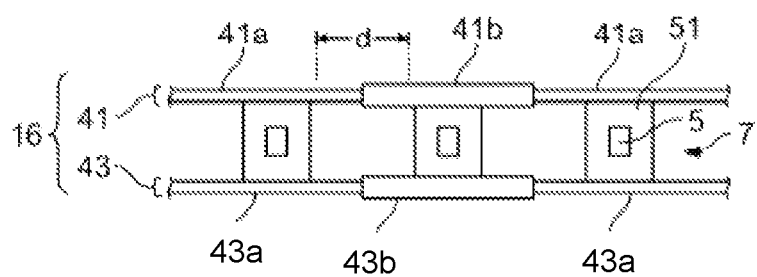
FIG. 2C is an enlarged view of the indicated area of FIG. 2B.

The patch panel device 110 may be transitionable between first and second states, as shown best in FIGS. 2A and 2B respectively. The patch panel device 110 may include bars 19, which facilitate mounting of the patch panel device within the housing 2 by securing one of the bars 19 on each of opposite sides 2a of the housing 2. A hinged arm member 114, which includes a first arm section 21 and a second arm section 31, may be slidably connected to the bar 19. The first arm section 21 may include a slot 25 which is configured and adapted to receive a pin 27 therethrough. The pin 27 may secure the first arm section 21 to the bar 19 while permitting the first arm section 21 to slide relative to the bar 19 along the length of slot 25. The first arm section 21 and the second arm section 31 of the hinged arm 114 may be pivotably connected to one another by a hinge 33, thereby facilitating the rotation of the second arm section 31 relative to the first arm section 21.

The ports 7 may be operably coupled to a connection means 16. As the connection means 16 transitions from a first length equal to width W1 (FIG. 2A) to a second, expanded width W2 (FIG. 2B), the ports 7 may move, or be moveable, to be positioned in a spaced apart relation. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjustment of the gap or spacing distances d between adjacent ports 7 as desired by a user.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 may include alternating sections 41a, 41b and 43a, 43b respectively. Sections 41a, 43a may be configured and adapted to slide within sections 41b, 43b respectively, where the ports 7 may be coupled to the sections 41b, 43b, to effect lengthening or shortening of the connections means 16. A resilient or biasing member (not shown) may be placed within a hollowed out center of each of the rails 41, 43 to bias the connection means 16 to one of the first or second dimensions W1, W2, respectively.

The sections 41b, 43b may define an open circumference such that the ports 7 will not obstruct movement of the alternating sections 41a, 41b and 43a, 43b relative to one another such that the ports 7 may be moved in closer proximity to one another. In addition, the lengths of the alternating sections 41a, 41b and 43a, 43b may be selected to facilitate placement of the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands. A variety of other configurations may be used to effect lateral, angular, or other spacing between ports in a patch panel device to increase access to the ports, such as those described in greater detail in U.S. Patent Publication Nos. 2014/0355217, 2014/0357118, and 2014/0354131, the disclosures of which are hereby incorporated by reference herein.

For example, another embodiment of a patch panel device is described with reference to FIGS. 3A-3D. A patch panel device 210 may include a plurality of attachment members 232 that are positioned adjacent to one another. Each attachment member 232 may include a movable member 246, which is rotatable or pivotable relative to a movable member of another attachment member 232. The movable members 246 of adjacent members 232 may be operatively coupled to one another to permit rotation of one of the movable members 246 relative to the other movable member. In an embodiment, the movable members 246 may be coupled to one another in a snap-fit connection that permits radial movement of the movable members 246 relative to one another. At least two securement members 244 may be secured to opposing ends of the plurality of attachment members 232 and secure the attachment members 232 to a tray 231. In another embodiment, a securement member 244 may be positioned between each of the movable members 246. Each of the movable members 246 may be operatively coupled to one or more cables C1, which are shown only in part. The movable member 246 may include a cable adapter or connector 249, which may include a front surface 249a that may be operatively coupled to one cable C1 and a back surface 249b that may be operatively coupled to another cable C1. The movable member 246 may include a receptacle 247 in which the connector 249 may be releasably secured such that the connector 249 may be separated from the attachment member 232.

The movable members 246 may be positioned spaced a distance from an edge 231a of the tray 231 to permit the movable members 246 to rotate relative to the tray 231. In one embodiment, the tray 231 may include a cut-out (not shown) at the movable members 246 to facilitate a range of movement of the movable members 246 relative to the tray 231. The tray 231 may have an axis z extending along its length, an axis y extending along its height, and an axis x extending its width. The securement member 244 may be coaxially aligned with the axis z extending along the length of the tray 231. A plurality of securement members 244 may be positioned in a row extending along axis x along the width of the tray 231.

Figure 3A:
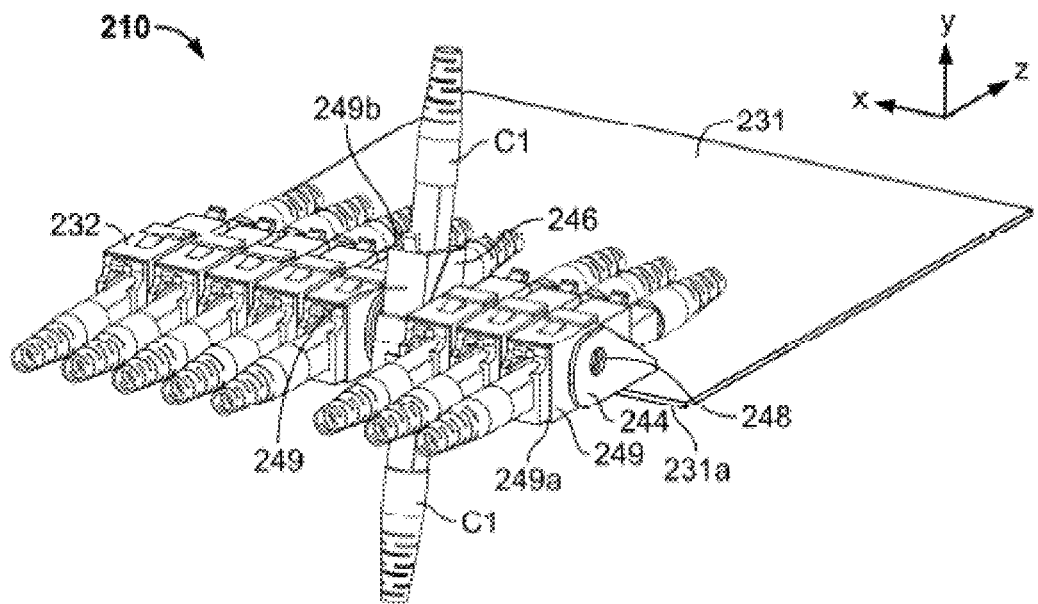
FIG. 3A is a perspective view of another embodiment of a patch panel device including a plurality of attachment members.
Figure 3B:
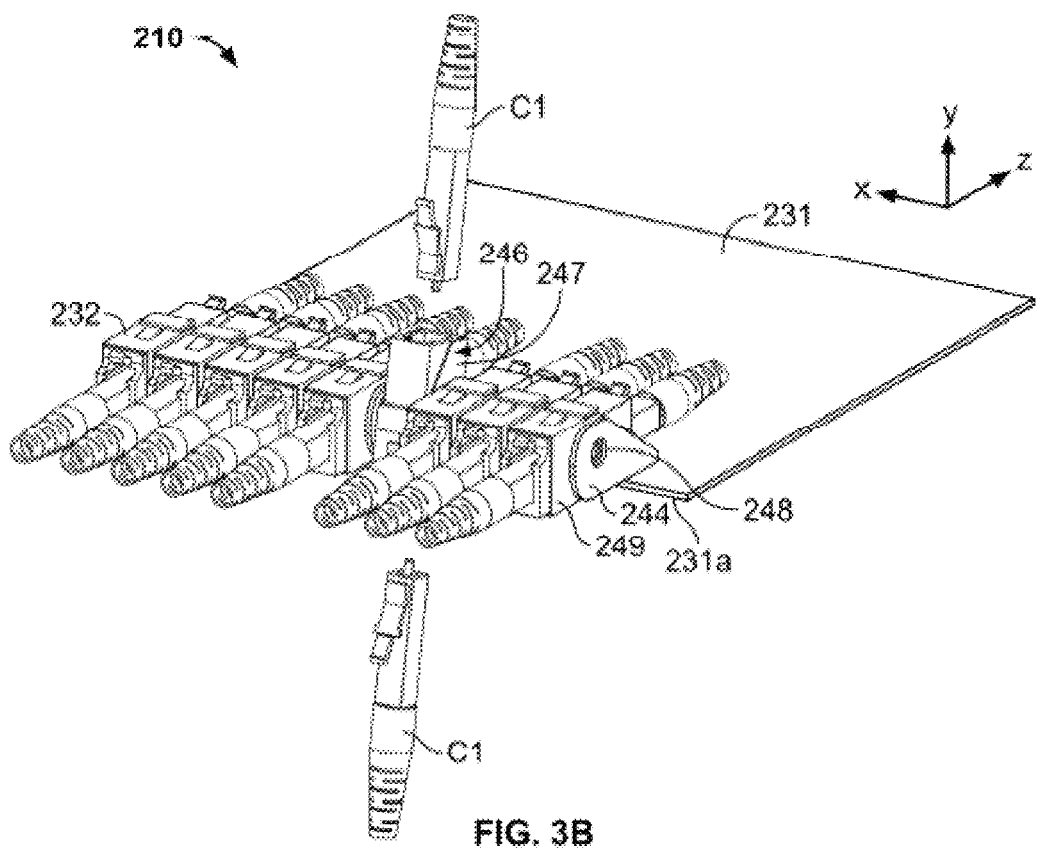
FIG. 3B is a perspective view of the patch panel device of FIG. 3A in which cables have been separated from one of the attachment members.
Figure 3C:
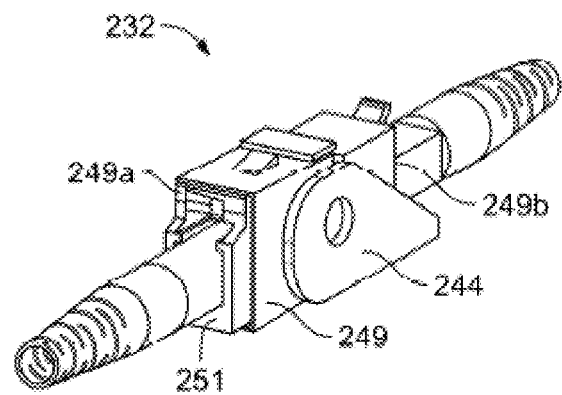
FIG. 3C is a perspective view of one of the attachment members of FIG. 3A shown in a first condition.
Figure 3D:
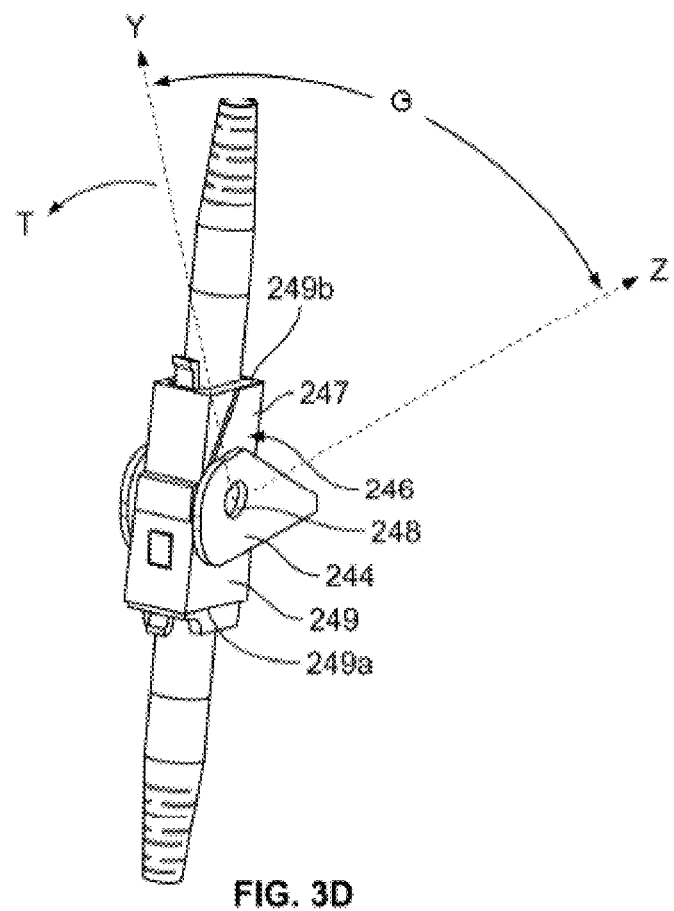
FIG. 3D is a perspective view of one of the attachment members of FIG. 3A shown in a second condition.

As shown in FIGS. 3C-3D, the securement member 244 and a movable member 246 of the attachment member 232 may be pivotably connected to one another at a pivot point 248 such that the movable member 246 may be radially moved relative to the securement member 244 to define an angle G therebetween. In particular, the movable member 246 may radially pivot between the y and z axes and the angle G may be defined therebetween. When secured to the tray 231, the movable member 246 may pivot in a counter-clockwise direction T, but may be inhibited from pivoting in the opposite, clockwise direction by the tray 231. However, as discussed above, cut-outs in the tray 231 may reduce the interaction between the tray 231 and the movable member 246 to facilitate a greater range of movement of the movable member 246 with respect to the tray 231. In an embodiment, the angle G may be adjusted within a range between about 0 and about 135 degrees. In another embodiment, the angle G may be adjusted within a range between about 0 and about 90 degrees. For example, in one embodiment, the movable members 246 may be movable relative to one another to transition the patch panel device 210 between a first condition in which front surfaces 251 of the movable members 246 are substantially coplanar, and adjacent ones of the members 246 are spaced apart a first distance or contact each other, and a second condition in which the front surfaces 251 of respective adjacent members 246 are in different planes in accordance with the angle G that one of the adjacent members 246 is pivoted or rotated relative to the other adjacent members 246, where the other member 246 may or may not be at the same position as in the first condition.

A plurality of patch panel devices 210 may also be supported within housing 2 (see FIGS. 1A-C), and may be translatable into or out from the housing 2 in a direction along axis z. Once spaced apart from the housing 2, the movable member 246 may be pivoted with respect to the securement member 244, thereby spacing the surfaces 249a, 249b of the connector 249 from any adjacent connector 249 such that the cables C1 may be more accessible and readily grasped by a user to detach the cable C1 from the cable adapter or connector 249 of the movable member 246 (as shown in FIG. 3B).

As noted above in connection with FIGS. 1A-C, a number of cables C may be coupled to ports 7 of a particular patch panel device, with the cables C extending vertically through cable trough 4. A number of systems for routing and managing cables C of patch panel systems are described below.

Figure 4A:
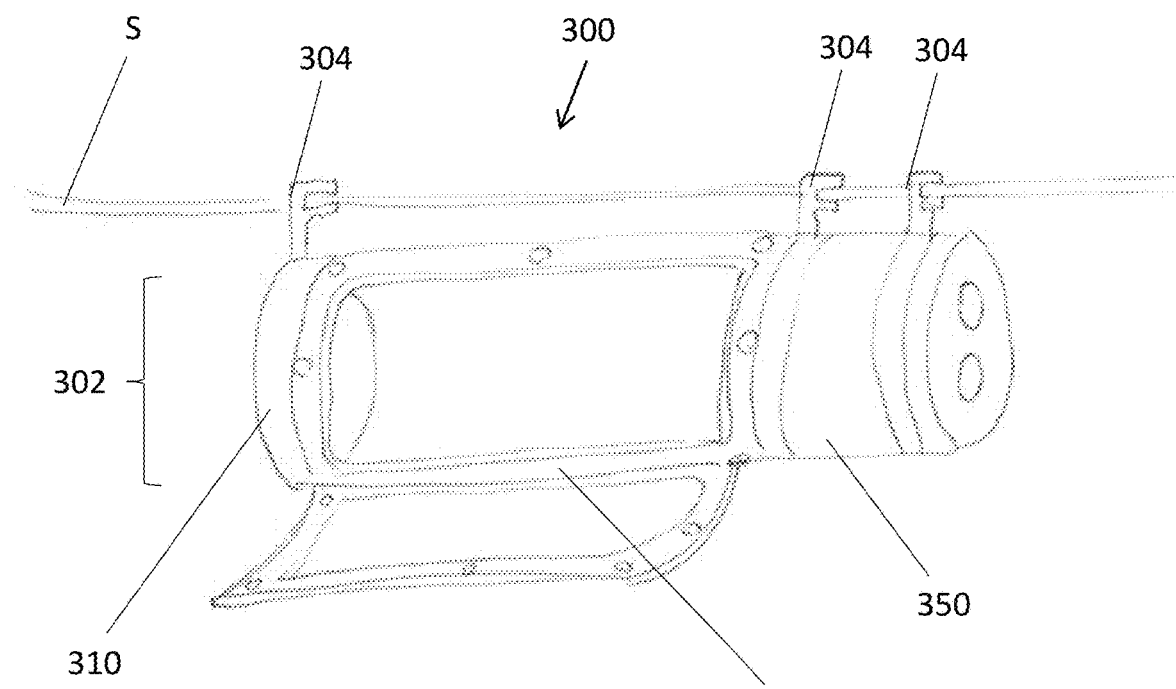
FIG. 4A is a perspective view of a strand-mounted optical fiber distribution system.

FIG. 4A illustrates a housing 302 of an optical fiber distribution system 300 according to one aspect of the disclosure. Generally, optical fiber distribution system 300 is intended for use in a strand-mounted configuration, in which the optical fiber distribution system 300 hangs from a metal strand S or otherwise from a wire-like structure, whether metal or formed of another material. It should be understood that, in FIG. 4A, internal components of the housing 302, as well as corresponding accessories such as cables, are omitted from the drawing to more clearly illustrate the housing 302. Housing 302 of optical fiber distribution system 300 may include three or more main components, including an end cap unit 310, a main cabinet unit 330, and a cable termination unit 350. As will be explained in greater detail below, a plurality of main cabinet units 330 may be interconnected with one another and provided in series between the end cap unit 310 and the cable termination unit 350 to expand the optical fiber and optical fiber cable routing and storage capacity of the optical fiber distribution system 300 to a desired capacity.

As shown in FIG. 4A, components of housing 302 may include one or more hanging elements 304. In the illustrated embodiment, end cap unit 310 is shown with one hanging element 304 extending therefrom, and cable termination unit 350 is shown with two hanging elements 304 extending therefrom. However, any desired number of hanging elements 304 may be attached to any one of the components of the housing to provide the desired level of support. For example, one or more hanging elements 304 may be attached to main cabinet unit 330, which may be particularly desirable when a plurality of main cabinet units 330 are provided in series. Hanging elements 304 may each form a closed boundary with the housing 302 so that strand S may pass through the closed boundaries and the housing 302 may hang from the strand S via the hanging elements 304. Hanging elements 304 may be rigid and formed of metal. In other embodiments, hanging elements 304 may be straps or other soft materials that provide sufficient strength to housing 302 while it hangs from strand S. In still other embodiments, hanging elements 304 need not be coupled on two ends to the housing 302. For example, hanging elements 304 may have a first end coupled to the corresponding component of the housing 302 and a second free end shaped to hook over strand S, or to otherwise be secured to strand S.

Figure 4B:
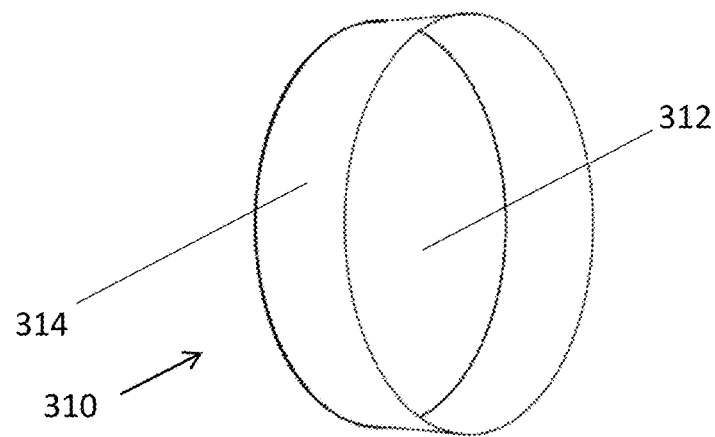
FIG. 4B is a perspective view of an end cap unit of the optical fiber distribution system of FIG. 4A.

In general, housing 302 may be substantially cylindrical, although the housing 302 may more broadly be described as being tubular with a cylindrical or oval transverse cross-section. End cap unit 310 may be substantially cylindrical, and may serve as a terminal end of optical fiber distribution system 300. In the illustrated embodiment, end cap unit 310, illustrated in isolation in FIG. 4B, includes a circular face 312 that forms an end of the cylindrical housing 302, although in some embodiments the circular face 312 of end cap unit 310 may include one or more apertures to allow cables or other accessories to enter housing 302. End cap unit 310 may define a substantially hollow interior between the circular face and rim 314 so that components may be stored within the interior of end cap unit 310. The rim 314 may be coupled to the corresponding surface of main cabinet unit 330 in any desired fashion, although in some embodiments end cap unit may be integral with main cabinet unit 330. It should be understood that hanging element(s) 304 are omitted from the illustration of FIG. 4B.

Figure 4C:
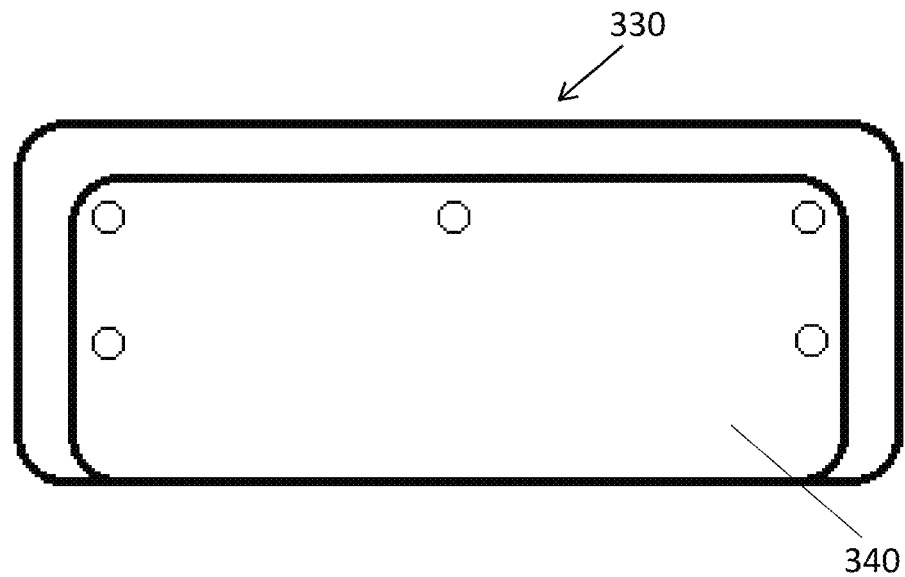
FIG. 4C is a front view of a main cabinet unit, in a closed condition, of the optical fiber distribution system of FIG. 4A.
Figure 4D:
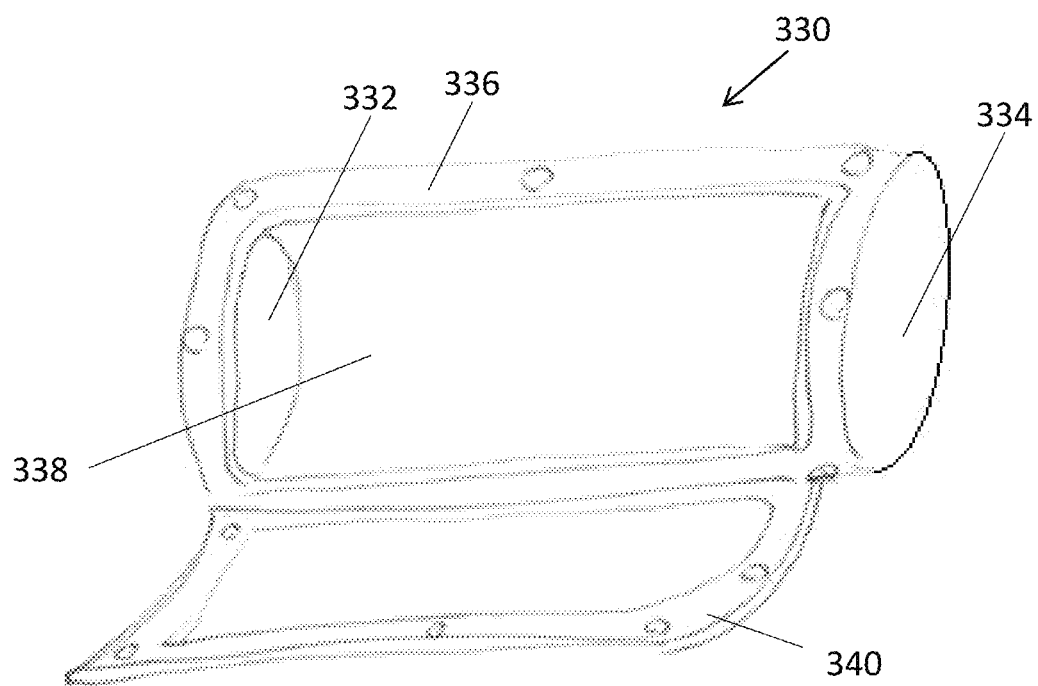
FIG. 4D is a perspective view of the main cabinet unit of FIG. 4C in an open condition.

FIGS. 4C and 4D illustrate a main cabinet unit 330 isolated from other portions of the housing 302 of optical fiber distribution system 300. Main cabinet unit 330 may be substantially cylindrical, and is illustrated with internal components omitted to better illustrate the main cabinet unit 330. Main cabinet unit 330 may extend between opposing open circular ends 332 and 334, best illustrated in FIG. 4D. Main cabinet unit 330 may include a main body 336 that forms a partial cylindrical surface, with an opening 338 shown best in FIG. 4D. A door 340 or other covering may be attached to the main body 336, for example via a hinge, so that the door 340 may transition between an open condition in which internal components of the main cabinet unit 330 are exposed to an environment external to housing 302 and may be accessed at the opening 338, as shown in FIG. 4D, to a closed condition, shown in FIG. 4C, in which the internal components of the main cabinet 330 are enclosed by the door 340 and main body 336 together with end cap unit 310 and termination unit 350, so as to protect the internal components from being exposed to the environment external to housing 302, and desirably seal or substantially seal an interior of the housing 302 as described in detail below. Preferably, door 340 has the shape of a portion of a cylinder, and when in the closed condition, the door 340 is substantially flush with the outer surface of the main body 336, although the assembly need not be perfectly flush. Door 340 and main body 336 are illustrated with corresponding fasteners to assist in keeping the main cabinet unit 330 in the closed condition. The fasteners may take any suitable form, including bolts, screws, snaps, hooks, magnets, clasps, etc. and the fasteners may be positioned only on the main body 336, only on the door 340, or both. As noted above, end cap unit 310 may be coupled to main body 336 adjacent open circular end 332, with the rim 314 of the end cap unit 310 being substantially flush with the outer surface of main body 336. Although main cabinet unit 330 and components thereof are described as cylindrical or substantially cylindrical with portions thereof having circular or substantially circular ends, it should be understood that other shapes may be suitable, including cross-sectional shapes that are oval, elliptical, square, rectangular, and combinations thereof, such as rectangular with rounded corners.

Figure 4E:
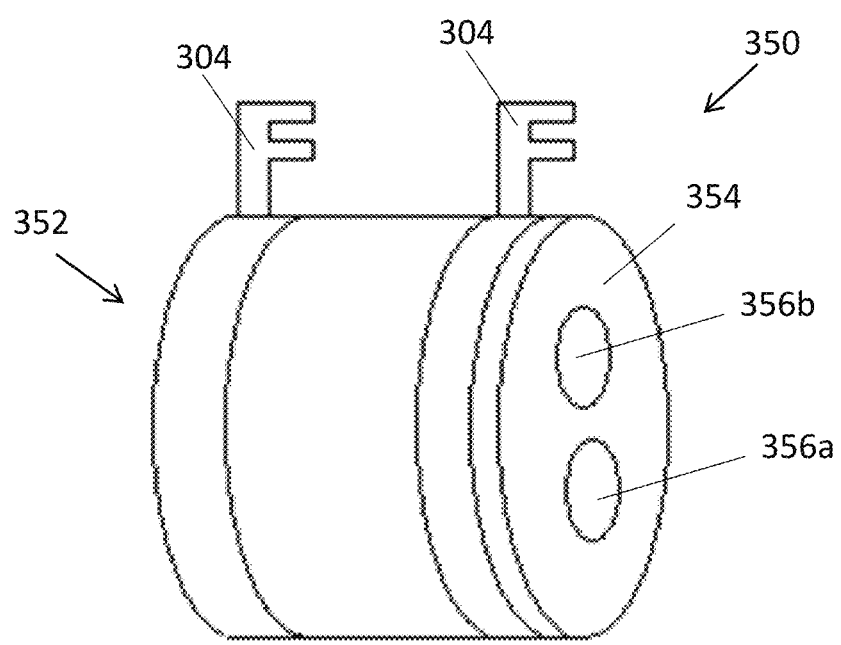
FIG. 4E is a perspective view of an optical fiber cable termination unit of the optical fiber distribution system of FIG. 4A.

FIG. 4E illustrates an optical fiber cable termination unit 350 isolated from other components of optical fiber distribution system 300, with accessories such as cables omitted from the drawing. Generally, optical fiber cable termination unit is substantially cylindrical and extends from an open side 352 to a closed circular end 354. The interior of cable termination unit 350 may be substantially hollow to allow for components and accessories of optical fiber distribution system 300 to be stored therein. The open side 352 of cable termination unit 350 may be coupled to end 334 of main cabinet unit 330 and may be substantially flush therewith. If a plurality of main cabinet units 330 are connected to one another in series, only a single cable termination unit 350 may be present and coupled to the main cabinet unit 330 at one end in the series. Closed end 354 may include one or more ports 356a, 356b, to allow for cables or cable bundles to pass from an exterior of the optical fiber distribution system 300 to the interior of the system. Functionally, cable termination unit 350 may serve to support cables entering and exiting the optical fiber distribution system 300, as described in greater detail below. Although fiber distribution system 300 is shown and described with one cable termination unit 350 at one end, and an end cap unit 310 at the opposite end, in some embodiments for example as shown and described in connection with FIGS. 20A-B, one cable termination unit 350 may be provided at each end of the fiber distribution system 300 so that the fiber distribution system 300 includes a total of two cable termination units 350.

Figure 4F:
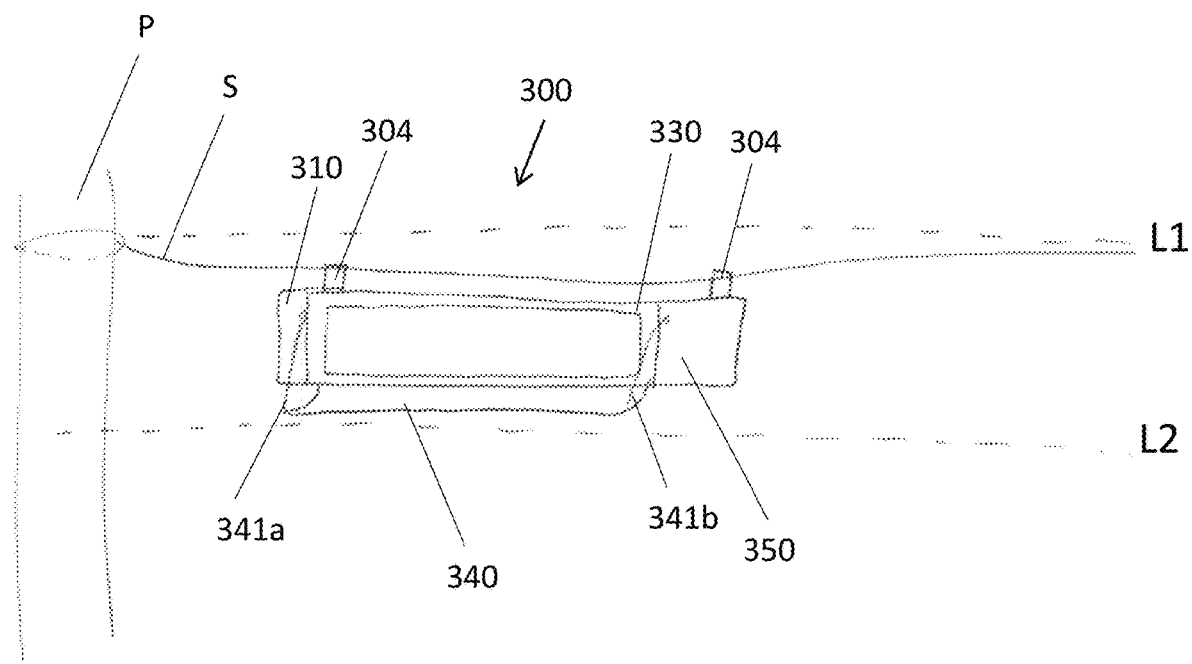
FIG. 4F is another perspective view of the optical fiber distribution system of FIG. 4A.

FIG. 4F illustrates a simplified view of optical fiber distribution system 300 in use, with components inside housing 302 omitted from the illustration for purposes of clarity. FIG. 4F illustrates particularly well some of the dimensional and space considerations that may be taken into account in configuring optical fiber distribution system 300. In the illustrated example, a strand S is coupled to a pole P at a first end, and to another support (not shown) at its second end. It should be understood that the type of support to which strand S is coupled may be any structure suitable for supporting strand S and fiber distribution system 300. In FIG. 4F, the bottom of the drawing is nearer the ground (in the direction of gravity) while the top of the drawing is farther away from the ground (in the direction opposite gravity). A first imaginary line L1 is illustrated in FIG. 4F orthogonal to the direction of gravity and aligned with the point at which strand S attaches to pole P. A second imaginary line L2 is illustrated in FIG. 4F orthogonal to the direction of gravity (and parallel to imaginary line L1), the imaginary line L2 being aligned with the bottom-most surface of door 340 when the door is in the open condition. The distance between lines L1 and L2 may define the total vertical height required for the use of fiber distribution system 300. In the illustrated embodiment, the distance between lines L1 and L2 may be about twelve inches (or about 30.5 cm). The distance between line L1 and a top surface of hanging element(s) 304 may be about two inches when in use, as the weight of optical fiber distribution system 300 and the weight of strand S may cause the strand S to bow a distance below the point of attachment of strand S to pole P. The distance between the bottom of housing 302 and line L2 may also be about two inches, which accounts for the additional clearance for door 340 when it is transitioned into the illustrated open condition. As illustrated, door-stoppers 341a, 341b may couple the door 340 to portions of housing 302 in order to limit the amount that the door 340 is able to open with respect to housing 302. Although door-stoppers 341a, 341b are illustrated as wire-like elements, it should be understood that other door-stopper structures may be suitable to perform the same or similar function. The distance between the bottom of housing 302 and the top of the hanging element(s) 304 may be about eight inches.

Because optical fiber distribution system 300 has a hanging configuration with respect to strand S and pole P, according to the present disclosure, it may be preferable to limit the depth of housing 302, the depth being in the direction into and out of the page of FIG. 4F (in other words, the direction orthogonal to both gravity and lines L1, L2), which in turn may limit the extent to which the housing 302 may swing (rotate about) the strand when an external force acts upon the housing 302. If the storage and routing capacity of fiber distribution system 300 were to be increased by increasing the depth of housing 302, the housing 302 may swing more readily and to a greater extent about the strand when acted upon by a same external force. Therefore, in accordance with the present disclosure, if storage and routing capacity of optical fiber distribution system 300 is desired to be increased, additional main cabinet units 330 may be connected to one another in series, as described in greater detail below, because the additional length of the system in the direction of lines L1, L2 may not appreciably increase the ease with which and extent to which the housing 302 may swing about the strand when acted upon by an external force.

Figure 5A:
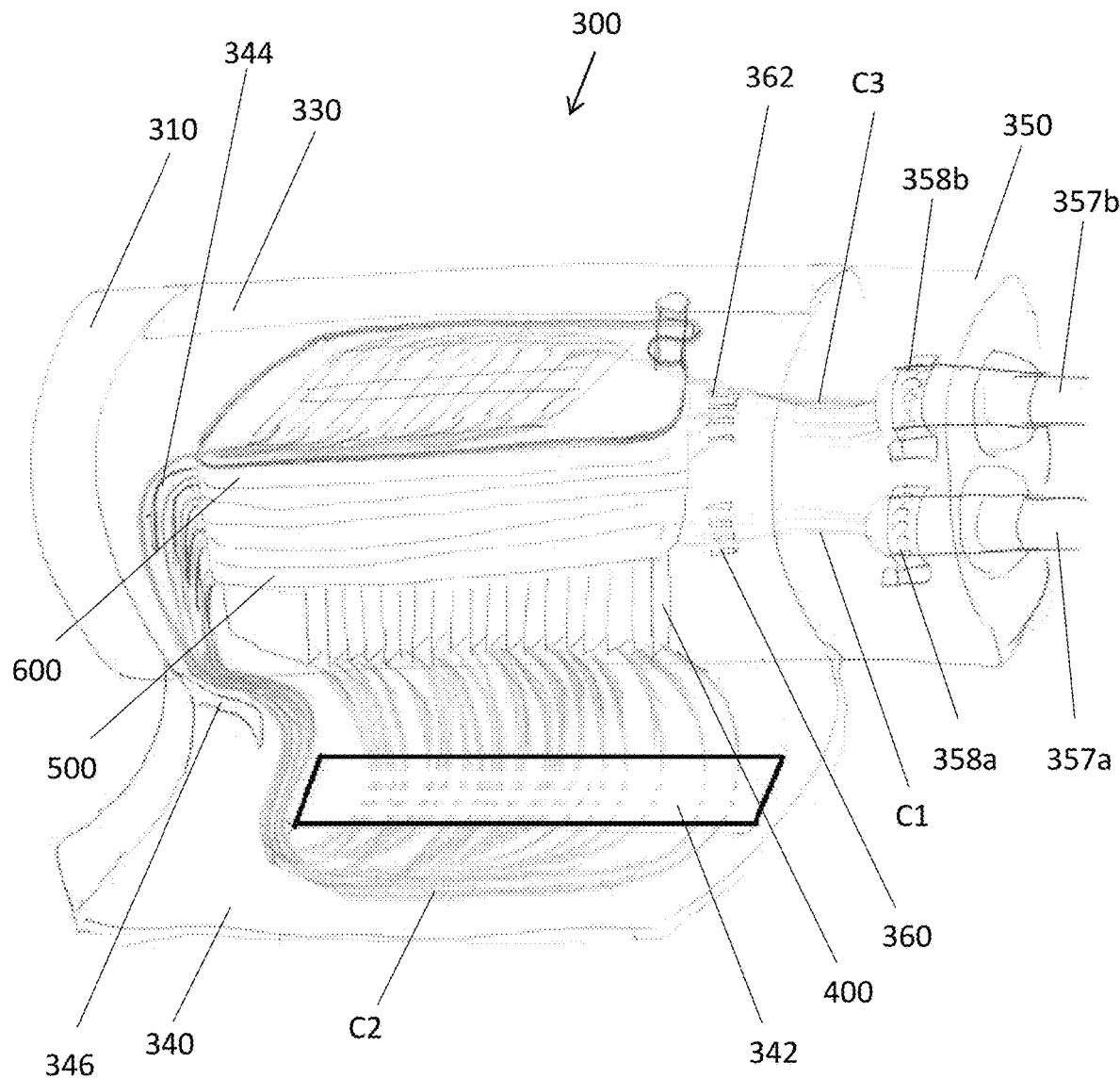
FIG. 5A is a perspective view of the optical fiber distribution system of FIG. 4A in an open condition, with various internal component and accessories illustrated.

FIG. 5A illustrates an embodiment of fiber distribution system 300 with internal components and/or accessories shown, while some portions of housing 302 are illustrated as transparent to more clearly illustrate internal components. It should be understood that hanging elements 304 are omitted from FIG. 5A, as are certain external components related to the system, such as a strand S from which the optical fiber distribution system 300 would hang. A first cable or cable bundle 357a may pass through port 356a of cable termination unit 350. Cable bundle 357a may be relatively thick, or in other words have a relatively large diameter of up to about one inch. A clamp 358a, described in greater detail below in connection with FIG. 5B, may secure a terminal end of cable bundle 357a to cable termination unit 350. Smaller individual fibers or cables C1 may pass through the terminal end of cable bundle 357a toward main cabinet unit 330. One or more cable hangers or guides 360 may be provided on an interior surface of main cabinet unit 330 and/or cable termination unit 350 to guide individual cables C1 and/or groups of individual cables C1 to their destination, while keeping the cables C1 (or groups thereof) supported and/or organized. In one embodiment, cables C1 convey signals from (and/or to) a service provider. Individual cables C1 may each connect to a corresponding splitter 400. Each splitter 400 may function to split the signal(s) conveyed from one corresponding cable C1 among a plurality of cables C2 connected to that splitter 400. Although splitters 400 may take any suitable form, in the illustrated embodiment splitters 400 are substantially rectangular with relatively narrow or thin front and rear faces, and relatively long distances between the front and rear faces. Various types and configurations of splitters are described in additional detail in U.S. patent application Ser. No. 15/917,965 ("the '965 Application"), the disclosure of which is hereby incorporated by reference herein. As noted above, while the overall length of fiber distribution system 300 may not be significantly limiting in terms of the design of the fiber distribution system 300, it may be important to limit the depth of the system to avoid undesired swinging of the housing 302 relative to strand S when optical fiber distribution system 300 is in hanging engagement with a strand S. When splitters 400 have a small width but a large depth, it may be desirable to orient the splitters 400 so that an axis extending between the front and rear faces of the splitters 400 are positioned at an oblique angle relative to a longitudinal axis passing through the center of the cylindrical housing 302. In the illustrated embodiment, the front-to-rear axes of the plurality of splitters 400 are each positioned at an angle of about 45 degrees relative to the central longitudinal axis of housing 302. Although a greater or smaller angle may be suitable, the angled configuration of splitters 400 reduces the depth of housing 302 required to contain the plurality of splitters 400.

As noted above, cables C1 may convey signal(s) to splitters 400. Each splitter 400 may include a plurality of cables C2 to convey a portion of the signal from a corresponding cable C1. As illustrated, a group of cables C2 extends between the front face of a corresponding splitter 400 to a cassette, such as a storage cassette or a patch panel cassette. Because splitters 400 are angled with respect to the central longitudinal axis of housing 302, and because cables C2 extend from front faces of the splitters 400, the cables C2 may initially extend from the splitters 400 at a similar angle, such as about 45 degrees, with respect to the central longitudinal axis of the housing 302. One benefit of this configuration is that, upon moving door 340 to a closed position, the door 340 may put less stress on the cables C2 where they connect to splitters 400. In other words, there may be relatively little clearance between the inside surface of door 340 when it is in a closed position and the front faces of splitters 400, but nonetheless cables C2 may not be undesirably stressed or damaged due to the small clearance because of the angle at which they initially extend from splitters 400 relative to the central longitudinal axis of the housing 302. In the illustrated embodiment, a cable guide 342 may be positioned on the interior surface of door 340. Cable guide 342 may be a simple flat panel spaced a distance from the interior surface of door 340 so that cables C2 may pass between the cable guide 342 and the door 340 to assist in supporting, protecting, and/or guiding the cables C2. In other embodiments, cable guide 342 may include other structures such as ribs, slots, or the like in order to support individual cables C2 or individual groups of cables C2 in any desired fashion. One or more additional cable hangers or guides 344 may be provided on an interior surface of main cabinet unit 330 and/or end cap unit 310. As illustrated, a plurality of cable guides 344 in the form or ribs or fins may help support, organize, and/or guide cables C2 at or near the corresponding storage cassette 500 or patch panel cassette 600 to which the cables C2 are connected. Preferably, cable guides 344 provide for maintaining a minimum bending radius of the cables C2 and assist in organizing the relatively large volume of cables C2. Additional cable guides that may be suitable for use as cable guide(s) 344 are described in greater detail in the '965 Application. One or more additional cable guide(s) 346 may be provided on the inner surface of door 340 near the edge of the hinged connection of the door 340 to the main cabinet unit 330. This cable guide(s) 346 may assist in positioning cables C2 so that they do not become caught, pinched, or otherwise damaged between door 340 and edges of the main cabinet unit 330 and/or the end cap unit 310 when the door 340 is transitioned to the closed condition.

Prior to describing the connection of cables C2 to storage cassettes 500 and/or patch panel cassettes 600, cable or cable bundle 357*b* is briefly described. Similar to cable bundle 357*a*, cable bundle 357*b* may pass through port 356*b* of cable termination unit 350. Cable bundle 357*b* may be relatively thick, or in other words have a relatively large diameter of up to about one inch. A clamp 358*b*, described in greater detail below in connection with FIG. 5B, may secure a terminal end of cable bundle 357*b* to cable termination unit 350. Smaller individual fibers or cables C3 may pass through the terminal end of cable bundle 357*b* toward main cabinet unit 330. One or more cable hangers or guides 362 may be provided on an interior surface of main cabinet unit 330 and/or cable termination unit 350 to guide individual cables C3 and/or groups of individual cables C3 to their destination, while keeping the cables C3 (or groups thereof) supported and/or organized.

In one embodiment, cables C3 are connected to rear ports 634 of adapters 630 positioned on patch panel cassettes 600, so that cables C3 convey signals in one or both directions between rear ports 634 of adapters 630 and a service subscriber. An exemplary adapter 630 is described in greater detail below in connection with FIG. 6B. Cables C3 may be provided connected to the rear ports 634 of adapters 630 so that, in order to connect a service subscriber to the service provider, an operator of the fiber distribution system 300 need only connect the desired cable C2 to the front port 632 of the adapter 630 that already has the desired cable C3 coupled to its rear port 634. In some embodiments, when optical fiber distribution system 300 is initially installed, many or all of the cables C2 extending from splitters 400 may be positioned in a storage cassette 500, which may act simply to store the end of the cable C2 in an organized fashion. Some examples of storage cassettes are described in greater detail in the '965 Application. In one example, storage cassettes 500 may generally take the form of trays that have clips or racks positioned thereon, each clip being adapted to receive an end of a corresponding cable C2. At some point in the future, it may be desirable to connect a particular service subscriber to the service provider, for example after the service subscriber initiates the subscription. At that point, a user or operator may remove the desired cable C2 from its position in a storage cassette 500, and connect that cable C2 to the front port 632 of the adapter 630 that includes a rear port 634 connected to the cable C3 that will ultimately connect the service subscriber to the service provider.

Figure 5B:
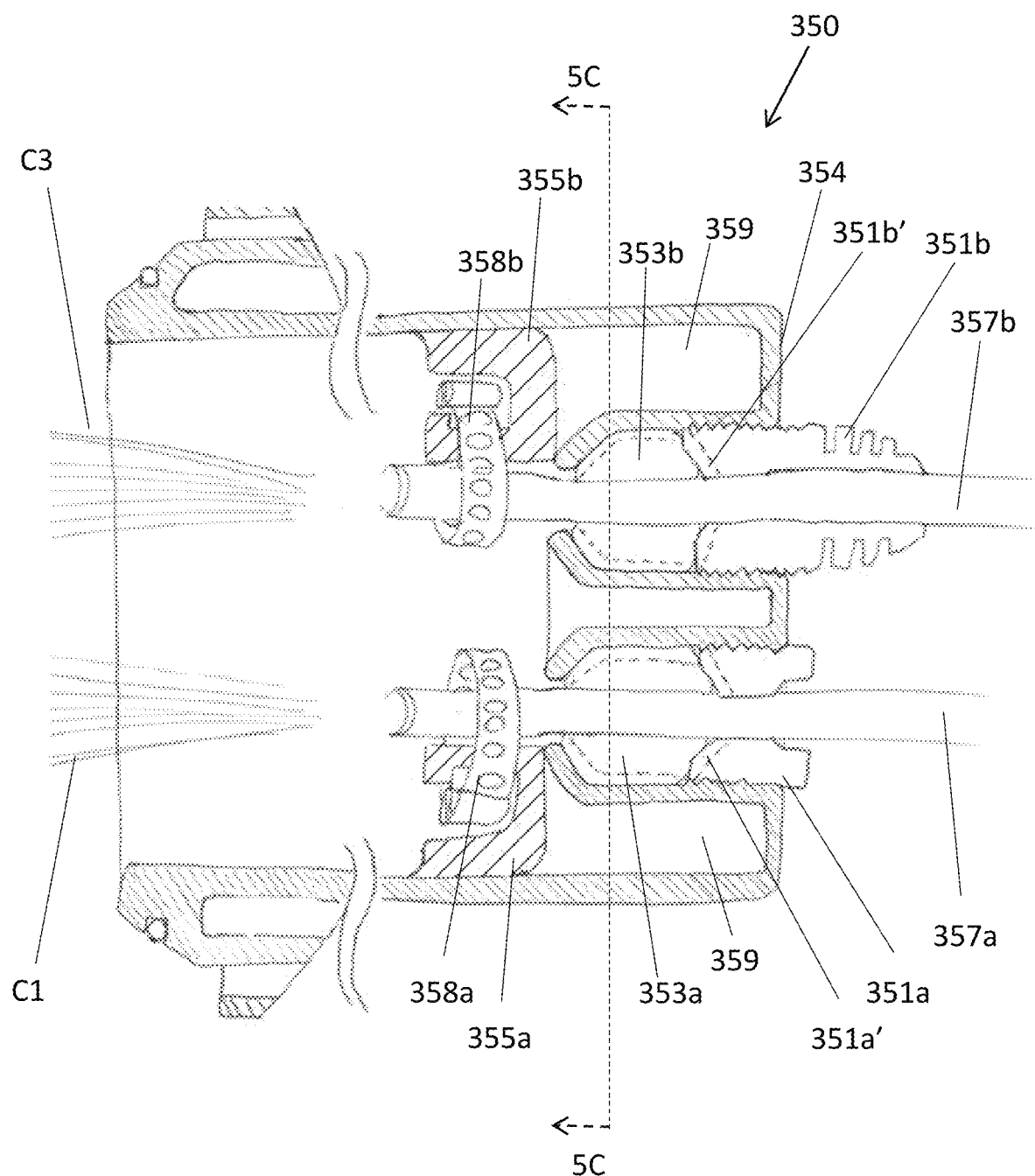
FIG. 5B is a cut-away view of the optical fiber cable termination unit of the fiber distribution system of FIG. 5A.

FIG. 5B illustrates a cross-section of one embodiment of a cable termination unit 350 with cable bundles 357*a*, 357*b* secured thereto. Although ports 356*a*, 356*b* are illustrated in FIG. 4E as simple holes, additional components may be provided in order to help secure cable bundles 357*a*, 357*b* to the cable termination unit 350. For example, each port 356*a*, 356*b* may be associated with a corresponding strain relief members 351*a*, 351*b*. Strain relief members 351*a*, 351*b* may be generally cylindrical, conical, or frustoconical, include a central opening to allow for the corresponding cable bundle 357*a*, 357*b* to pass therethrough, and may include external threads or other mating features to engage with internal threads or other corresponding internal mating features on ports 356*a*, 356*b*. Strain relief members 351*a*, 351*b* may help prevent or reduce strain on cables within cable bundles 357*a*, 357*b* if the cable bundle 357*a*, 357*b* is pulled sideways or bent at a position adjacent or spaced from the strain relief member 351*a*, 351*b*. One or more rotation stoppers or lockers (not illustrated) may be positioned on closed end 354 adjacent each port 356*a*, 356*b* to help reduce the likelihood of the corresponding strain relief member 351*a*, 351*b* unintentionally being rotated to loosen or disconnect the strain relief member 351*a*, 351*b* from the port 356*a*, 356*b*. Each port 356*a*, 356*b* may also include a relatively soft sealing member such as a gasket 353*a*, 353*b* within the port interior to the corresponding strain relief member 351*a*, 351*b*. Preferably, gaskets 353*a*, 353*b* are formed of a soft rubber tubing, although other materials, and in particular elastomeric materials, may be suitable for use. Further, although gaskets 353*a*, 353*b* are generally illustrated as cylinders with a central opening, other shapes may be suitable depending on the shape of the volume in which the gasket is intended to be positioned. Gaskets 353*a*, 353*b* may help to provide a fluid-tight seal between the outside and inside of fiber distribution system 300. In some embodiments, springs or other compression members may be positioned in contact with gaskets 353*a*, 353*b* so that, if the gasket 353*a*, 353*b* loses elasticity over time, the springs or other compression members may assist in maintaining a tight seal between the gaskets 353*a*, 353*b* and the cable bundles 357*a*, 357*b*. In some examples, one or more compression plates 351*a*', 351*b*' may be positioned between strain relief members 351*a*, 351*b* and corresponding gaskets 353*a*, 353*b*. The compression plates may have one or more low friction surfaces to aid in efficiently transferring axial compression forces from one of the strain relief members 351*a*, 351*b* to the corresponding gasket 353*a*, 353*b*. Springs or other biasing members, similar to those described directly above, may also be used in combination with the compression plates.

Still referring to FIG. 5B, two cable anchors 355*a*, 355*b* may be provided within cable termination unit 350, preferably so that one cable anchor 355*a*, 355*b* is associated with each port 356*a*, 356*b*. In the illustrated embodiment, cable anchors 355a, 355b are coupled to an interior surface of cable termination unit 350 and include a hook or other structure that provides a surface or member for attachment of a corresponding clamp 358a, 358b. Clamps 358a, 358b may wrap around or otherwise connect to the corresponding cable bundle 357a, 357b, in order to secure the cable bundle 357a, 357b to the cable termination unit 350 via the cable anchors 355a, 355b. Although clamps 358a, 358b are illustrated as having a configuration similar to a hose clamp, other configurations may be suitable. Further, although cable anchors 355a, 355b are illustrated as separate members attached to cable termination unit 350, the cable anchors may in other embodiments be integral with the cable termination unit 350 and/or have shapes that differ from those which are shown.

Figure 5C:
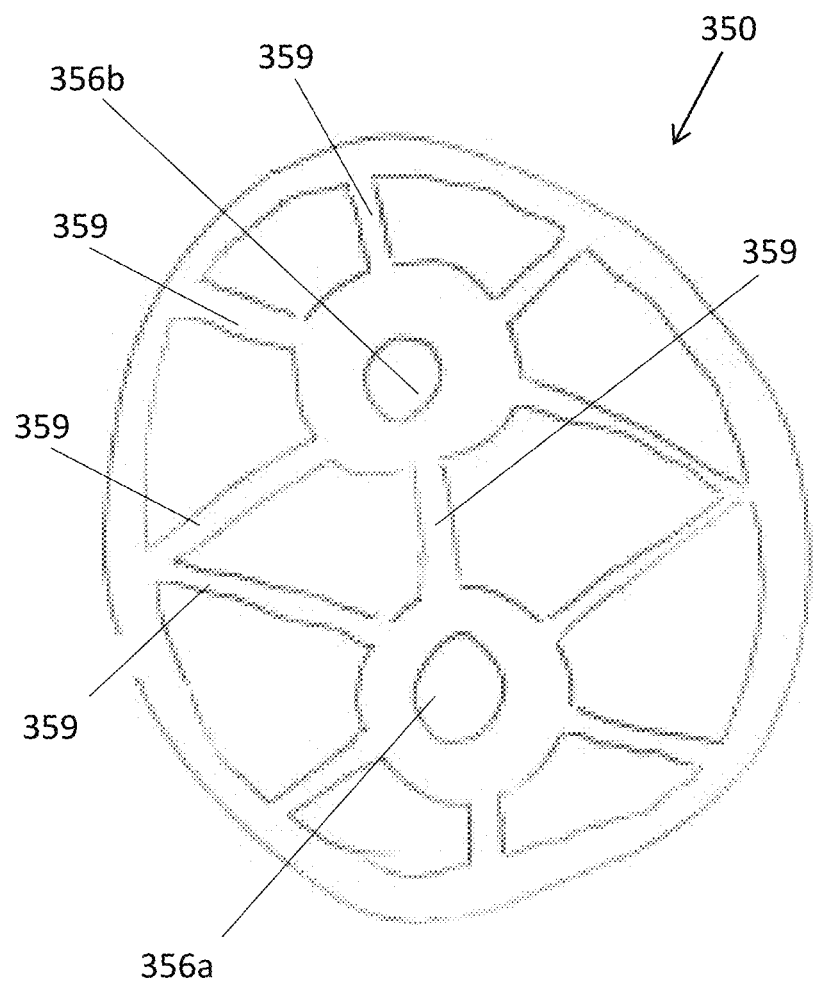
FIG. 5C is a cross-section of the optical fiber cable termination unit of the optical fiber distribution system of FIG. 5A at cross-sectional line 5C-5C in FIG. 5B.

Although in some embodiments, the space between the outermost walls of cable termination unit 350 and the interior walls forming ports 356a, 356b may be empty, in the illustrated embodiment, fins or ribs 359 provide additional stability to the cable termination unit 350. FIG. 5C illustrates a cut-away view of cable termination unit 350 to illustrate various support ribs 359 coupling the outer wall of cable termination unit 350 to the interior walls forming ports 356a, 356b, as well as at least one support rib 359 connecting the interior wall forming port 356a to the interior wall forming port 356b. It should be understood that, although ports 356a, 356b are illustrated in a vertical relationship, or in other words when in use port 356a is positioned nearer the ground than is port 356b, in other embodiments the ports can be arranged differently, such as horizontally so that both ports, when in use, are positioned about the same distance from the ground. Still further, although two ports 356a, 356b are shown, in other embodiments a single port, or more than two ports, may be suitable for the particular application of fiber distribution system 300.

Referring again to FIG. 5B, the open end side 352 of fiber termination unit 350 may include a connection system to assist in coupling the fiber termination unit to a main cabinet unit 330. These structures may be similar or identical to the connection system described below in connection with FIGS. 11B-C, or may be replaced with any other suitable connection system described herein. Thus, the connection structures of FIG. 5B are not described in greater detail here.

Figure 5D:
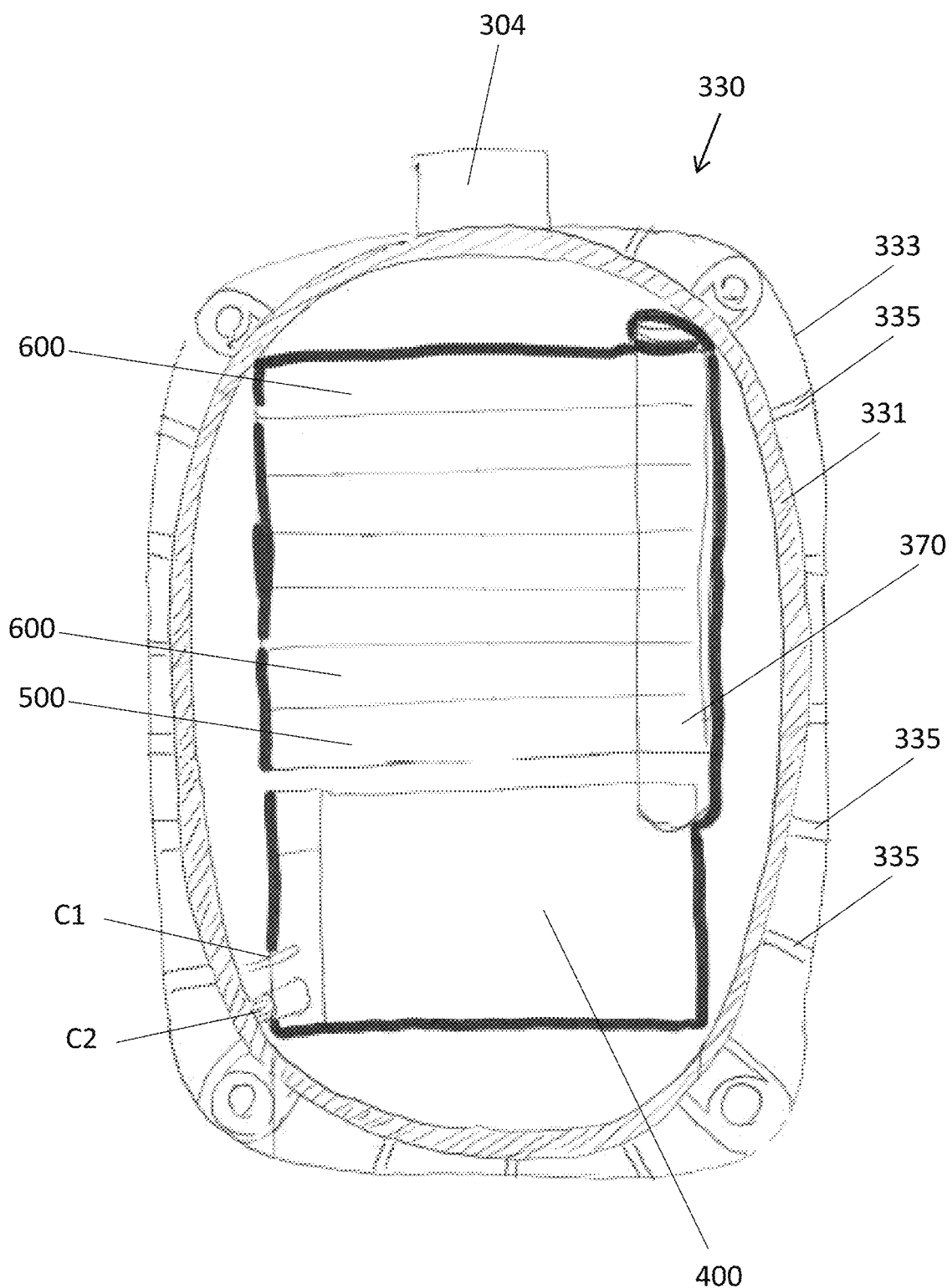
FIG. 5D is a cross-section of the main cabinet unit of the optical fiber distribution system of FIG. 5A.

FIG. 5D illustrates a transverse cross-section of fiber distribution system 300 taken along a plane orthogonal to the longitudinal central axis of the fiber distribution system. It should be understood that, although fiber distribution system 300 and its components are described herein as substantially cylindrical, deviations from perfect cylinders, similar to the generally oval shape shown in FIG. 5D, may be suitable for fiber distribution system 300 and components thereof. In the illustrated embodiment, main cabinet unit 330 may include a substantially cylindrical of oblong interior shell 331 and a similarly shaped exterior shell 333, with a plurality of support structures such as ribs 335 between the interior shell 331 and exterior shell 333.

Main cabinet unit 330 may include a plurality of splitters 400, as described above, although only one splitter is visible in FIG. 5D. A single storage cassette 500 may be positioned on top of the splitters 400, and a plurality of patch panel cassettes 600 may be positioned above the storage cassette 500. It should be understood that, depending on the particular desired functionality of fiber distribution system 300, splitters 400 may be positioned above the patch panel cassettes 600, the patch panel cassettes 600 and the storage cassette 500 may have different vertical positions relative to one another, and different numbers of splitters 400, storage cassettes 500, and patch panel cassettes 600, compared to the number shown in the drawings, may be used. In the illustrated embodiment, the vertical distance between the bottommost surface of the splitters 400 and the topmost surface of the top-most patch panel cassette 600 may be between about 6.5 inches and about 7 inches. The depth of the storage cassette 500 and the patch panel cassettes 600, in the left-to-right direction of FIG. 5D, may be about 3.5 inches, and the depth of the splitters 400 may be about the same as the depth of the storage cassette 500 and the patch panel cassettes 600. The depth of the fiber distribution system 300, for example between the outer surfaces of the interior shell 331 or between the outer surfaces of the exterior shell 333, may be about five inches or less. Although various particular dimensions are described above, it should be understood that other dimensions may be suitable for fiber distribution system 300.

Still referring to FIG. 5D, main cabinet unit 330 may include a cassette support 370 to which the storage cassette 500 and patch panel cassettes 600 (collectively referred to as the cassettes) are coupled. As noted above, the depth of fiber distribution system 300 may be intentionally limited. However, during use by an operator, there may be a relatively small amount of space into which a large number of cables are grouped, and features may be desirable to assist a user in easily manipulating the desired cable and/or storage rack within storage cassette 500 and/or front port 632 within a patch panel cassette. As is described below, the use of a pivoting, rotatable connection between the cassettes and the cassette support 370, as well as pivoting features on the adapters 630 themselves, may assist a user in manipulating the cables within fiber distribution system 300.

Figure 6A:
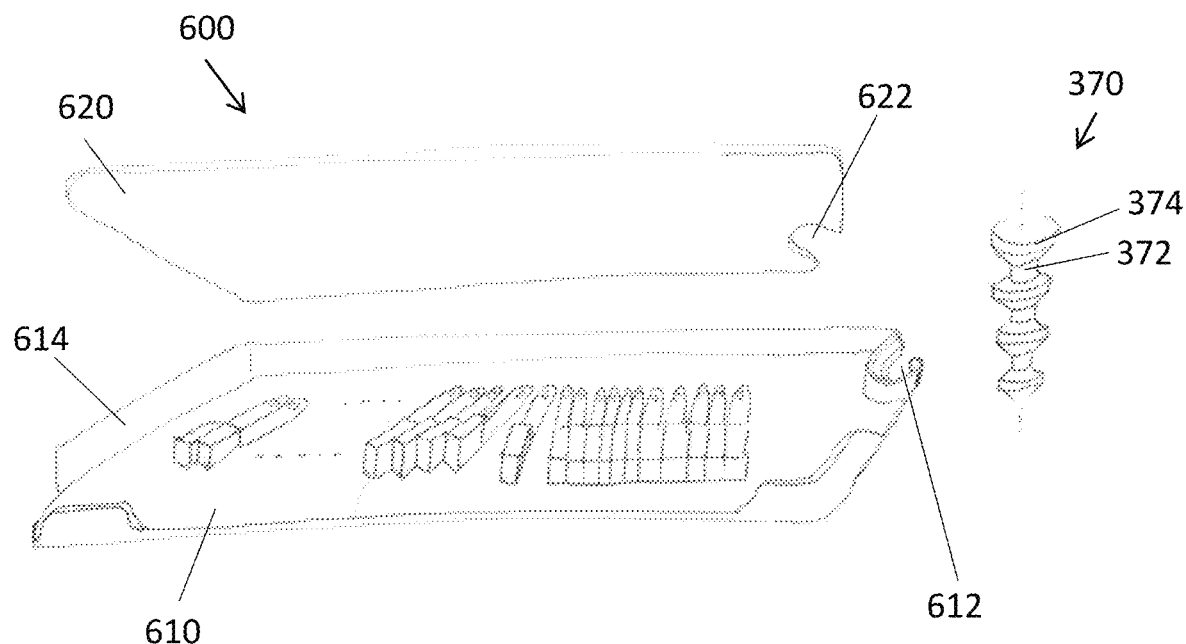
FIG. 6A is a perspective view of a patch panel cassette and a cassette support of the optical fiber distribution system of FIG. 5A.

FIG. 6A illustrates an exemplary embodiment of a patch panel cassette 600. Each patch panel cassette 600 may include a tray 610 and a lid 620. When a plurality of patch panel cassettes 600 are provided in a vertically stacked arrangement, lid 620 may be provided for the top-most patch panel cassette 600, with the tray 610 of each patch panel cassette 600 functionally acting as a lid for the tray 610 of the patch panel cassette 600 positioned vertically below. However, it should be understood that even when a plurality of patch panel cassettes 600 is provided in a vertically stacked arrangement, each cassette 600 may include a tray 610 and a lid 620. Lid 620 may be substantially rectangular with an arcuate recess 622 positioned at a rear corner thereof. Tray 610 may have a base that is similarly rectangular with an arcuate recess 612 positioned at a rear corner thereof. The recesses 612 and 622 are in vertical alignment in an installed state of the cassette(s) 600 where the lid 620 is arranged over the tray 610 for each cassette 600 or over a tray of a top-most cassette 600 in a stacked arrangement. Tray 610 may include a side wall 614 extending substantially orthogonally from the base toward the lid 620. Side wall 614 may include interruptions at strategic locations, for example to allow for cables C2, C3 to enter or exit the patch panel cassette 600. In the illustrated embodiment, a first interruption is provided in the left side wall 614 near a front or proximal end thereof, and the majority of the front of tray 610 may lack any side wall 614, to allow cables to be routed toward front ports 632 of adapters 630. Side wall 614 may also be interrupted on the right side of tray 610 adjacent arcuate recess 612, for example to allow cables C3 to be routed toward rear ports 634 of adapters 630.

FIG. 6A also shows a portion of an embodiment of cassette support 370. In the illustrated embodiment, cassette support 370 extends along a longitudinal axis that is substantially orthogonal to a plane defined by the base of tray 610 and/or lid 620. The top and/or bottom of cassette support 370 may be fixed to a top surface, bottom surface, or any other desired portion of main cabinet unit 330, although such connection is not illustrated in FIG. 6A. Cassette support 370 may include a plurality of cylindrical members 372 spaced apart from one another along the longitudinal axis of the cassette support 370. The cylindrical members 372 may be sized to receive arcuate recess 612 of tray 610 and arcuate recess 622 of lid 620 in a snapping or otherwise locked configuration. For example, arcuate recesses 612, 622 may each have a slightly smaller diameter than the cylindrical members 372, with the tray 610 and lid 620 having enough flexibility for the arcuate recesses 612, 622 to snap onto the cylindrical members 372. With this configuration, once the tray 610 and lid 620 are coupled to the cassette support 370, the tray 610 and lid 620 are each able to rotate with respect to the cassette support 370 about the longitudinal axis of the cassette support 370. Each adjacent pair of cylindrical members 372 may be separated by intermediate members 374. In the illustrated embodiment, intermediate members 374 have a cylindrical center portion having a diameter that is larger than that of the cylindrical members 372, with each intermediate member 374 tapering at its top and bottom into the adjacent cylindrical members 372. With this configuration, as the arcuate recess 612 of tray 610 is snapped onto cassette support 370, the intermediate members 374 may help guide the arcuate recess 612 to the cylindrical member 372, and also serve to separate vertically adjacent trays 610 from one another and to keep the patch panel cassettes 600 positioned a desired distance from vertically adjacent cassettes.

Figure 6B:
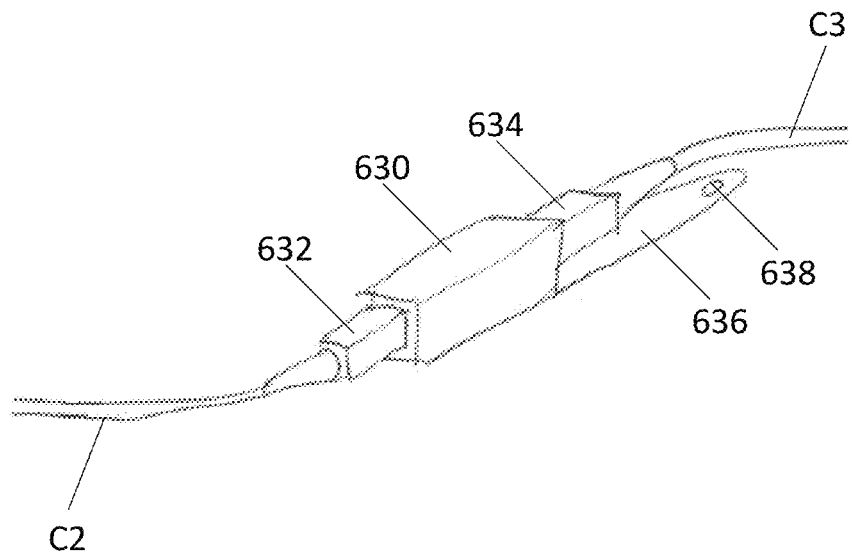
FIG. 6B is a perspective view of an adapter of the patch panel cassette of FIG. 6A.
Figure 6C:
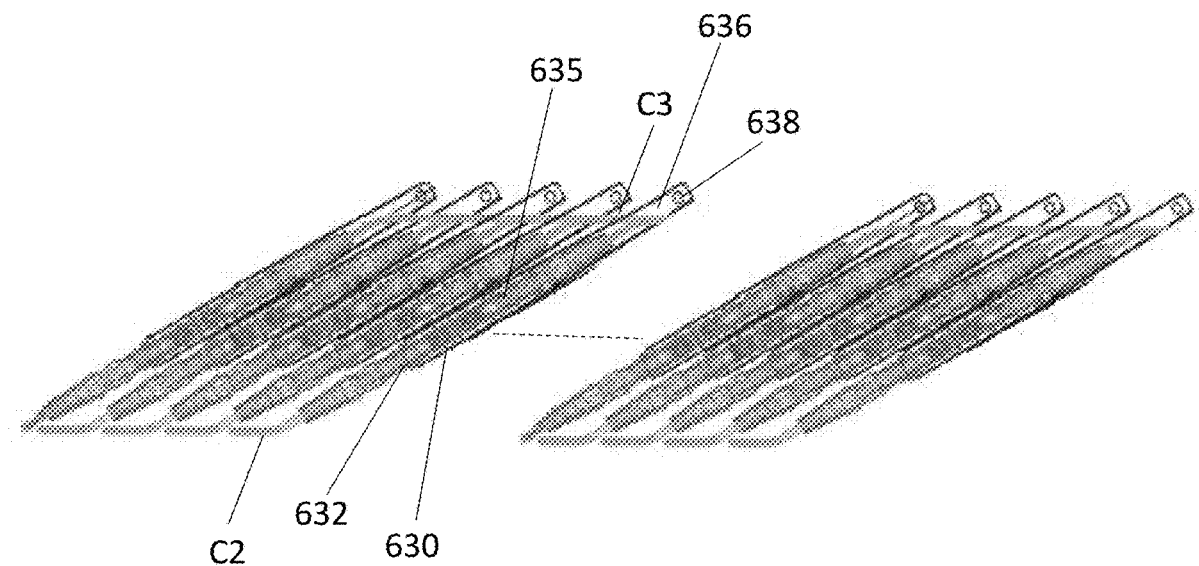
FIG. 6C is a schematic view of a plurality of the adapters of FIG. 6B.

Still referring to FIG. 6A, patch panel cassette 600 may include a plurality of adapters 630, each adapter 630 having a front port 632 to connect to a corresponding cable, and a rear port 634 to connect to another corresponding cable. An isolated adapter 630 is illustrated in FIG. 6B, with a plurality of the adapters 630 illustrated in FIG. 6C. Adapter 630 may have any suitable configuration, including similar to receptacles 247 described above in connection with FIGS. 3A-D. Adapter 630 may be coupled to a base 636, with the base 636 being coupled to tray 610. In some embodiments, base 636 may be fixed to tray 610 and substantially immobile with respect to the tray 610. However, in the illustrated embodiment, each base 636 is attached to tray 610 via a pivot point 638, allowing the base 636 and adapter 630 to pivot about the pivot point 638. Among other benefits, the pivoting attachment of adapter 630 to tray 610 can help a user to access the front port 632 or rear port 634 of a particular adapter 630 by moving pivoting adjacent adapters 630 out of the way. This may be particularly useful in situations where a large number of adapters 630 is provided in each patch panel cassette 600. Although the number of adapters 630 in each patch panel cassette 600 may be chosen based on desired function, in one embodiment, twenty-four adapters 630 are positioned on the tray 610 of each patch panel cassette 600. As described previously, in embodiments of fiber distribution system 300 that are intended to hang from a strand S, the depth of the system may be a limiting factor. As shown in FIG. 6C, adapters 630, whether attached in a fixed or pivoting relation to the tray 610, may be positioned at an angle to reduce the depth necessary to store the adapters 630. Using FIG. 6C as an example, the direction between the left and right side of the figure may be parallel to the longitudinal central axis of the housing 302 of fiber distribution system 300, which may also be substantially parallel to the rear sidewall 614 of tray 610 show in FIG. 6A. The axis along which each adapter 630 extends may be angled about 30 degrees with respect to the rear sidewall 614 of tray 610 in order to reduce the depth required in tray 610 to house the adapters 630.

Figure 7:
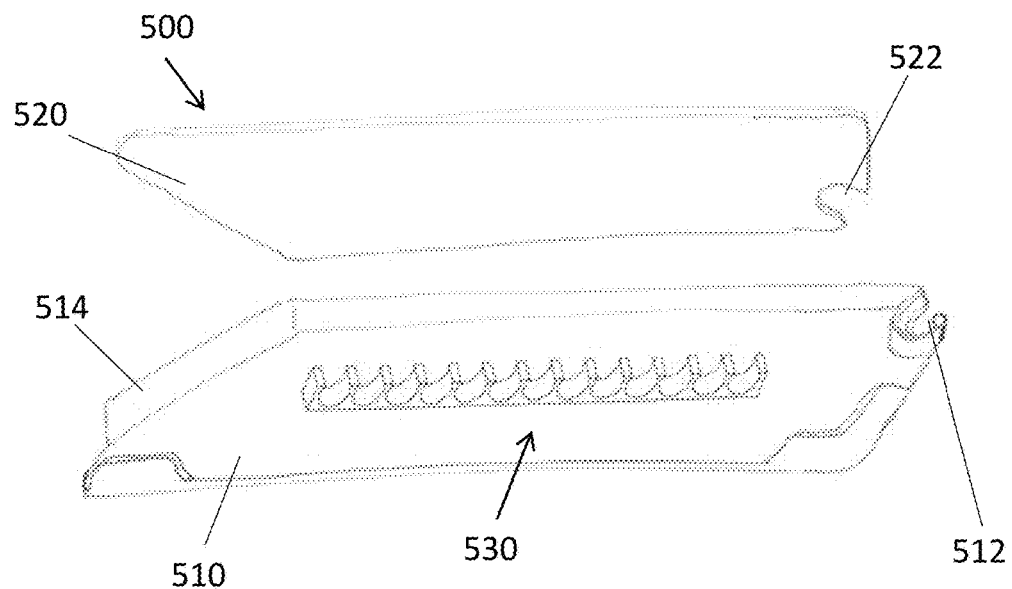
FIG. 7 is a perspective view of a storage cassette of the optical fiber distribution system of FIG. 5A.

FIG. 7 illustrates an exemplary storage cassette 500. Storage cassette 500 may include a tray 510 having one or more sidewalls 514 and an arcuate recess 512, along with a lid 520 having an arcuate recess 522. These components may be similar or identical to the corresponding components of patch panel cassette 600, and thus are not described in greater detail herein. Whereas patch panel cassette 600 obtains its functionality from the adapters 630, storage cassette 500 obtains its functionality from structures that allow cables C2 to be stored prior to being attached to a port of an adapter or other cable connector. In the illustrated example, storage cassette 500 includes a storage rack 530 positioned on tray 510. The storage rack 530 may have any design that is suitable for temporarily receiving an end of a cable in a secured fashion. As illustrated, storage rack 530 may include pairs of arms spaced apart a distance that may be slightly smaller than the portion of the cable to be received within the arms, so that the arms can flex slightly to grip the cable between the arms. However, it should be understood that other structures may be suitable for use as a storage rack 530, including those described in the '965 Application. As noted above, in some embodiments, lid 520 may be provided with tray 510. However, if another storage cassette 500 or patch panel cassette 600 is positioned vertically above storage cassette 500, that overlying cassette may function as a lid for the underlying tray 510, and thus lid 520 may be omitted in some instances. It should be understood that storage cassette 500 may be rotatably coupled to cassette support 370 in the same manner described above in relation to patch panel cassette 600.

Figure 8A:
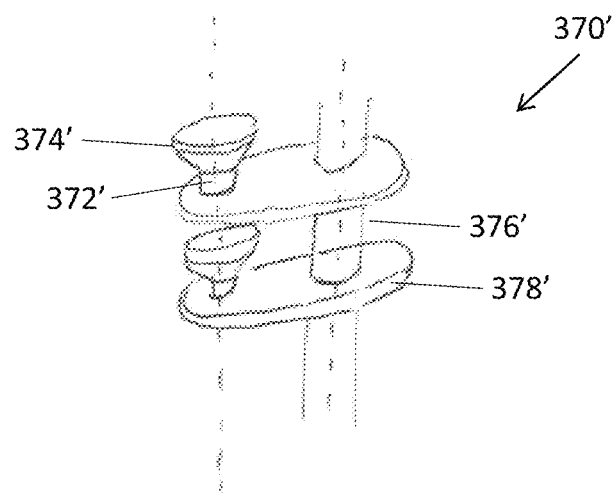
FIG. 8A is a perspective view of a first alternative cassette support.

In the embodiment of cassette support 370 described above, storage cassette(s) and 500 and patch panel cassettes 600 are supported by the cassette support 370 and capable of rotating about a fixed longitudinal axis defined by the cassette support 370 to provide enhanced access to the interior of the cassettes. However, cassette support 370 may have other designs to provide even further enhanced access to the cassettes. For example, FIG. 8A illustrates a portion of an alternate cassette support 370'. Whereas cassette support 370 provides for rotation of the cassettes about a single fixed axis, cassette support 370' allows for rotation about two axes. Generally, cassette support 370' may include a cylindrical bar 376' that extends along a longitudinal axis that is substantially orthogonal to a plane defined by the base of trays 510 and/or 610. The top and/or bottom of cylindrical bar 376' may be fixed to a top surface, bottom surface, or any other desired portion of main cabinet unit 330, although such connection is not illustrated in FIG. 8A. A plurality of platforms 378' may be coupled to cylindrical bar 376' at intervals along the axis of the cylindrical bar 376'. Each platform 378' may have a first end with a circular aperture through which cylindrical bar 376' is positioned so that each platform 378' is individually rotatable about the axis of the cylindrical bar 376'. The second end of each platform 378' may include a cylindrical member 372' extending upward from the platform, the cylindrical member 372' terminating in an enlarged member 374'. The combination of cylindrical member 372' and enlarged member 374' may function in substantially the same fashion as the cylindrical members 372 and intermediate members 374 of cassette support 370. In other words, arcuate recesses 512, 522, 612, 622 may each have a slightly smaller diameter than the cylindrical members 372' so that the cassettes 500, 600 may be snapped onto the cylindrical member 372', with the enlarged member 374' guiding the connection and preventing movement of the cassettes 500, 600 up or down the cylindrical member 372'. The connection of cassettes 500, 600 to the cylindrical members 372' allows the cassettes 500, 600 to rotate about a longitudinal axis extending through the cylindrical members 372', while rotation of the platforms 378' about the cylindrical bar 376' provides for rotation of the cassettes 500, 600 about another second axis. The ability for cassettes 500, 600 to rotate about this second axis may provide for even further enhanced accessibility to the cassettes 500, 600 during installation and/or maintenance of fiber distribution system 300.

Figure 8B:
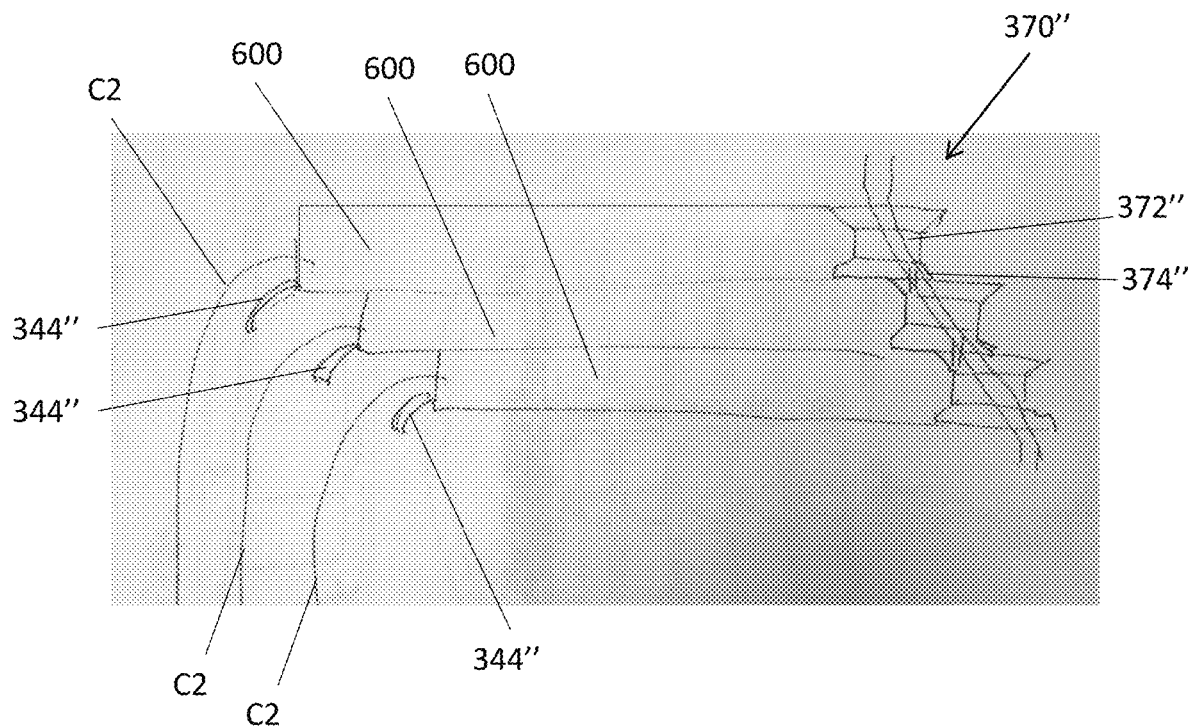
FIG. 8B is a front view of a second alternative cassette support illustrated with associated cassettes and cable guides.

FIG. 8B illustrates a further alternate embodiment of a cassette support 370" that is substantially similar to cassettes support 370, with the main exception being that each group of a cylindrical member 372" and intermediate members 374" positioned above and below the cylindrical member 372" are shifted in the longitudinal direction of the optical fiber distribution system 300 from adjacent groups in the sequence. With this configuration, the left and right ends of each patch panel cassette 600 may be shifted a distance away from the corresponding left and right ends of a vertically adjacent patch panel cassette 600 (or storage cassette 500). The view of the patch panel cassettes 600 in FIG. 8B is a front view of the cassettes when the cassettes are stored within housing 302, providing a similar view as FIG. 5A. Still referring to FIG. 8B, each patch panel cassette 600 (or storage cassette 500) may be connected to, or associated with, a corresponding hanger or cable guide 344", which may assist in supporting cables C2 as well as maintaining a minimum bending radius of the cables C2 as they are routed into patch panel cassette 600.

Figure 9:
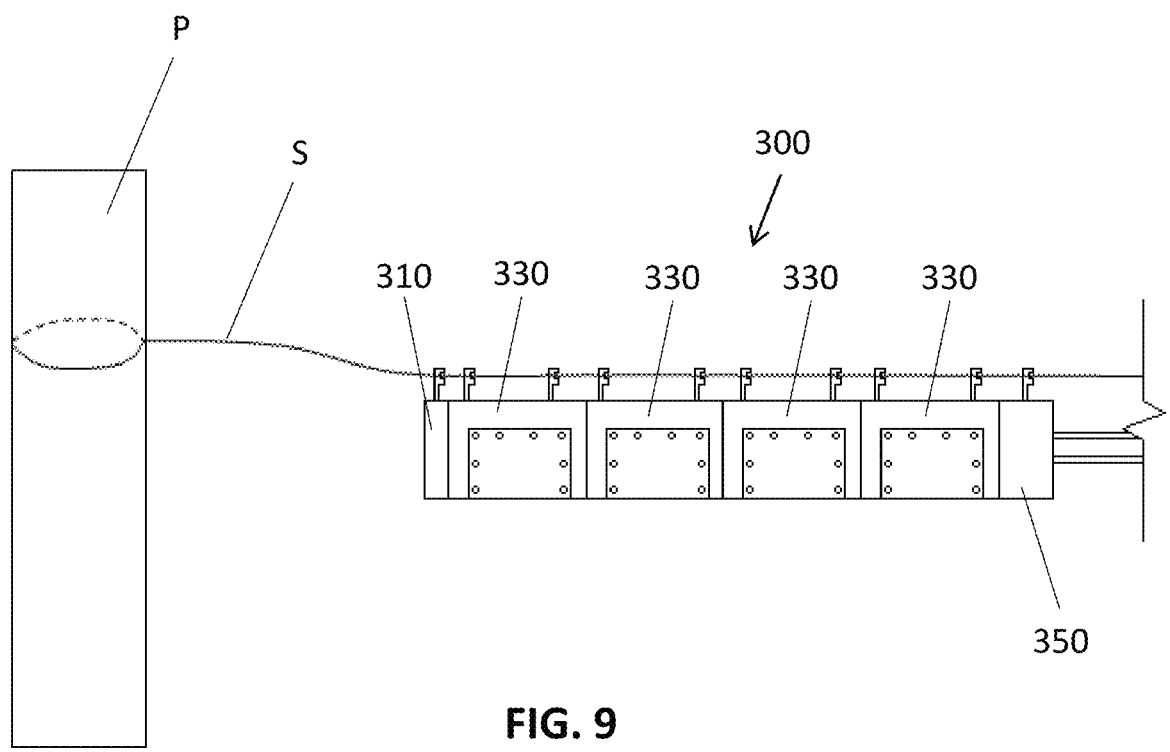
FIG. 9 is a schematic view of the optical fiber distribution system of FIG. 4F that includes a plurality of interconnected main cabinet units.

As noted above, although FIG. 4A illustrates fiber distribution system 300 including a single main cabinet unit 330 between end cap unit 310 and cable termination unit 350, a plurality of man cabinet units 330 may be provided in series between the end cap unit 310 and the cable termination unit 350. FIG. 9 schematically illustrates the inclusion of a plurality of main cabinet units 330 in use in fiber distribution system 300. Although fiber distribution system 300 could be provided with multiple main cabinet units 330 as a pre-configured system, the main cabinet units 330 are preferably stackable so that main cabinet units 330 can be added as necessary. To provide for such stackability, it may be preferable that each main cabinet unit 330 is structurally similar or identical and includes features that assist in locking one main cabinet unit 330 to an adjacent main cabinet unit 330. Although end cap unit 310 and fiber termination unit 350 may include separate structures for attaching to the terminal main cabinet unit(s) 330, it may be preferable that the end cap unit 310 and cable termination unit 350 include corresponding structures for attaching to the main cabinet units 330. For example, in the view of FIG. 9, the right side of each main cabinet unit 330 and the right side of end cap unit 310 may have a first type of connecting structure, while the left side of each main cabinet unit 330 and the left side of the fiber termination unit 350 may have a second type of connecting structure that mates with the first type of connecting structure. Examples of various connecting structures and features are described in greater detail below.

It should be understood that, for FIGS. 10A-G, one or more connection points between two adjacent connected main cabinet units 330 are illustrated. However, as noted above, the same structures may be used to couple end cap unit 310 to the main cabinet unit 330 at a first terminal end of the fiber distribution system 300, as well as to couple fiber termination unit 350 to the main cabinet unit 330 at a second terminal end of the fiber distribution system 300. Also, for the examples in FIGS. 10A-G which only show a single connection point, it should be understood that multiple similar or identical connection points may be provided around the outer circumference of the main cabinet unit 330, the end cap unit 310, and/or the fiber termination unit 350. For example, four connection points may be provided at intervals around the circumference of the particular unit, the connection points preferably being positioned at substantially equal intervals around the circumference. It should further be understood that, in FIGS. 10A-G various connection systems are shown and fasteners such as bolts are described in connection with those figures. Although various types of bolts and fasteners may be appropriate, sealing bolts with O-rings or other gaskets may be a particularly suitable type of fastener, particularly when the fastener is positioned such that it extends between an exterior and interior of the fiber distribution system 300.

Figure 10A:
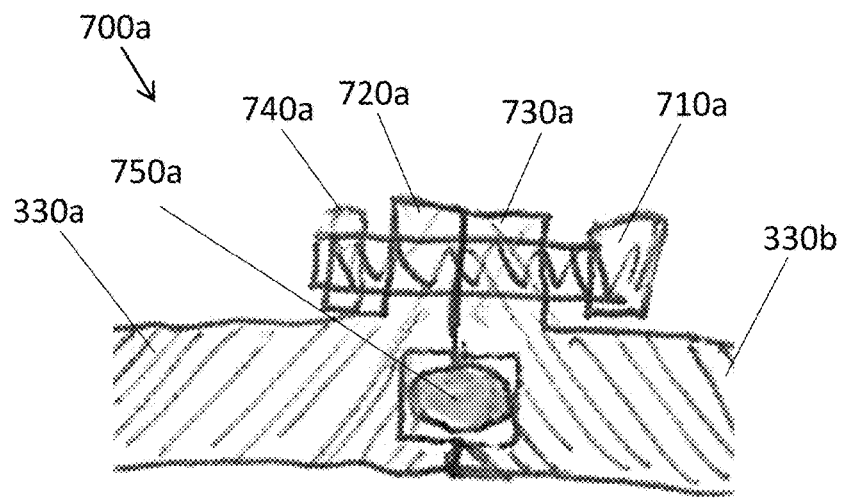
FIGS. 10A-G show alternative connection systems for connecting one of the main cabinet units of FIG. 9 to an adjacent main cabinet unit of FIG. 9.

FIG. 10A illustrates a connection system 700a that may be used with fiber distribution system 300. First unit 330a may be coupled to second unit 330b via a screw or a bolt 710a. In particular, a first end of first unit 330a may have a flange 720a extending radially away from the outer circumference of the first unit 330a. The second unit 330b may include a similar or identical flange 720b extending radially away from the outer circumference of the second unit 330b. Flanges 720a, 730a include apertures that align with each other when the first unit 330a is engaged to the second unit 330b. Bolt 710a may pass through the apertures of the flanges 720a, 730b, and be secured together with a nut 740a. The ends of units 330a, 330b may also include recesses positioned radially inward of the flanges 720a, 730a, the recesses facing one another and receiving a sealing member such as an O-ring 750a therein to help maintain a seal between the units 330a, 330b. One benefit of connection system 700a is the relatively simplicity of the system. However, bolt 710a may be under a large amount of stress in use, and any loosening of the bolt 710a could result in units 330a, 330b losing a seal and/or decoupling from one another.

Figure 10B:
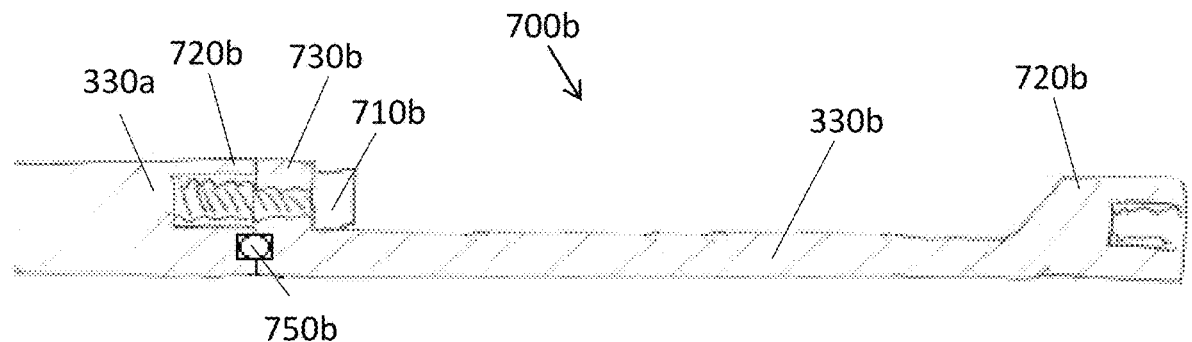

FIG. 10B illustrates an alternate connection system 700b that may be used with fiber distribution system 300. First unit 330a may include a relatively large flange 720b extending radially away from an outer surface of an end of first unit 330a, and second unit 330b may include a relatively small flange 730b extending radially away from an outer surface of an end of second unit 330b. When first unit 330a is engaged to second unit 330b, a recess within flange 720b may align with an aperture in flange 730b. A fastener such as a bolt 710b may pass through the aperture in flange 730b and secure to flange 720b, for example by external threads of the bolt 710b engaging with internal threads within the recess of the flange 720b. The confronting faces of units 330a, 330b may each include a recess radially inward of the corresponding flange 720b, 730b to receive a sealing member, such as an O-ring 750b. It should be understood that the use of the term O-ring herein does not require a specific seal with a circular cross section, but rather includes sealing members having other shapes that perform similar functions to O-rings.

Figure 10C:
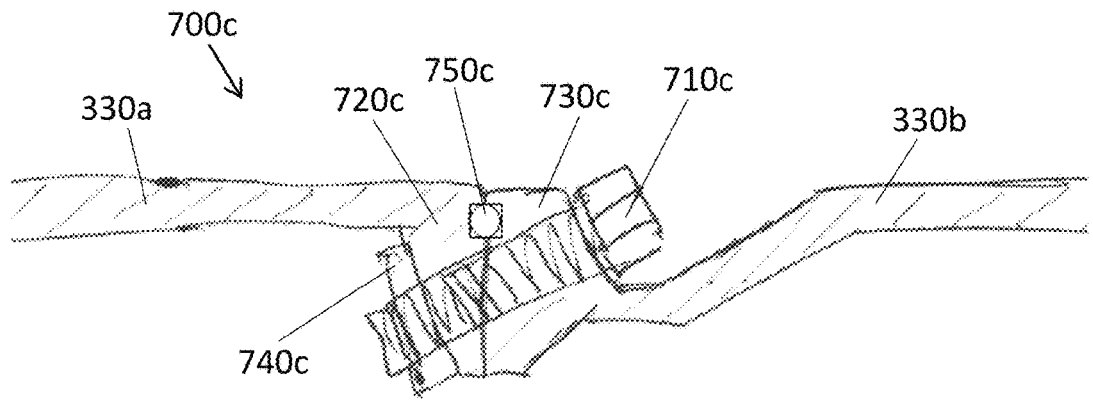

FIG. 10C illustrates an alternate connection system 700c that may be used with fiber distribution system 300. First unit 330a may include a flange 720c extending radially inwardly from an outer surface of an end of first unit 330a, and second unit 330b may include a flange 730c extending radially inwardly from an outer surface of an end of second unit 330b. Flanges 720c and 730c may each include an aperture that extends at on oblique angle so that a fastener such as a bolt 710c may be inserted through flange 730c from the outer surface of second unit 330b, with the bolt 710c exiting the corresponding aperture in flange 720c within the interior of first unit 330a. A recess in the outer surface of second unit 330b adjacent flange 730c may allow for better accessibility of the aperture in flange 730c. The bolt 710c may be secured to the flanges 720c, 730c with external threading mating with internal threading of the flanges and/or internal threading of a nut 740c. As with connection systems 700a and 700b, connection system 700c can include a sealing member such as an O-ring 750c, positioned either radially outwardly of bolt 710c, as shown, or radially inwardly of bolt 710c, for example within recesses of the flanges 720c, 730c.

Figure 10D:
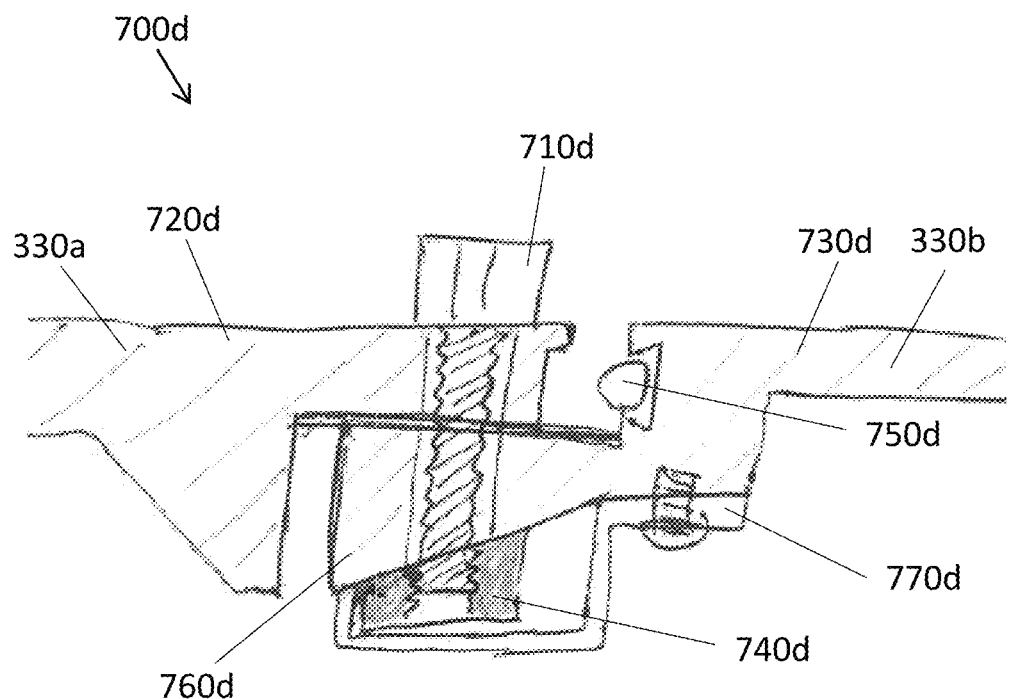
Figure 10E:
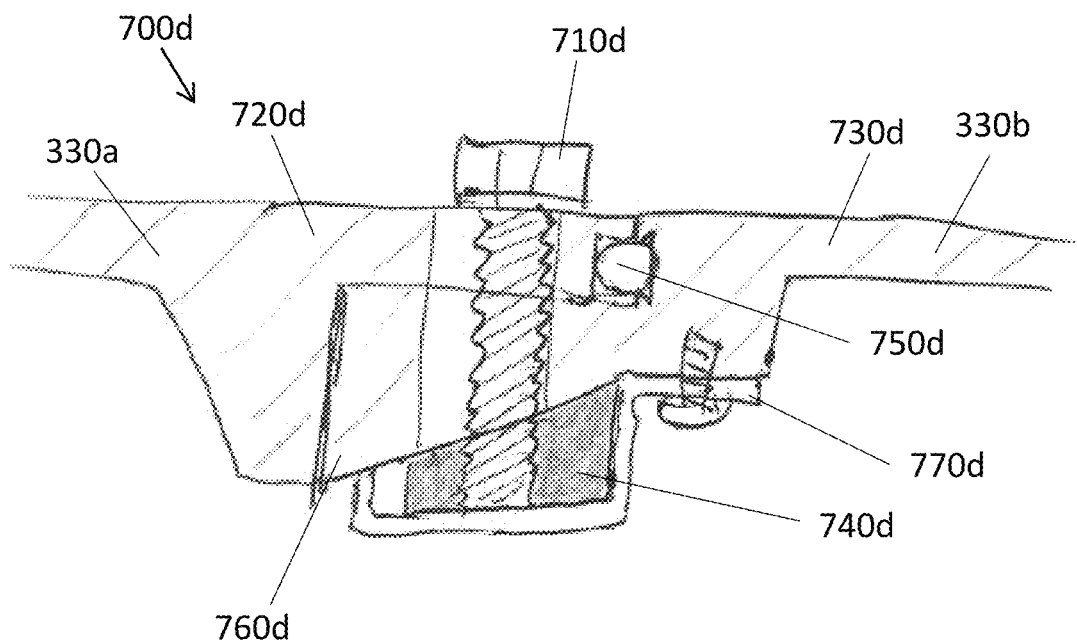

FIG. 10D illustrates another connection system 700d for use with fiber distribution system 300 in an open or unlocked condition, with FIG. 10E illustrating the connection system 700d in a closed or locked condition. First unit 330a may include a flange 720d at an end thereof that is substantially "L"-shaped, one portion of the "L"-shape being substantially flush with the outer surface of first unit 330a, and another portion of the "L"-shape extending radially inward from the outer surface. Second unit 330b may include a flange 730d at an end thereof that is also substantially "L"-shaped, one portion of the "L"-shape extending radially inwardly from the outer surface of the second unit 330b, and another portion of the "L"-shape extending away from the first portion substantially parallel with the outer surface of the second unit 330b. The flanges 720d and 730d may include apertures that be aligned with each other to receive a fastener or bolt 710d therethrough. However, the apertures that receive the bolt 710d are preferably significantly larger than the diameter of the threaded portion of the bolt 710d. Flange 730d may include a ramped surface 760d that is ramped at an oblique angle. A wedge member 740d may have a ramped surface in engagement with the ramped surface 760d of flange 730d. The wedge member 740d may include an interior thread or other mating surface to engage an exterior thread or other corresponding mating surface of bolt 710d. In some embodiments, wedge member 740d may be supported by a bracket 770d or other support member, which may be coupled to an inner surface of flange 730d by a fastener such as a screw. In order to seal the first unit 330a to the second unit 330b, the bolt 710d may be rotated. Bolt 710d does not need to mate with the apertures in flanges 720d, 730d, but rather with an aperture in wedge member 740d. As the bolt 710d rotates, it causes wedge member 740d to translate along the length of the bolt 710d toward a top end of the bolt 710d, placing a compression force on the flanges 720d, 730d. Because of the angle of the ramped surface 760d and the wedge member 740d, the compression force causes the bolt 710d and wedge member 740d to move to the right in the view of FIGS. 10D-E, causing a corresponding movement of flange 730d to the left. The bolt 710d may be rotated until facing surfaces of the flanges 720d, 730d engage or contact each other, with a sealing member such as an O-ring 750d being compressed. Although bolt 710d is illustrated in FIGS. 10D-E with threading along an entire length of its shaft, it should be understood that only the distal end that engages wedge member 740d needs to have threading. Further, although the apertures in flanges 720d, 730d are described as being significantly wider than the diameter of the shaft of the bolt 710d, it should be understood that the width of the apertures may only need to be as wide as necessary to allow for the shaft of the bolt 710d to translate with the wedge member 740d as the connection system is transitioned from the open or unlocked condition of FIG. 10D to the closed or locked condition of FIG. 10E.

Figure 10F:
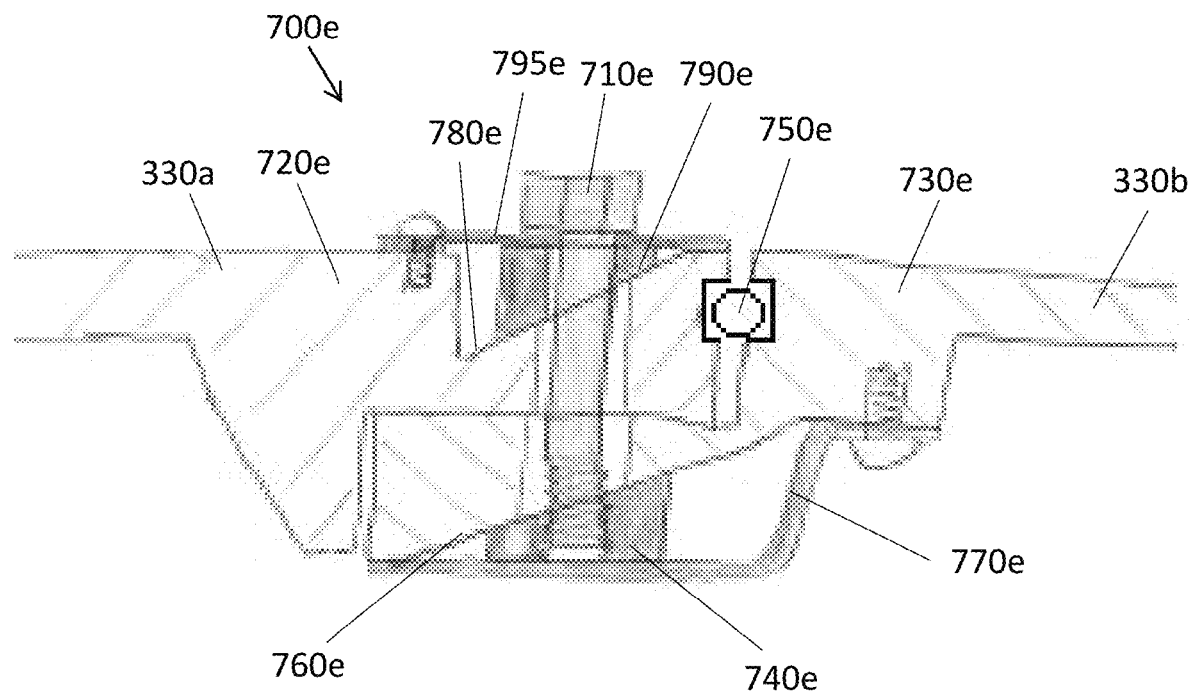

FIG. 10F illustrates another connection system 700e similar to connection system 700d in an open or unlocked condition. Connection system 700e may include a flange 730e on second unit 330b that is substantially the same as that described above in connection with FIGS. 10D-E, with a similar ramped surface 760e that engages a ramped surface of a wedge member 740e supported by a bracket 770e. Flange 720e of first unit 330a may be substantially similar to flange 720d, with the exception that it includes a ramped surface 780e in engagement with a corresponding ramped surface of another wedge member 790e. Wedge member 790e may be supported or otherwise kept in place by another bracket 795e that may be fastened to an outer surface of first unit 330a. As with connection system 700d, the apertures in the flanges 720e, 730e may be larger or wider than the diameter of the shaft of bolt 710e. Upon rotating bolt 710e, wedge member 740e may translate upwardly in the view of FIG. 10F, with wedge member 790e translating downwardly in the view of FIG. 10F. The two wedge members 740e, 790e apply compression forces to the two ramped surfaces 760e, 780e to cause the first unit 330a and the second unit 330b to be forced against each other. It should be understood that the aperture in wedge member 790e through which bolt 710e preferably is unthreaded, so that rotation of bolt 710e only causes wedge member 740e to translate upwardly. A sealing member such as an O-ring 750e may be provided at the interface between flange 720e and flange 730e to help provide an enhanced seal upon closing or locking of connection system 700e.

Figure 10G:
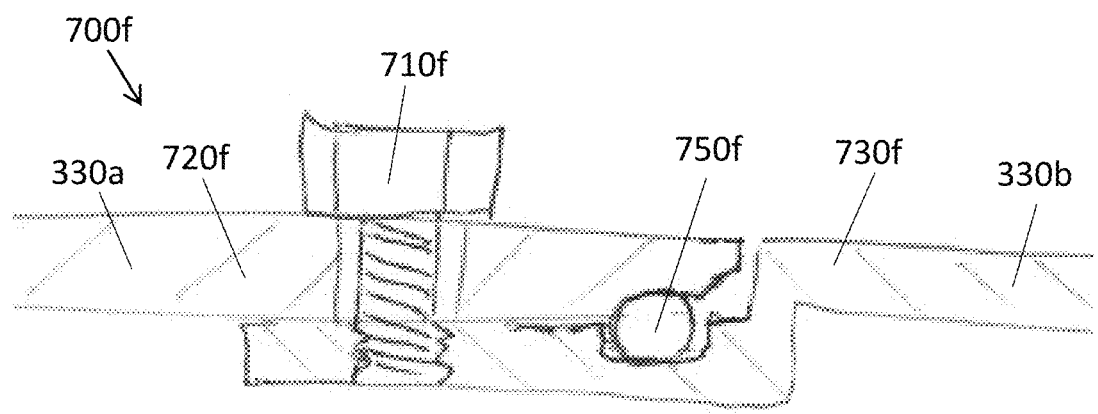

FIG. 10G illustrates another embodiment of a connection system 700f. An end of first unit 330a may include a flange 720f that is an extension of the first unit 330a which includes an aperture therein. A flange 730f may be positioned at an end of second unit 330b, flange 730f being substantially "L"-shaped with a first portion of the "L"-shape extending radially inward from the outer surface of second member 330b, a second portion of the "L"-shape extending from the first portion and being substantially parallel to the outer surface of second unit 330b. To obtain a closed condition of the connection system 700f, apertures in flanges 720f and 730f of the first and second units 330a, 330b may be aligned by moving flange 730f to the left in the view of FIG. 10G, with the lower portion of flange 730f passing over and compressing O-ring 750f, until an aperture in flange 730f aligns with a corresponding aperture in flange 720f. With the apertures so aligned, bolt 710f may be passed through the apertures. The aperture in flange 730f may be internally threaded so that rotation of bolt 710f pulls the flange 730f upward in the view of FIG. 10G to flange 720f, such that a closed condition of the connection system 700 is obtained. However, it should be understood that the main sealing effect may be provided by moving flange 730f to the left in the view of FIG. 10G, with the bolt 710f mainly functioning to keep flange 730f in the desired position relative to flange 720f to provide that the O-ring 750f is compressed between the flanges 720f and 730f. The terminal end of flange 720f and a portion of the second portion of the "L"-shape of flange 730f may include recesses to receive a sealing member, such as O-ring 750f, therein.

Figure 11A:
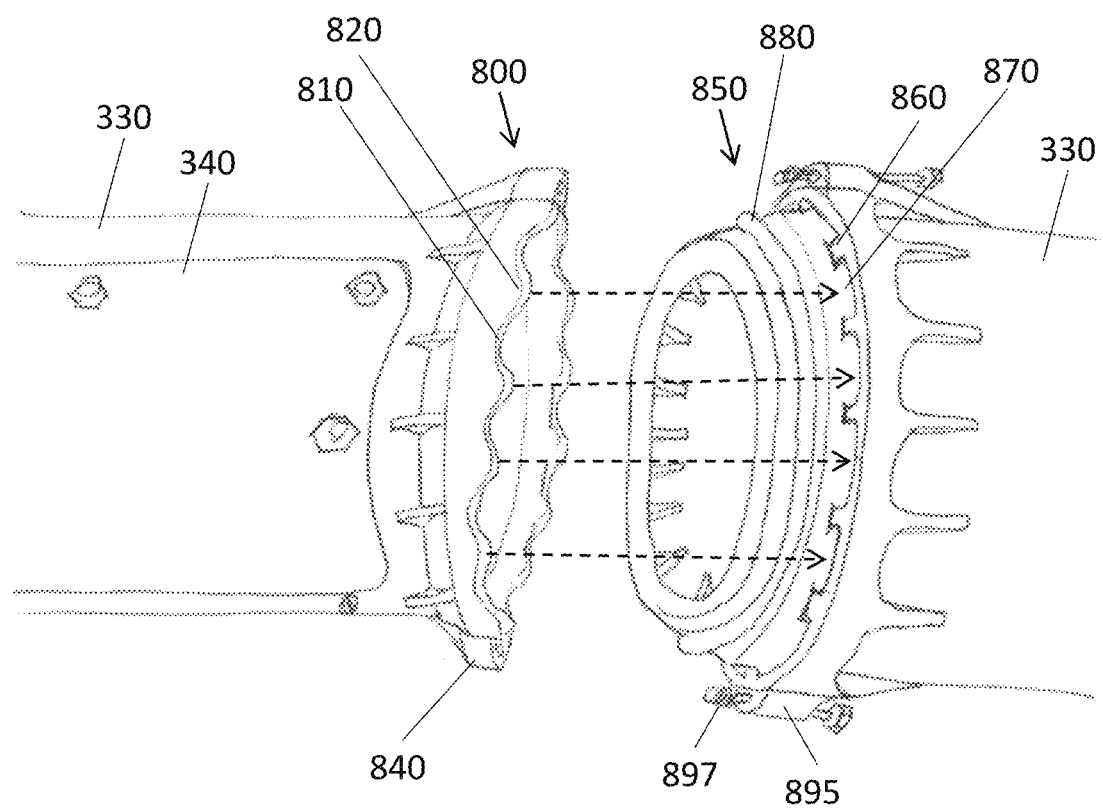
FIG. 11A is a perspective view of two ends of adjacent main cabinet units spaced apart from one another.

FIG. 11A shows additional features that may be provided on ends of main cabinet units 330 (or otherwise on end cap unit 310 or fiber termination unit 350) to assist coupling main cabinet units 330 to one another in series (or otherwise for coupling the end cap unit 310 or fiber termination unit 350 to a main cabinet unit 330). FIG. 11A illustrates a first end 800 of a first main cabinet unit 330 and a second end 850 of another identical main cabinet unit 330, the first end 800 adapted to engage the second end 850 to couple the main cabinet units 330 together. First end 800 may include a circumferential rim which may have a diameter that is slightly larger than the diameter of the main body of main cabinet unit 330, the circumferential rim including a series of arcuate recesses 810 alternating with a series of arcuate protrusions 820. Second end 850 may also include a circumferential rim having a larger diameter than the diameter of the main body of main cabinet unit 330, although the circumferential rim of second end 850 is preferably spaced apart from the terminal end of second end 850. The circumferential rim of second end 850 may include a plurality of ribs 860 extending radially inward from the circumferential rim to connect to the outer surface of the main body of main cabinet unit 330. Adjacent pairs of ribs 860 may form recesses 870, along with the outer surface of main cabinet unit 330 and the inner surface of the circumferential rim of second end 850. As indicated by the broken arrows in FIG. 11A, each protrusion 820 of first end 850 may be sized and shaped to be positioned within the recesses 870 between adjacent ribs 860 when the first end and second end are arranged longitudinally aligned with each other. Thus, the number of protrusions 820 is preferably equal to the number of recesses 860. Further, although not illustrated in FIG. 11A, the ribs 860 may include arcuate surfaces that correspond to the arcuate shape of the protrusions 820 and recesses 810.

Figure 11B:
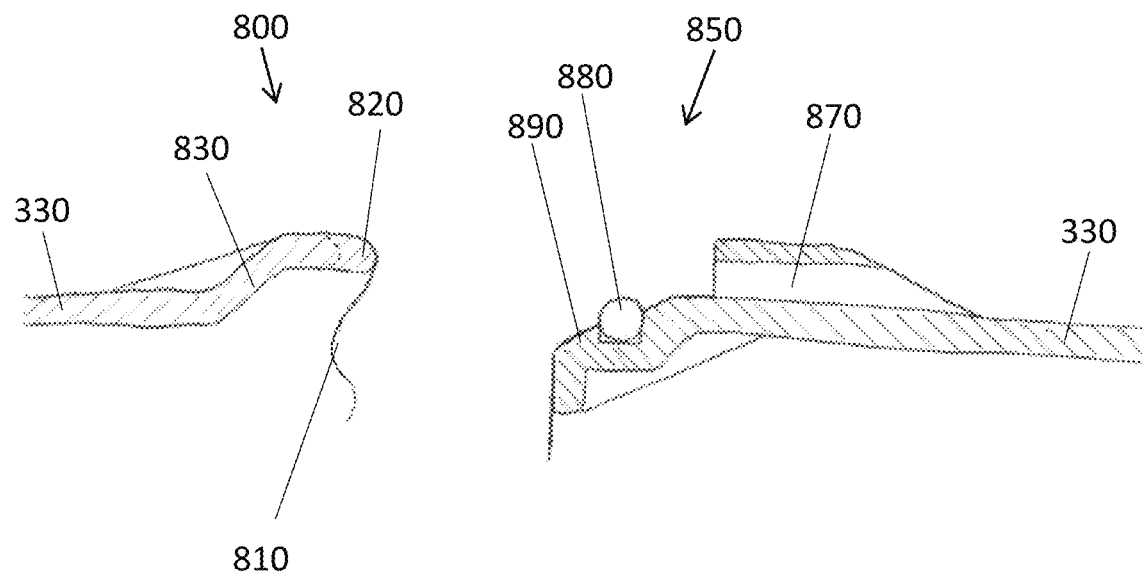
FIG. 11B is a sectional view of the two ends of the adjacent main cabinet units of FIG. 11A.

FIG. 11B illustrates an enlarged cross-section of first end 800 spaced apart from second end 850. As can be seen particularly well in FIG. 11B, the first end 800 includes a transition section 830 that transitions to a larger diameter between the main body of main cabinet unit 330 and the terminal end of first end 800 that includes the recesses 810 and protrusions 820. Similarly, second end 850 may include a corresponding transition section 890 that transitions between the relatively large diameter of the main body of main cabinet unit 330 to the terminal end of second end 850. The inner surface of transition section 830 may be angled at about 30 degrees relative to the inner surface of the main body of main cabinet unit 330. The exterior surface of transition section 890 may be angled at an angle substantially equal to the angling of the exterior surface of transition section 830. In other words, for example, the exterior surface of transition section 890 may be angled about 30 degrees relative to the exterior surface of the main body of main cabinet unit 330. Transition section 890 may include a recess or groove, which may extend along the entire perimeter of second end 850, which is configured to receive a sealing member such as O-ring 880. Preferably, when second end 850 is spaced apart from first end 800, O-ring 880 protrudes a distance above the exterior surface of transition section 890.

Figure 11C:
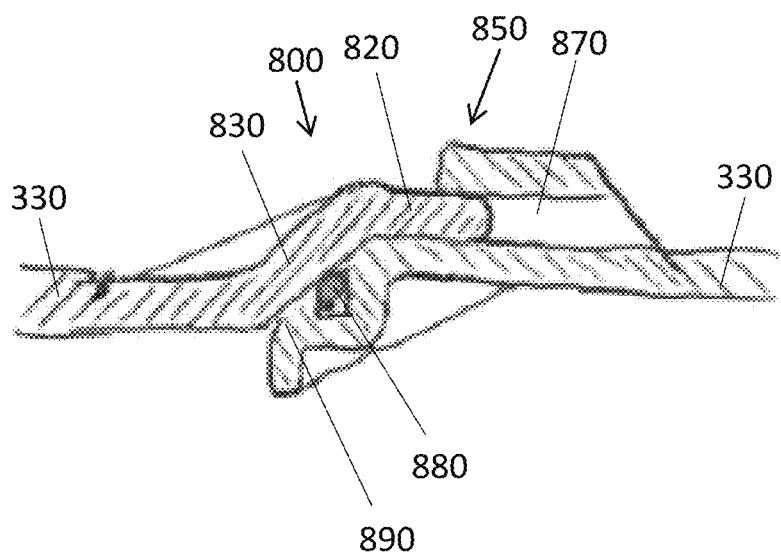
FIG. 11C is a sectional view of the two ends of the adjacent main cabinet units of FIG. 11A in a connected relationship.

As shown in FIG. 11C, first end 800 may be coupled to second end 850 by inserting protrusions 820 into corresponding recesses 870. As illustrated, when the first end 800 is coupled to the second end 850, the inner surface of transition section 830 confronts the outer surface of transition section 890, causing compression of O-ring 880. When protrusion 820 is received within recess 870, the protrusion need not extend entirely through recess 870. In one example, the protrusions 820 are about 5 mm long. The thickness of the main body of main cabinet unit 330 may be about 5 mm, or in other words about equal to the length of the protrusions 820.

Referring back to FIG. 11A, first end 800 may be additionally secured to second end 850 with additional fasteners. In the illustrated embodiment, the first end 800 may include a plurality of flanges 840 spaced around the circumference of the first end 800 and extending radially outward therefrom. Each flange 840 may include an aperture which may be internally threaded. Similarly, the second end 850 may include a plurality of flanges 895 spaced around the circumference of the second end 850 and extending radially outward therefrom. Each flange 895 may include an aperture therein through which a fastener, such as a bolt 897, is positioned. Bolt 897 may be captive, for example by having opposite ends that are too large to a pass through the aperture in flange 895, to ensure that the bolt 897 does not decouple from the second end 850 unintentionally. Flanges 840 and flanges 895 may be spaced at substantially equal intervals around the circumference of the first end 800 and second end 850, respectively. Although two flanges 840 and two flanges 895 are shown in FIG. 11A, it should be understood that more than two of each flange may be provided, although the number of flanges 840 preferably is equal to the number of flanges 895 and the flanges are preferably positioned so that, when first end 800 is coupled to second end 850, each flange 840 aligns with a corresponding flange 895, so that bolt 897 may be inserted into corresponding flanges 840 to further secure first end 800 to second end 850.

Figure 11D:
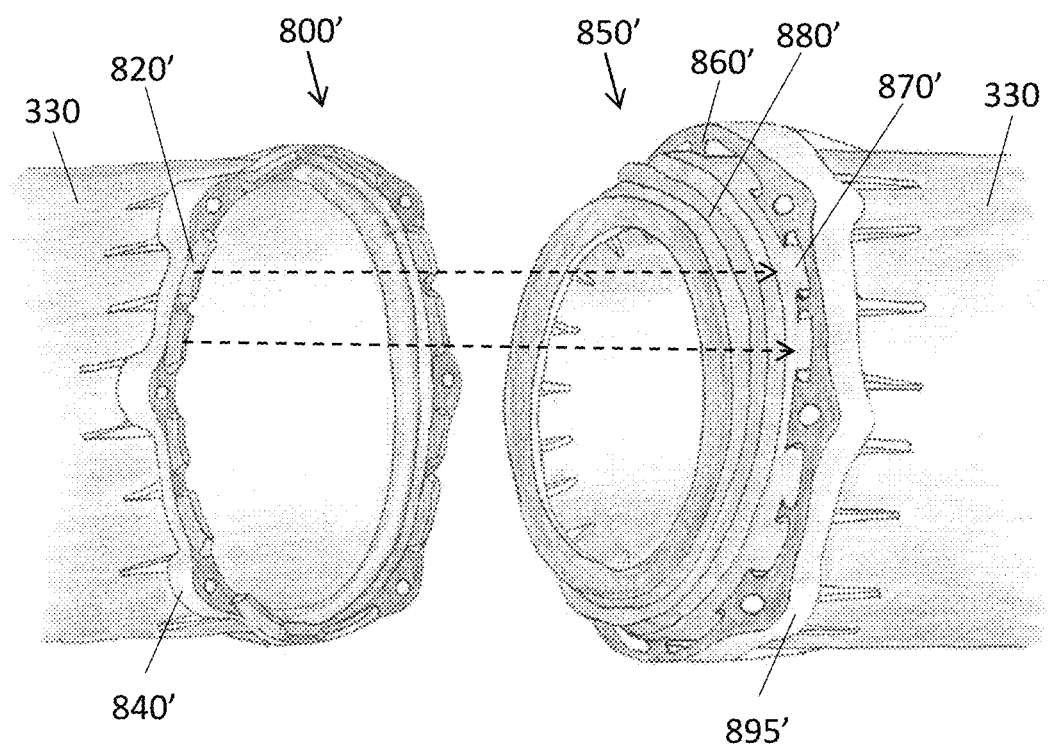
FIG. 11D is a perspective view of two ends of adjacent main cabinet units, according to another embodiment of the disclosure, spaced apart from one another

FIG. 11D shows an alternate embodiment of the additional features shown and described in connection with FIGS. 11A-C. The features shown in FIG. 11D represent features on ends of main cabin units 330 (or otherwise on end cap unit 310 or fiber termination unit 350) to assist in coupling main cabinet units 330 to one another in series (or otherwise for coupling the end cap unit 310 or fiber termination unit 350 to a main cabinet unit 330). FIG. 11D illustrates a first end 800' of a first main cabinet unit 330 and a second end 850' of another identical main cabinet unit 330, the first end 800' adapted to engage the second end 850' to couple to the main cabinet units 330 together. First end 800' may include a circumferential rim which may have a diameter that is slightly larger than the diameter of the main body of main cabinet unit 330, the circumferential rim including a series of arcuate protrusions 820' spaced apart from one another along the perimeter of the circumferential rim, the protrusions 820' extending toward second end 850' when the two main cabinet units 330 are coupled to one another. Second end 850' may also include a circumferential rim having a larger diameter than the diameter of the main body of main cabinet unit 330, although the circumferential rim of second end 850 is preferably spaced apart from the terminal end of second end 850'. The circumferential rim of second end 850' may include a plurality of ribs 860' extending radially inward from the circumferential rim to connect to the outer surface of the main body of main cabinet unit 330. Adjacent pairs of ribs 860' may form recesses 870', along with the outer surface of main cabinet unit 330 and the inner surface of the circumferential rim of second end 850'. As indicated by the broken arrows in FIG. 11D, each protrusion 820' of first end 850' may be sized and shaped to be positioned within the recesses 870' between adjacent ribs 860'. Thus, the number of protrusions 820' is preferably equal to the number of recesses 860'.

Figure 11E:
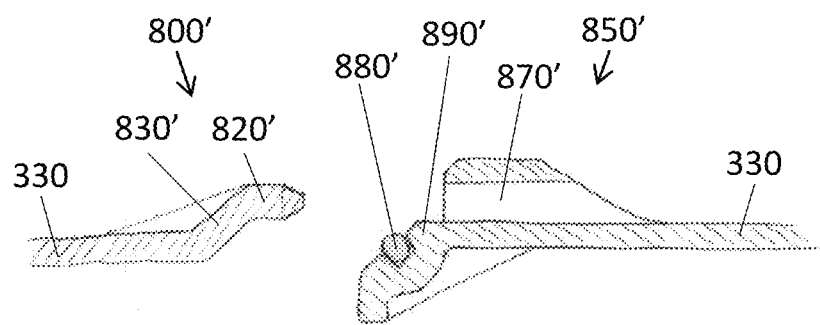
FIG. 11E is a sectional view of the two ends of the adjacent main cabinet units of FIG. 11D.

FIG. 11E illustrates an enlarged cross-section of first end 800' spaced apart from second end 850'. As can be seen particularly well in FIG. 11E, the first end 800' includes a transition section 830' that transitions to a larger diameter between the main body of main cabinet unit 330 and the terminal end of first end 800' that includes the protrusions 820'. Similarly, second end 850' may include a corresponding transition section 890' that transitions between the relatively large diameter the main body of main cabinet unit 330 to the terminal end of second end 850'. The inner surface of transition section 830' may be angled at about 30 degrees relative to the inner surface of the main body of main cabinet unit 330. The exterior surface of transition section 890' may be angled at angle substantially equal to the angling of exterior surface of transition section 830'. In other words, for example, the exterior surface of transition section 890' may be angled about 30 degrees relative to the exterior surface of the main body of main cabinet unit 330. Transition section 890' may include a recess or groove, which may extend along the entire perimeter of second end 850', which is configured to receive a sealing member such as O-ring 880'. Preferably, when second end 850' is spaced apart from first end 800', O-ring 880' protrudes a distance above the exterior surface of transition section 890'.

Figure 11F:
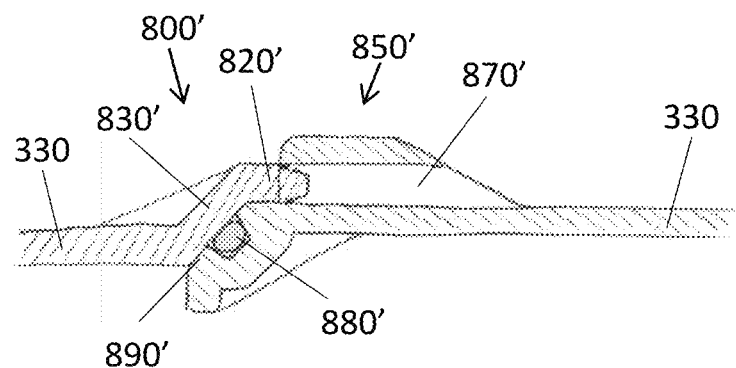
FIG. 11F is a sectional view of the two ends of the adjacent main cabinet units of FIG. 11D in a connected state.

As shown in FIG. 11F, first end 800' may be coupled to second end 850' by inserting protrusions 820' into corresponding recesses 870'. As illustrated, when the first end 800' is coupled to the second end 850', the inner surface of transition section 830' confronts the outer surface of transition section 890', causing compression of O-ring 880'. When protrusion 820' is received within recess 870', the protrusion need not extend entirely through recess 870'. In one example, protrusions 820' include a tapered section that tapers to a smaller diameter toward the tip, where the tapered section is about 5 mm in length and the only portion of protrusion 820' received in recess 870'. The thickness of the main body of main cabinet unit 330 may also be about 5 mm, or in other words about equal to the length of the tapered sections of protrusions 820'.

Referring back to FIG. 11D, first end 800' may be additionally secured to second end 850' with additional fasteners. In the illustrated embodiment, the first end 800' may include a plurality of flanges 840' spaced around the perimeter of the first end 800' and extending radially outward therefrom. Each flange 840' may include an aperture which may be internally threaded. Similarly, the second end 850' may include a plurality of flanges 895' spaced around the perimeter of the second end 850' and extending radially outward therefrom. Each flange 895' may include an aperture therein through which a fastener, such as a bolt, is positioned. The bolt may be captive, for example by having opposite ends that are too large to a pass through the aperture in flange 895', to ensure that the bolt does not decouple from the second end 850' unintentionally. Flanges 840' and flanges 895' may be spaced at substantially equal intervals around the perimeter of the first end 800' and second end 850', respectively. The number of flanges 840' preferably is equal to the number of flanges 895' and the flanges are preferably positioned so that, when first end 800' is coupled to second end 850', each flange 840' aligns with a corresponding flange 895', so that a fastener or bolt may be inserted into corresponding flanges 840' to further secure first end 800' to second end 850'.

Figure 11G:
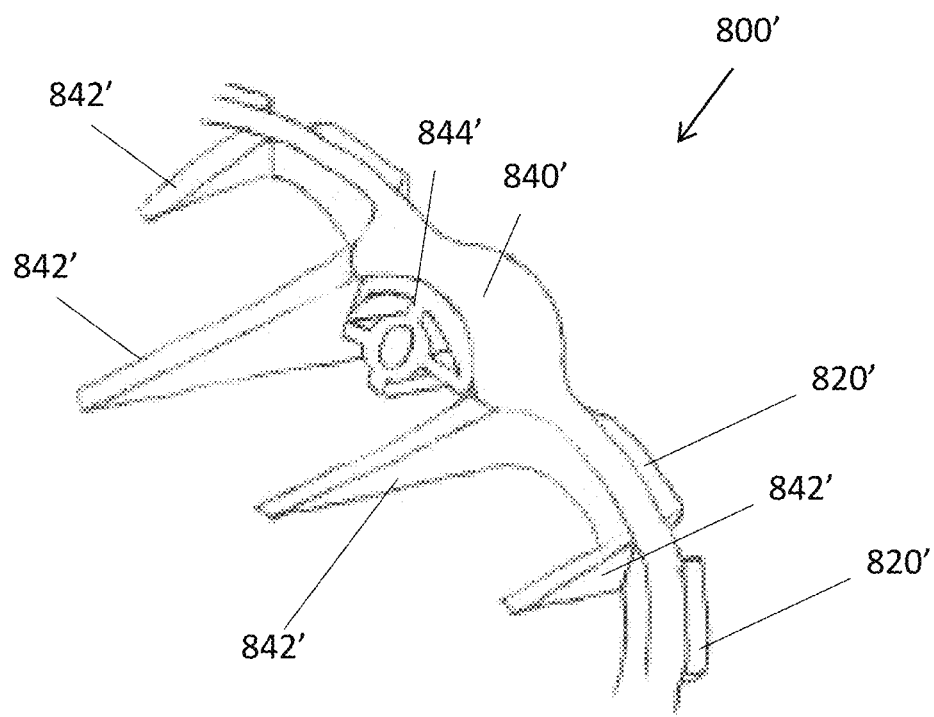
FIG. 11G is a perspective view of support structures that may be provided on one or both of the ends of a main cabinet unit of FIG. 9.
Figure 11H:
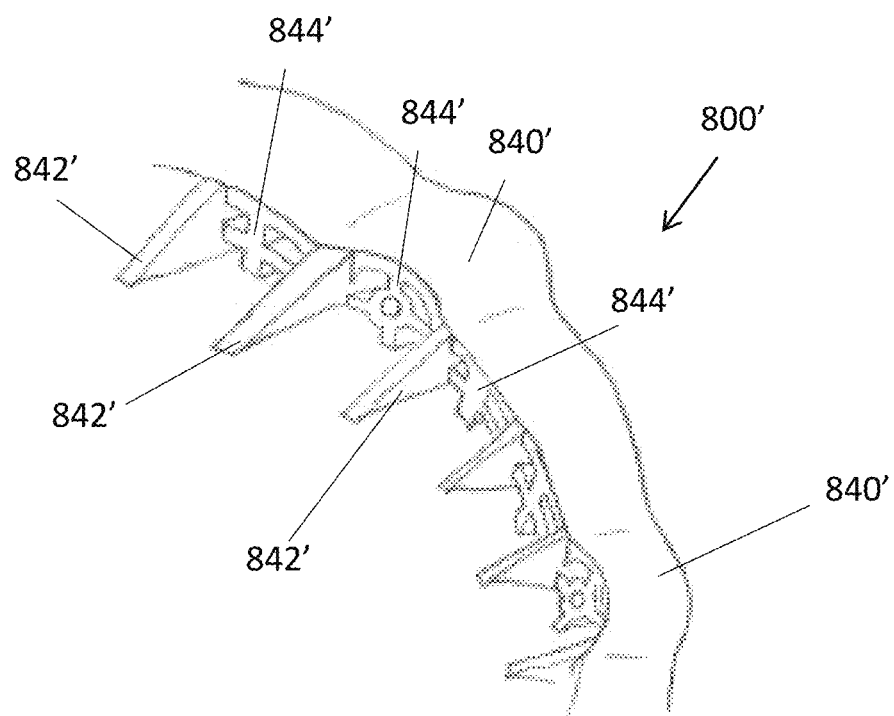
FIG. 11H is a perspective view of additional support structures that may be provided on one or both of the ends of a main cabinet unit of FIG. 9

Referring now to FIGS. 11D and 11G, flanges 840' may include ribs 842', such as substantially triangular ribs, that extend from the outer surface of main cabinet unit to circumferentially opposite ends of the flanges 840'. The aperture formed within flange 840' may be coupled to the flange 840' by additional supporting ribs 844'. When a fastener couples flanges 895' to flanges 840', it may be important that, based on such coupling by the fastener, a strong compressive force is exerted on the O-ring 880' in order to enhance the seal between first end 800' and second end 850'. As a result, flange 840' (as well as flanges 895') may experience significant stress, with both ribs 842' and ribs 844' providing additional strength to account for the stresses on the flanges. Ribs 842', or ribs similar in structure to ribs 842', may be provided on other portions of the circumferential rim of first end 800', for example adjacent protrusions 820' which may also experience stress upon coupling of first end 800' to second end 850'. FIG. 11H illustrates that additional ribs 844' may be provided to connect portions of the outer circumferential rim of first end 800' to the outer surface of the main cabinet unit 330, not only where flanges 840' are present, but on portions of the circumferential rib between adjacent flanges 840'. Ribs 844' may function to provide additional support to help withstand compression forces resulting from the fasteners coupling the flanges 895' to flanges 840' on the O-ring 880'. It should be understood that, although FIGS. 11G and 11H refer to first end 800', similar or identical structures may be provided in connection with the flanges 895' and/or on the ribs 860' adjacent recesses 870' in order to provide additional strength and stability to the circumferential rim of the second end 850'.

Figure 12A:
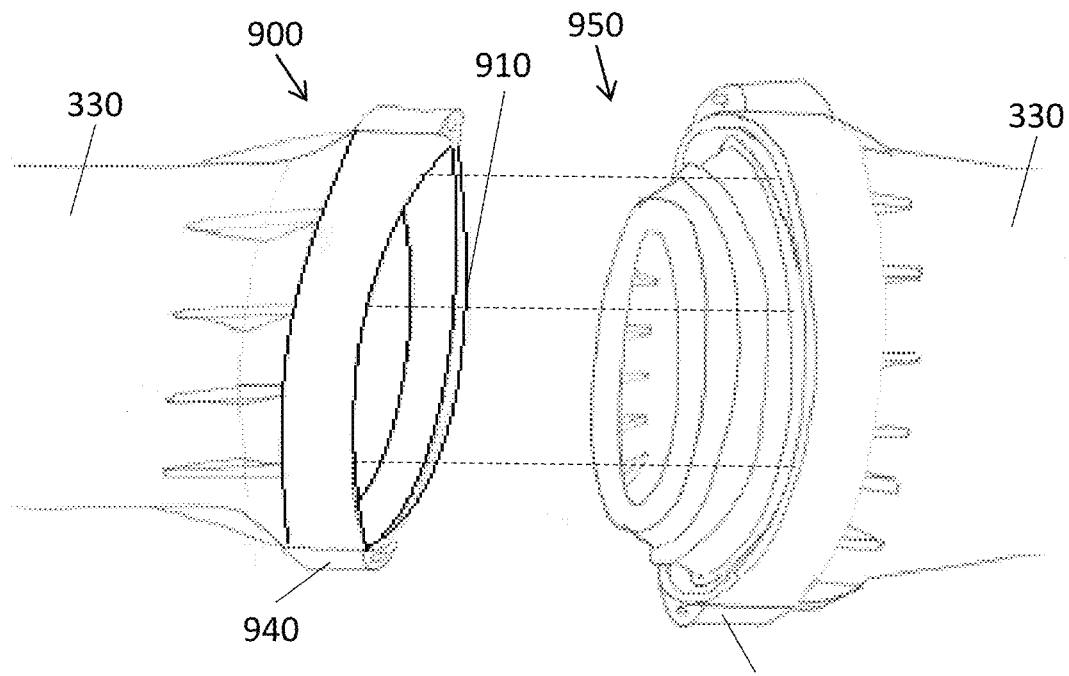
FIG. 12A is a perspective view of another embodiment of two ends of adjacent main cabinet units spaced apart from one another.
Figure 12B:
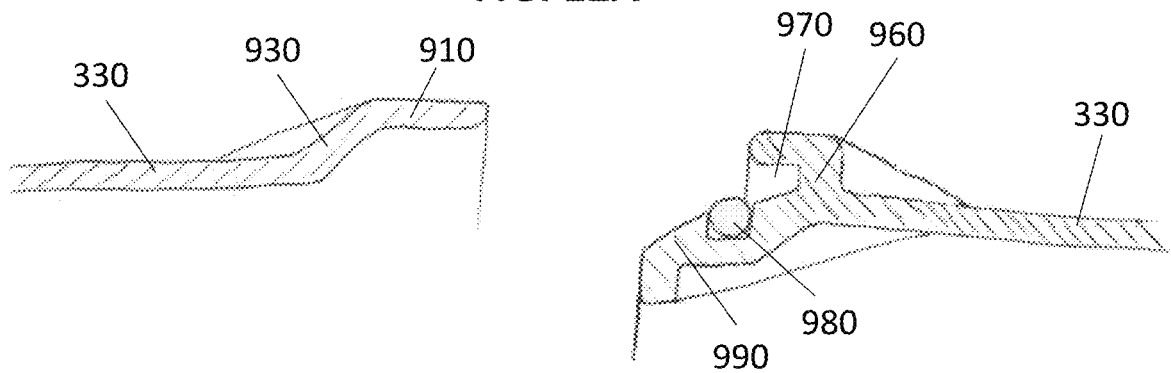
FIG. 12B is a sectional view of the two ends of the adjacent main cabinet units of FIG. 12A.
Figure 12C:
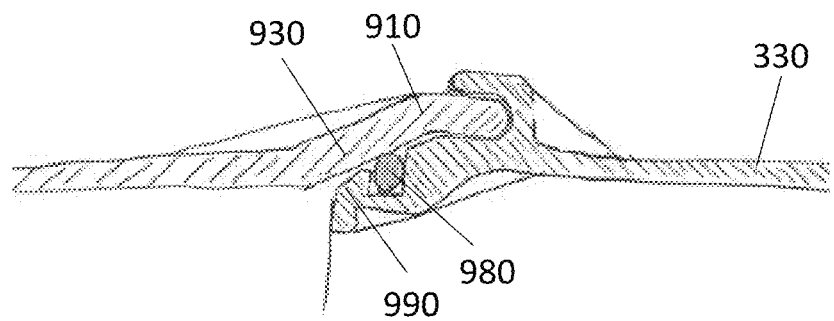
FIG. 12C is a sectional view of the two ends of the adjacent main cabinet units of FIG. 12A in a connected state.

FIGS. 12A-C illustrate an alternate version of ends 900, 950 of main cabinet units 300 (or otherwise ends of end cap unit 310 and/or cable termination unit 350) that are similar to ends 800, 850 in most respects, such that similar or identical features are not described in significant detail again here. Whereas end 800 includes alternating arcuate recesses 810 and arcuate projections 820, end 900 includes a similar circumferential rim but with a substantially straight edge 910. Straight edge 910 may be thought of as a continuous protrusion compared to the alternating protrusions 820 of first end 800. The main body of main cabinet unit 330 may include a transition section 930 angled at about 30 degrees, similar to transition section 830. Whereas second end 850 includes a plurality of spaced apart recesses 870, second end 950 may include an outer circumferential rim attached to the main body of main cabinet unit 330 by a continuous circumferential rib 960 defining a continuous circumferential recess 970. As with end 850, end 950 may have a transition section 990 that extends at an angle of about 30 degrees to a smaller diameter terminal end, with a circumferential recess to receive O-ring 980 therein. When first end 900 is coupled to second end 950, as shown in FIG. 12C, edge 910 is received within the circumferential recess 970, compressing O-ring 980 to enhance the seal formed by the two ends. Referring again to FIG. 12A, end 900 may include a plurality of flanges 940, and end 950 may include a corresponding plurality of flanges 995, which may be similar or identical to flanges 840 and 895 described above. Although fasteners such are bolts are not illustrated in FIG. 12A, it should be understood that fasteners such as bolts, including bolts 897, may be used to secure flanges 995 to flanges 940.

Figure 13A:
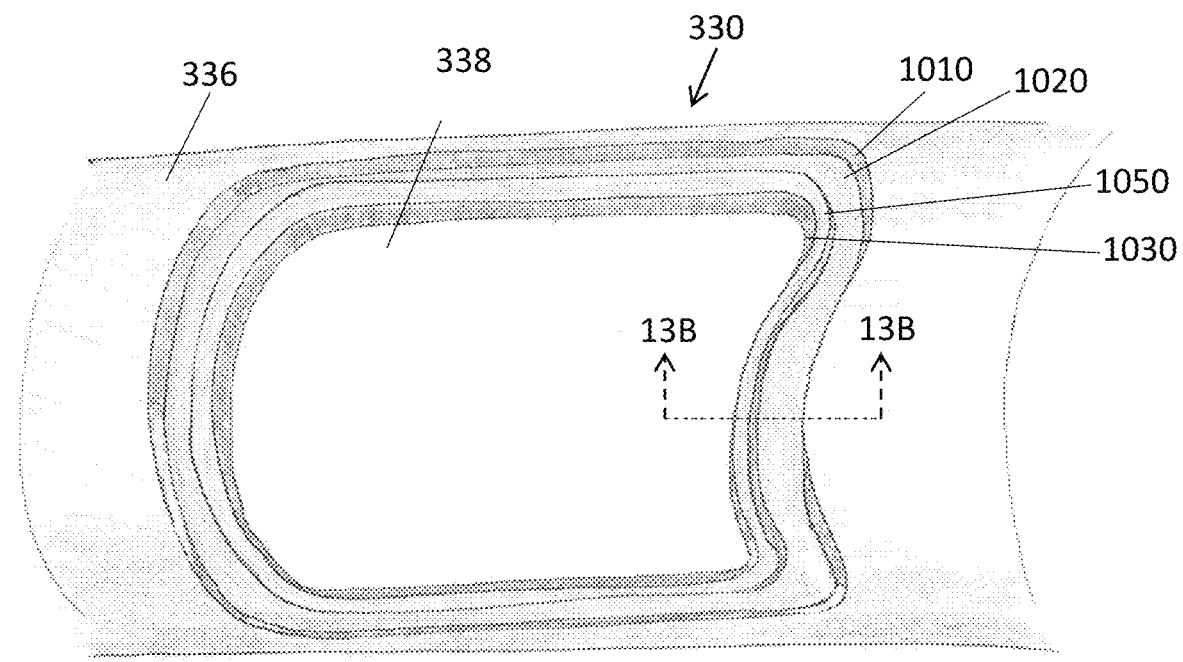
FIG. 13A is a perspective view of a portion of a main body of a main cabinet unit.
Figure 13B:
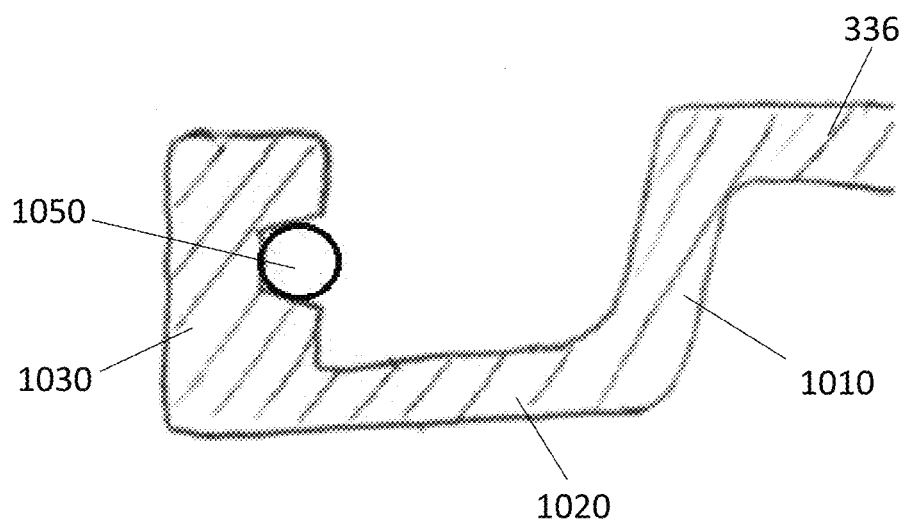
FIG. 13B is a cross-section of a portion of the main body of FIG. 13A at cross-sectional line 13B-13B.
Figure 13C:
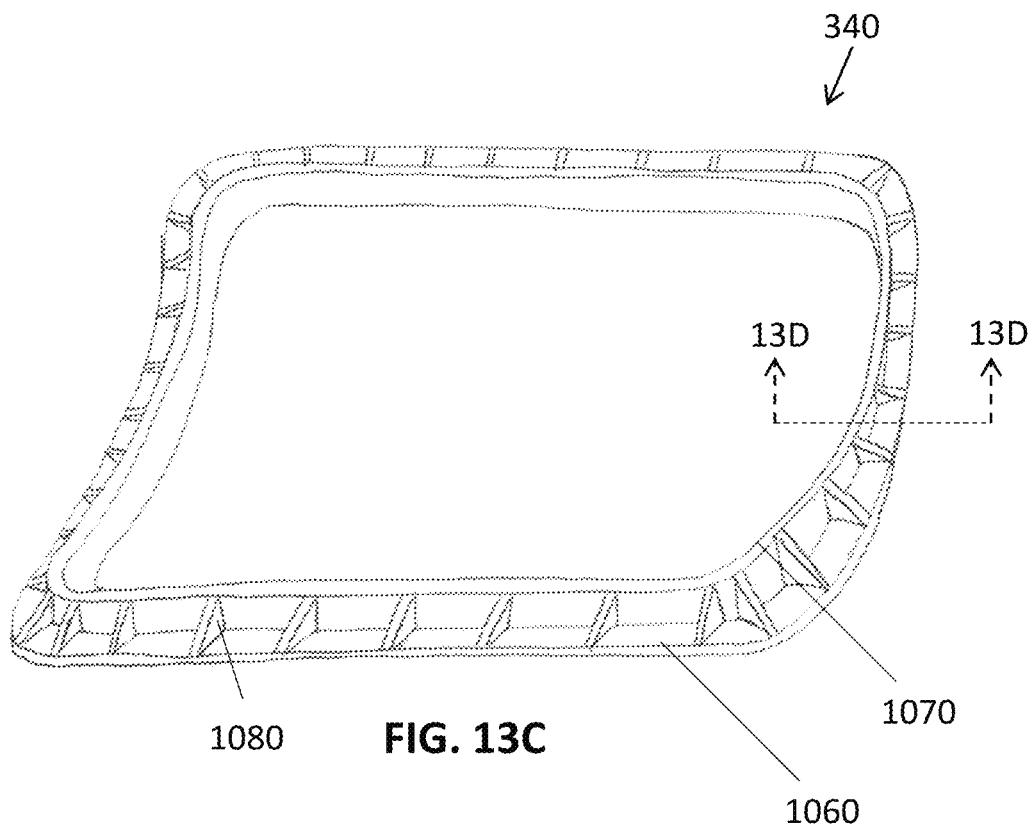
FIG. 13C is a perspective view of a door that may be used in conjunction with the main body of the main cabinet unit of FIG. 13A.

FIG. 13A illustrates an embodiment of the portion of main cabinet unit 330, including main body 336 and opening 338, with which door 340 interacts. Door 340, which is illustrated in isolation in FIG. 13C, is omitted from FIG. 13A for purposes of clarity. Similarly, certain structures for coupling door 340 to main cabinet unit 330, such as hinges and locking mechanisms, are omitted from FIGS. 13A and 13C. FIG. 13B illustrates a cross-section of main body 336 along the line 13B-13B of FIG. 13A. Referring now to FIGS. 13A-B, main body 336 may have a first transition section 1010 that extends radially inward toward the longitudinal center of main cabinet unit 330, although transition section need not be perfectly orthogonal to the main body 336, but may rather have an oblique angle with respect to the main body 336. An extension section 1020 may extend from transition section 1010, the extension section 1020 being substantially parallel to the portion of main body 336 from which it extends. A lip 1030 may extend radially outwardly and substantially orthogonally from extension section 1020, so that the free end of lip 1030 is positioned a similar radial distance as main body 336 from the longitudinal center of main cabinet unit 330. Lip 1030 may include a recess in which a sealing member, such as O-ring 1050, is received.

Figure 13D:
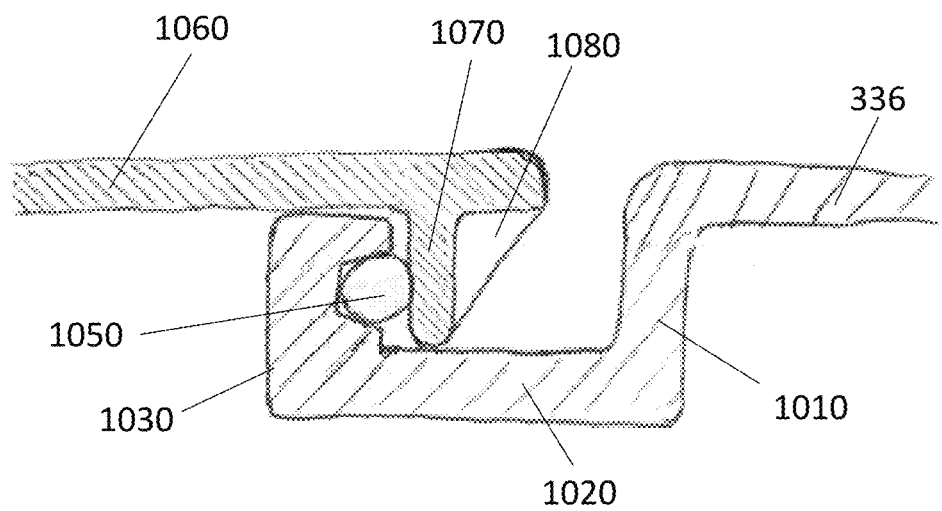
FIG. 13D is a cross-section of a portion of the door of FIG. 13C at cross-sectional line 13D-13D connected to the portion of the main body of FIG. 13B.

FIG. 13C illustrates an embodiment of door 340, and FIG. 13D illustrates a cross-section of door 340 taken along line 13D-13D of FIG. 13C while the door 340 is engaged with the main cabinet 330, which is also shown in cross-section taken along the line 13B-13B of FIG. 13A. Door 340 may include a main body 1060 that has a shape generally corresponding to the shape of the opening 338 of main cabinet unit 330. An interior lip 1070 may extend substantially orthogonally from the main body 1060, and may extend along a continuous circumference, the lip 1070 being positioned a spaced distance from the outer circumference of main body 1060. A plurality of substantially triangular ribs 1080 may extend from a free end of lip 1070 toward the outer circumferential edge of main body 1060 to provide additional support to the door 340. As shown in FIG. 13D, when door 340 is in the closed condition, the lip 1070 of door 340 is positioned adjacent to the lip 1030 of the main body 336 of main cabinet unit 330, with O-ring 1050 compressed between the two lips 1030, 1060, enhancing the seal formed between the door 340 and the main cabinet unit 330. Although a space is illustrated in FIG. 13D between the terminal edge of main body 1060 of door 340 and the point at which main body 336 transitions to transition section 1010, it should be understood that less or no space may be provided between those two elements. It should be understood that the configuration of door 340 and main body 336 of main cabinet unit 330 shown and described in connection with FIGS. 13A-13D may be used with any of the main cabinet units 330 and doors 340 described herein.

Figure 13E:
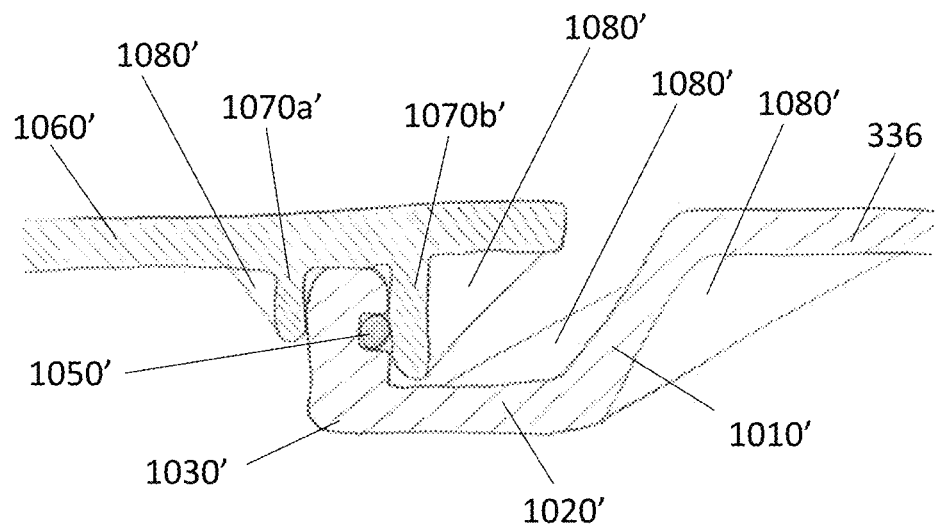
FIGS. 13E-F are cross-sections of a portion of alternative versions of the door of FIG. 13C connected to portions of alternative versions of the main body of FIG. 13B.
Figure 13F:
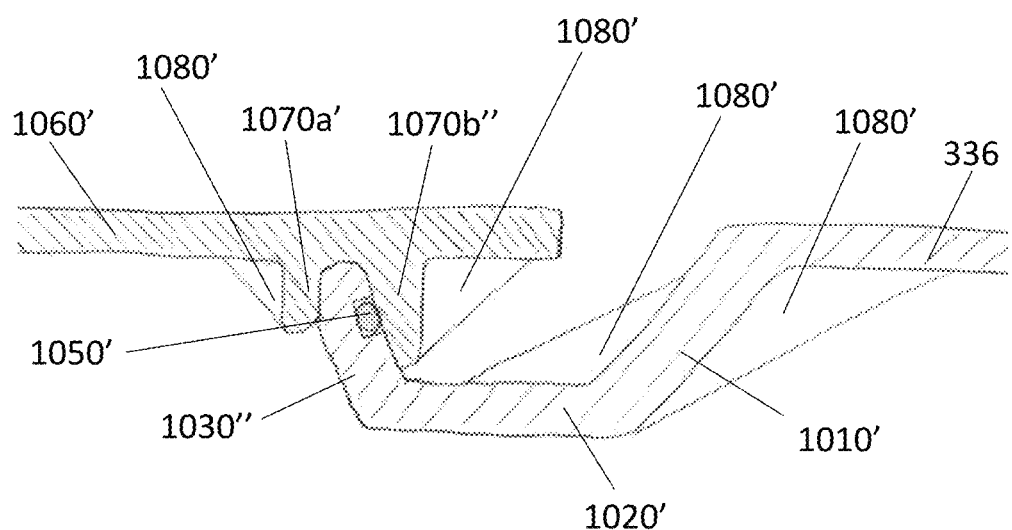

FIGS. 13E-F show cross-sections of alternative versions of the door 340 engaged to alternative versions of the main body portion 336, in views similar to that shown in FIG. 13D. In FIG. 13E, main body 1060' of door 340 includes a first interior lip 1070a' and a second interior lip 1070b' spaced apart from one another and extending in an inward direction substantially orthogonal to main body 1060'. First interior lip 1070a' may have a length that is smaller than second interior lip 1070b', but the lengths could alternatively be about equal. Main body 336 includes a first transition section 1010' extending at an oblique angle inwardly, and a second transition section 1020' extending from the first transition section 1010'. Second transition section 1020' may be substantially parallel to the main body section 336 from which first transition section 1010' extends. A lip 1030' may extend outwardly from the end of the second transition section 1020', the lip 1030' being substantially orthogonal to the second transition section 1020'. Lip 1030' may include a recess to receive a sealing member 1050', such as an O-ring, therein. It should be understood that sealing member 1050' may be continuous and positioned along a perimeter of lip 1030' formed by the recess of the lip 1030'. In the closed or engaged condition illustrated, lip 1030' is received in the space bounded by first interior lip 1070a', second interior lip 1070b', and the portion of main body 1060' extending between the two interior lips. When engaged, second interior lip 1070b' may compress sealing member 1050' to enhance the seal created by the engagement of the door 340 with the main body 336 of the main cabinet unit 330. As with other embodiments described herein, one or more ribs 1080', which may be substantially triangular, may be provided on or near the terminal end of door 340 and/or the terminal end of the main body portion 336 to provide additional strength to those members, particularly when they are engaged with each other. FIG. 13F is nearly identical to FIG. 13E, and thus only the differences are described below. In particular, lip 1030" may be angled obliquely relative to second transition member 1020', as opposed to substantially orthogonally as described in connection with lip 1030'. Similarly, second interior lip 1070b" may include at least one face that is angled obliquely relative to the portion of main body 1060', where the face may be the face that confronts first interior lip 1070a' when the door 340 is engaged to the main body portion 336. The angled face of second interior lip 1070b" may be at an angle to substantially match the angle of the corresponding face of lip 1030", so that when the door 340 is in the closed or engaged condition with respect to the main body portion 336, the angled face of second interior lip 1070b" engages the corresponding face of lip 1030" and compresses the sealing member 1050' to enhance the seal. It should be understood that, similar to second interior lip 1070b", first interior lip 1070a' may include an obliquely angled face that corresponds to any portion of lip 1030" with which it engages, even though first interior lip 1070a' is not shown with an angled portion that is at an oblique angle relative to the portion of main body 1060' in FIG. 13E.

Figure 14A:
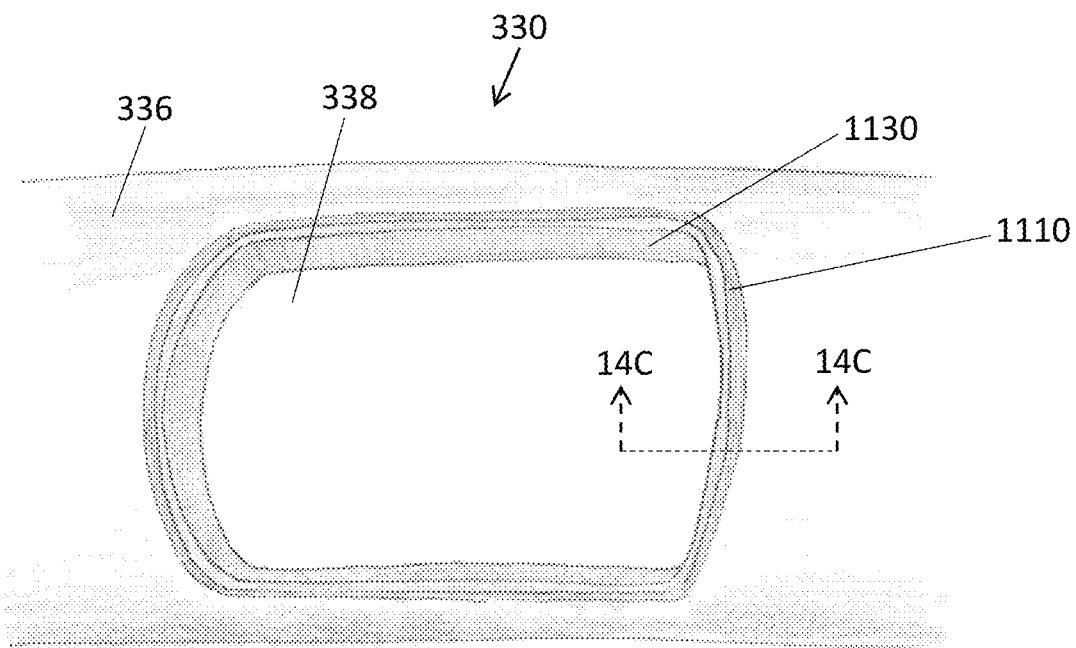
FIG. 14A is a perspective view of another embodiment of a portion of a main body of a main cabinet unit.
Figure 14B:
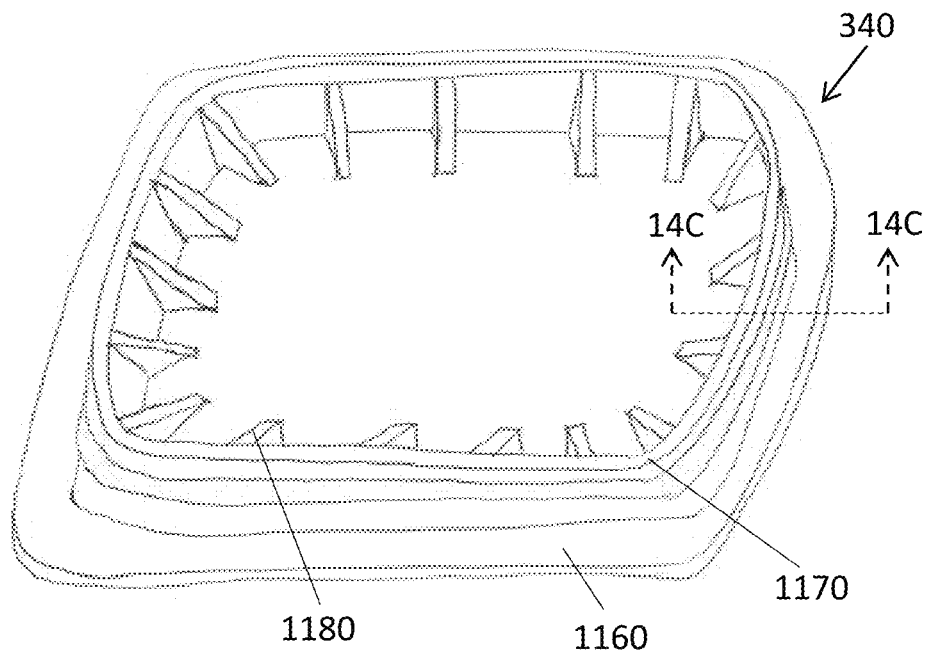
FIG. 14B is a perspective view of a door that may be used in conjunction with the main body of the main cabinet unit of FIG. 14A.
Figure 14C:
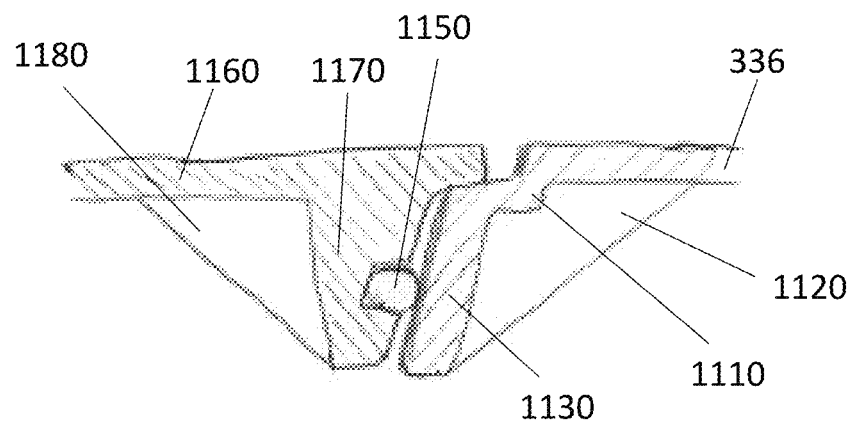
FIG. 14C is a cross-section of a portion of the door of FIG. 14C connected to a portion of the main body of FIG. 14A.

FIG. 14A illustrates another embodiment of the portion of main cabinet unit 330, including main body 336 and opening 338, with which door 340 interacts. Door 340, which is illustrated in isolation in FIG. 14B, is omitted from FIG. 14A for purposes of clarity. Similarly, certain structures for coupling door 340 to main cabinet unit 330, such as hinges and locking mechanisms, are omitted from FIGS. 14A and 14B. FIG. 14C illustrates a cross-section of main body 336 and door 340, when the two components are engaged with one another in a closed condition, along the lines 14C-14C of FIGS. 14A-B.

Main body 336 may have an "L"-shaped transition section 1110 that extends radially inward toward the longitudinal center of main cabinet unit 330, and then extends substantially parallel to main body 336. A lip 1130 may extend radially inwardly and substantially orthogonally from transition section 1110. It should be understood that transition section 1110 need not be perfectly "L"-shaped or orthogonal, and lip 1130 may extend at an oblique angle relative to main body 336. A plurality of substantially triangular ribs 1120 may connect between main body 336 and the free end of lip 1130 to provide enhanced stability to the structure. Door 340 may include a main body 1160 that has a shape generally corresponding to the shape of the opening 338 of main cabinet unit 330. An interior lip 1170 may extend substantially orthogonally from the main body 1160, and may extend along a continuous circumference, the lip 1170 being positioned a spaced distance from the outer circumference of main body 1160. A plurality of substantially triangular ribs 1180 may extend from a free end of lip 1170 to main body 1160, in a direction away from the outer circumferential edge of main body 1160, to provide additional support to the door 340. As shown in FIG. 14C, the outer surface of lip 1170 may be angled obliquely away from the outer edge of main body 1160, and include a recessed portion therein to receive a sealing member, such as O-ring 1150. When door 340 is in the closed condition, the lip 1170 of door 340 is positioned adjacent to the lip 1130 of the main body 336 of main cabinet unit 330, with O-ring 1150 compressed between the two lips 1130, 1160, enhancing the seal formed between the door 340 and the main cabinet unit 330. It should be understood that the configuration of door 340 and main body 336 of main cabinet unit 330 shown and described in connection with FIGS. 14A-14C (as well as those described below in connection with FIGS. 14D-F) may be used with any of the main cabinet units 330 and doors 340 described herein.

Figure 14D:
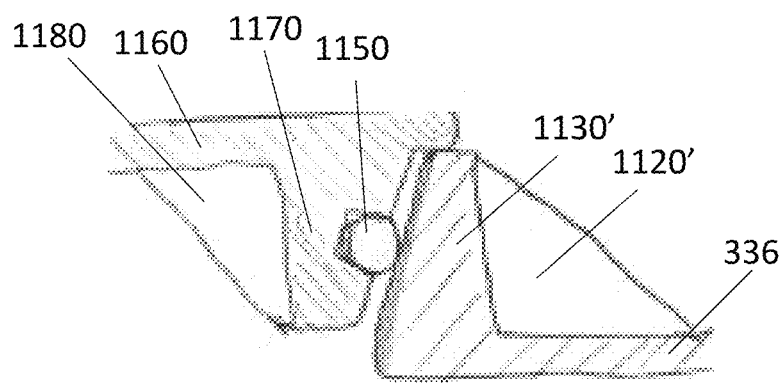
FIG. 14D is a cross-section of a portion of the door of FIG. 14C connected to an alternate embodiment of a portion of a main body.

FIG. 14D illustrates a view of the door 340 of FIG. 14A engaged with a main body 336 having certain variations compared to that shown in FIG. 14C, with the remaining features being identical or substantially identical and thus not described here again. Main body 336 of FIG. 14D includes a lip 1130' that extends radially outwardly from a terminal edge of main body 336, instead of radially inwardly as with lip 1130. Lip 1130' may include an exterior surface that is obliquely angled with respect to the inner surface of main body 336 at an angle that is near orthogonal. A plurality of substantially triangular ribs 1120' may extend from the exterior surface of main body 336 and connect at or near the free edge of lip 1130' to provide additional support to the structure. The ribs 1120' of FIG. 14D may be easier to produce from a manufacturing standpoint compared to ribs 1120 for FIG. 14C. In the closed or locked condition of door 340, O-ring 1150 is sandwiched between lip 1170 and lip 1130' to provide enhanced sealing.

Figure 14E:
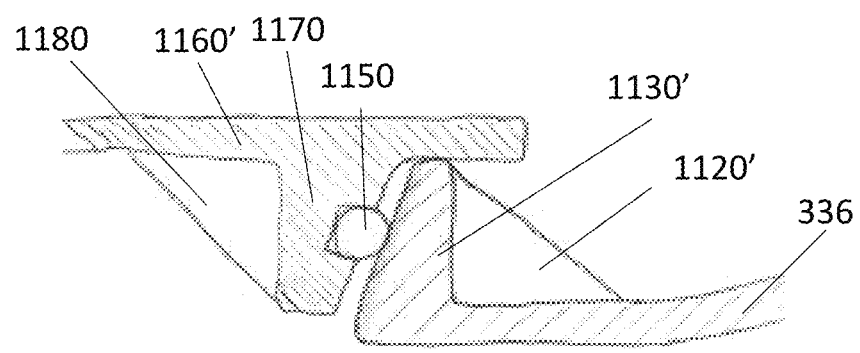
FIG. 14E is a cross-section of an alternate embodiment of a door connected to the portion of the main body of FIG. 14D.

FIG. 14E illustrates a view of the main body 336 of FIG. 14D engaged with a door 340 having certain variations compared to that shown in FIGS. 14A-D, with the remaining features being identical or substantially identical and thus not described here again. The door of FIG. 14E may be identical to the door of FIG. 14D, with the only exception being that main body 1160' extends farther beyond lip 1170, so that the terminal edge of main body 1160' overhangs lip 1130' of main body 336 when main body 336 is engaged with the door 340. This additional distance of main body 1160' of door 340 may help keep water, for example from rain, from penetrating the seal formed between the door 340 and the main body 336 of main cabinet unit 330.

Figure 14F:
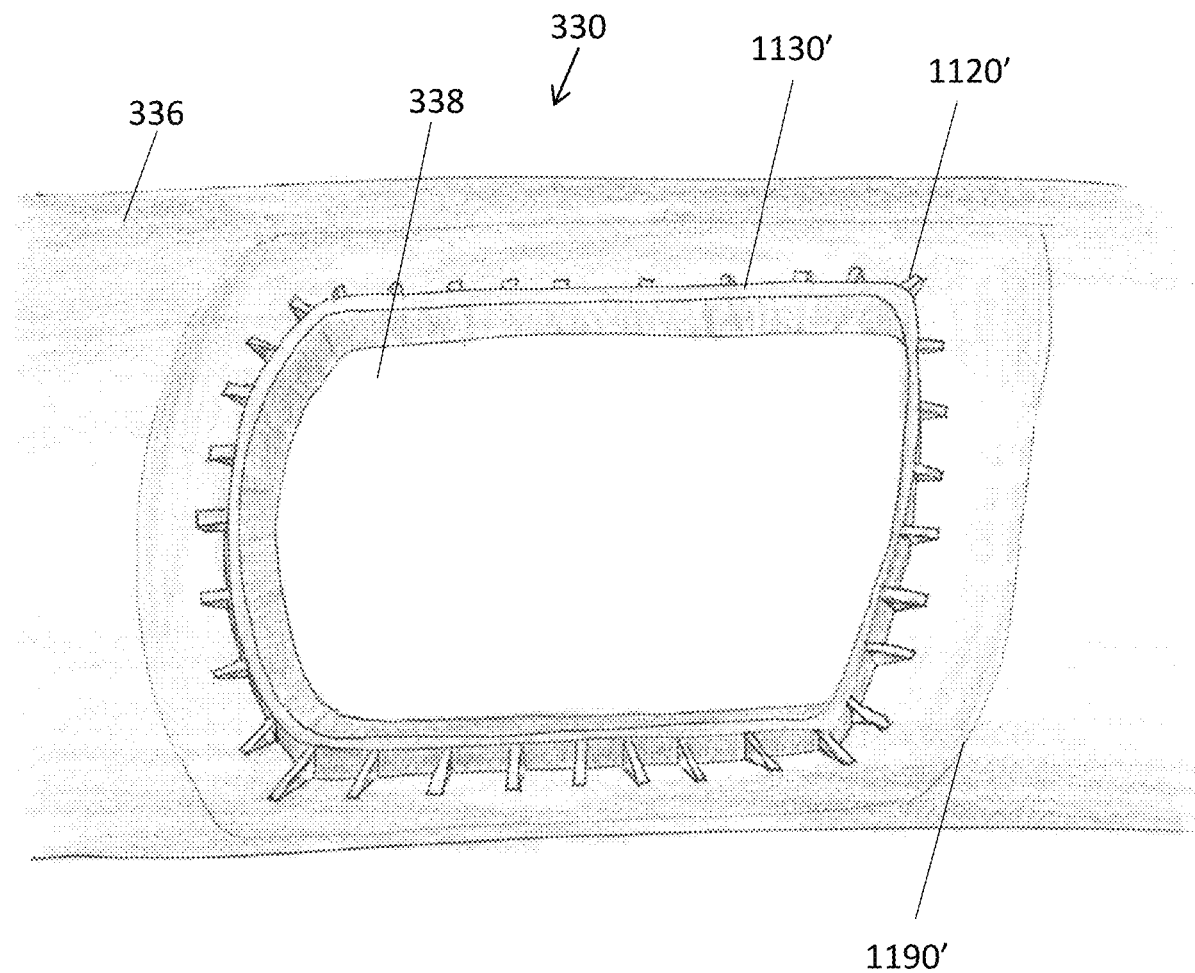
FIG. 14F is a perspective view of the main body represented by the cross-section of FIGS. 14D-E.

The main body 336 of FIGS. 14D-E is illustrated in FIG. 14F, showing clearly the continuous lip 1130' and the plurality of ribs 1120' connecting the lip 1130' to the main body 336'. In FIG. 14F, the portion of main body 336 surrounding the lip 1130' and the ribs 1120' may be recessed radially inwardly compared to other portions of main body 336, as indicated by recess line 1190'. Because lip 1130' extends away from the outer surface of main body 336, if no recess was present, the door 340 when closed and engaged to lip 1130' may protrude from the surface of main body 336. By recessing lip 1130' and ribs 1120' inwardly, when door 340 is in the closed or locked condition, the outer face of the main body 1160 of door 340 may be substantially flush with the non-recessed portions of the main body 336 of main cabinet unit 330.

Figure 15A:
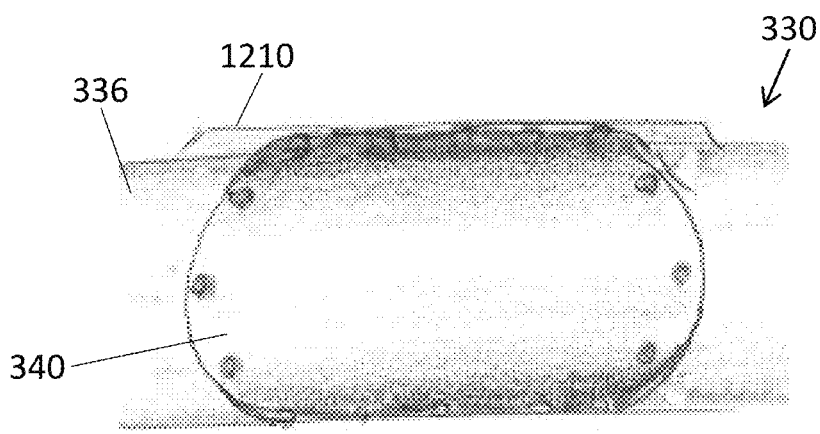
FIG. 15A is a front view of a door of the optical fiber distribution system of FIG. 4A connected to the main body of a main cabinet unit of the optical fiber distribution system.
Figure 15B:
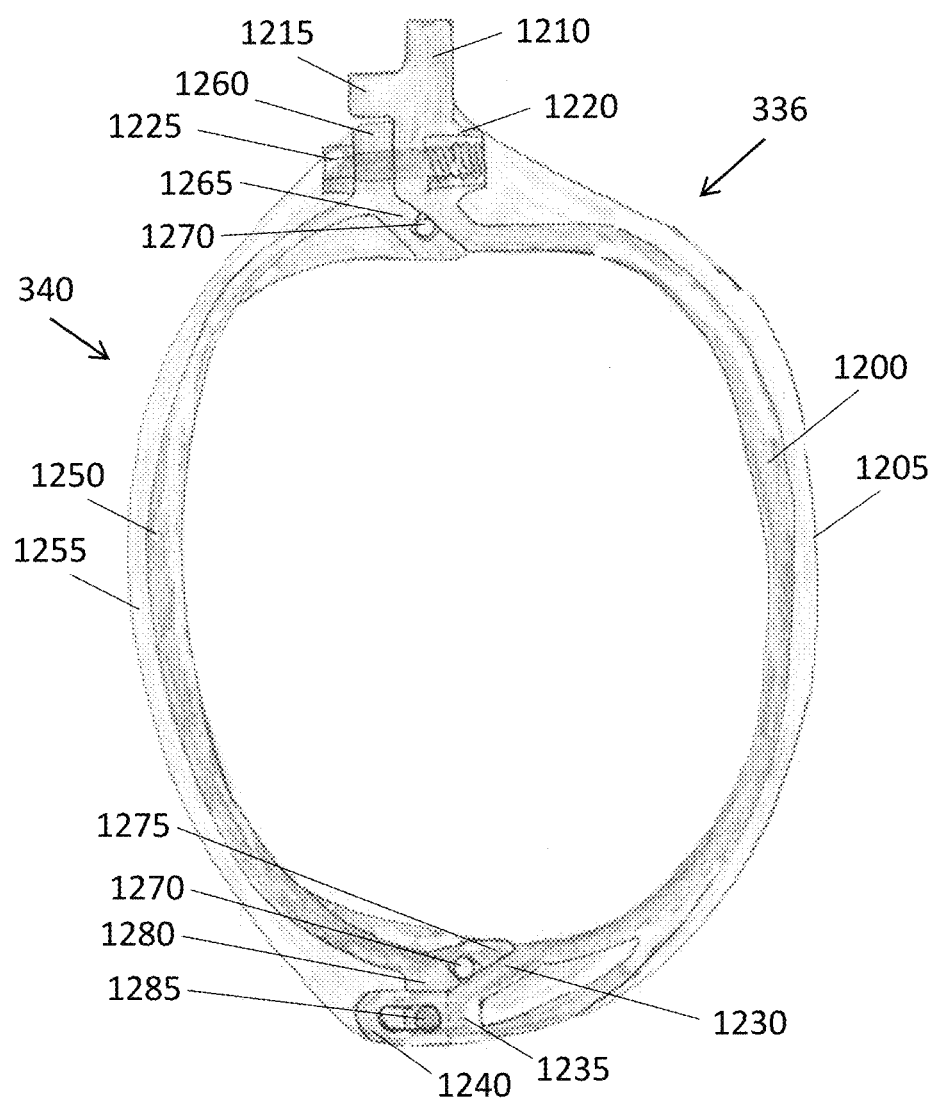
FIG. 15B is a cross-section taken along a hinged member of the main body of FIG. 15A.

FIGS. 15A-D illustrate details of the connection between the main body 336 of main cabinet unit 330 and door 340. It should be understood that the features described in connection with FIGS. 15A-D may be used in combination with any of the main body 336 and door 330 configurations described herein. FIG. 15A illustrates door 340 in a closed or locked condition with respect to the main body 336 of main cabinet unit 330. FIG. 15B shows a cross-section of the main body 336 and door 340 of FIG. 15A, with internal components of fiber distribution system 300 omitted for clarity of illustration. Main body 336 may include a shell 1200 that is substantially "C"-shaped, or otherwise approximately half of a cylinder or half of an oblong or oval shape. One or more ribs 1205 or other support structures may be positioned radially outward of shell 1200 to provide additional stability and support to shell 1200. A top end of shell 1200 may include an "L"-shaped structure having an extension 1210 extending upward in the view of FIG. 15B, and a lip 1215 extending substantially orthogonal to the extension 1210, the lip 1215 extending in a direction toward the left of the view of FIG. 15B. Extension 1210 and lip 1215 may extend a distance that is greater than the length of the top portion of door 340 in the view of FIG. 15A, so that when door 340 is in the closed condition, an entire length of the top of door 340 is in contact with lip 1215. A plurality of apertures 1220 may be positioned in extension 1210 below lip 1215, the apertures 1220 being spaced a distance apart from one another along the length of extension 1210. Apertures 1220 may be internally threaded to mate with exterior threads of a fastener, such as bolt 1225.

Still referring to FIG. 15B, door 340 may include a shell 1250 that is substantially "C"-shaped, or otherwise approximately half of a cylinder or half of an oblong or oval shape, generally similar to shell 1200. One or more ribs 1255 or other support structures may be positioned radially outward of shell 1250 to provide additional stability and support to shell 1250. An extension 1260 may extend upward from the top of shell 1250 in the view of FIG. 15B, extending substantially the entire length of the top of door 340. In the illustrated closed condition, a top of extension 1260 may abut a bottom of lip 1215, with the interior face of extension 1260 abutting the portion of extension 1210 positioned below lip 1215. Lip 1215 may help reduce the likelihood of water, for example from rain, from entering main cabinet unit 330 when door 340 is in the closed condition. Extension 1260 may include apertures at spaced apart distances that may align with apertures in extension 1210 in the closed condition of the door 340, such that in the closed condition bolts 1225 may be inserted through the apertures to further secure the door 340 to the main body 336 in the closed condition. Another extension 1265 may extend from the top end of shell 1250, extending in a direction generally toward the longitudinal center of main cabinet unit 330. Extension 1265 may include a recess to receive a portion of a sealing member such as O-ring 1270. In the illustrated closed condition, the extension 1265 and an angled surface between shell 1200 and extension 1210 may compress O-ring 1260 therebetween, helping to further seal the main cabinet unit 330 when the door 340 is in the closed condition.

Figure 15C:
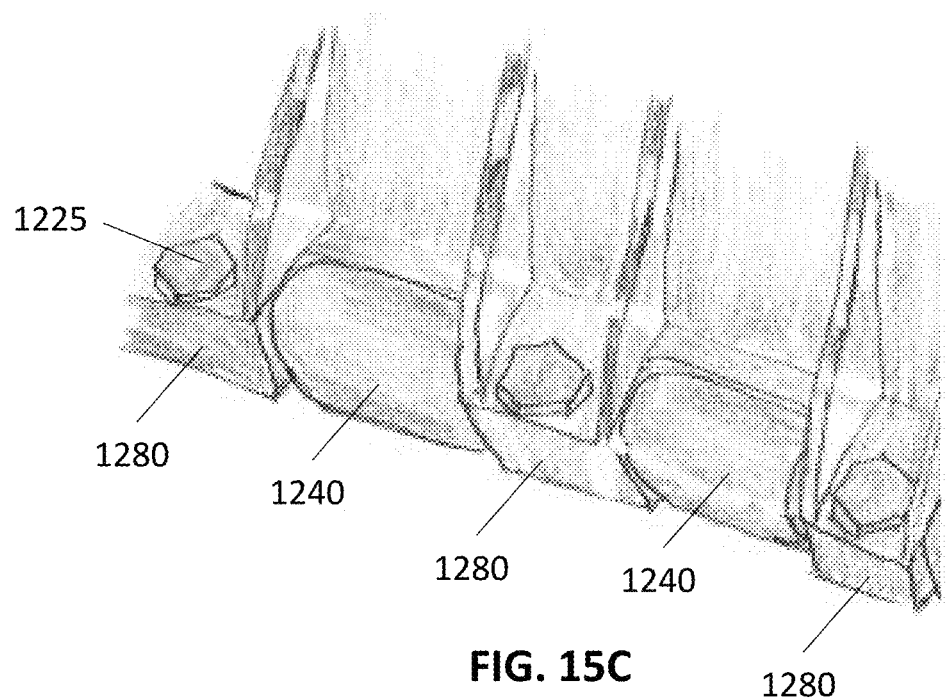
FIG. 15C is a perspective view of hinged members of the main body and the door of FIG. 15A.

The bottom end of the shell 1200 the main body 336 in the view of FIG. 15B may be hingedly coupled to the bottom end of the shell 1250 of the door 340. In addition to having a hinged configuration, the bottom end of the shell 1200 of the main body 336 may be able to receive fasteners such as bolts 1225 to further secure the bottom end of the shell 1200 of the main body 336 to the bottom end of the shell 1250 of the door 340 when the door 340 is already in the closed condition. FIG. 15C illustrates a perspective view of a portion of the bottom of main cabinet unit 300, with the cross-section of FIG. 15B being taken across one of the hinge structures, and the cross-section of FIG. 15D being taken across one of the bolt-receiving structures. Referring to FIG. 15B, a bottom end of shell 1200 of main body 336 may include an interior extension 1230 extending at an angle, and another extension 1235 extending downwardly from extension 1230 in a downward direction in the view of FIG. 15B. When door 340 is in the closed condition, an extension 1275 may abut extension 1230 of shell 1200. Extension 1275 of shell 1250 may include a recess to receive a sealing member such as O-ring 1270 therein. It should be understood that the recess in extension 1275 may be substantially continuous with the recess in extension 1265, with a single O-ring 1270 continuously extending around a perimeter of shell 1250. In the closed condition of door 340, extension 1275 and extension 1230 may compress O-ring 1270 therebetween, providing an enhanced seal for main cabinet unit 330.

Figure 15D:
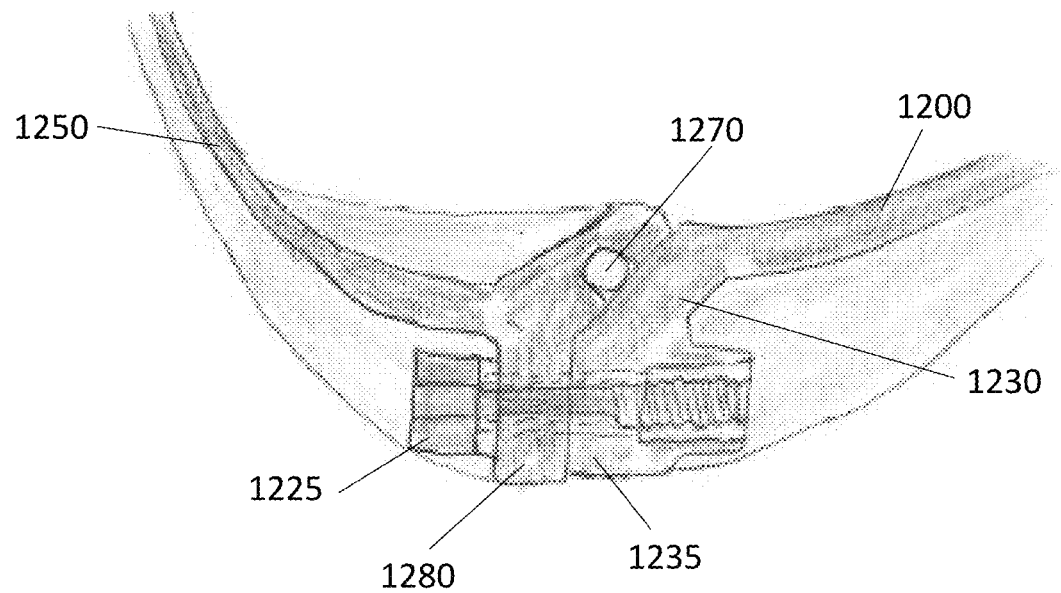
FIG. 15D is a cross-section taken along a hinged member of the door of FIG. 15A.

Referring to FIGS. 15B and 15C, a plurality of "C"-shaped or cylindrical hinge portions 1240 may extend from extension 1235 at spaced apart locations along the length of the bottom of shell 1200. Hinge members 1240 may include apertures extending a direction parallel to the longitudinal center of main cabinet unit 330, the apertures configured to receive pins 1285 to provide a hinged connection between the pins 1285 and the hinge members 1240. A plurality of hinge members 1280 may also extend from the bottom of shell 1250 of door 340, the hinge members 1280 being spaced apart from one another along the length of the bottom of door 340, such that hinge members 1280 are received between adjacent hinge members 1240 of shell 1200. Pins 1285 may extend fully or partially between adjacent hinge members 1280. Although in some embodiments a single pin 1285 may extend the length of the bottom of door 340, it may be preferable to limit pins 1285 to portions between adjacent hinge members 1280 to allow for additional fasteners, such as bolts 1225, to pass through hinge members 1280. As noted above, FIG. 15D illustrates a cross-section of main cabinet unit through one of the hinge members 1280. As best seen in FIG. 15D, hinge member 1280 may include an aperture therethrough, and a portion of extension 1235 configured to abut the hinge member 1280 may include a corresponding aperture, which may be internally threaded, to receive and engage threads on bolt 1225. It should be understood that, when bolts 1225 couple hinge members 1280 to extension 1235, door 340 is not able to rotate relative to main body 336, since the bolts 1225 may prevent such rotation. Rather, in order to open door 340, all bolts 1225 may be removed, and after maintenance or other work is completed within main cabinet unit 330, the door 340 may be closed by rotating the door 340 by rotation of the pins 1285 in the hinge members 1240, with the bolts 1225 being re-inserted to further lock the door 340 in the closed condition.

Referring once more to FIG. 15B, it should be noted that door 340 has a height so that, when door 340 is in the open condition, the dimension of opening 338 that extends in a direction orthogonal to the direction of the longitudinal center axis of the system 300 has a length that extends the entire vertical height, or nearly the entire vertical height, of main cabinet unit 330. This configuration may be preferable to provide the maximum amount of space to access the interior components of main cabinet unit 330. Thus, it should be understood that other embodiments of door 340 described herein may be similarly dimensioned to provide enhanced access to the interior components of main cabinet unit 330. Further, it should be understood that the configuration of door 340 and main body 336 described in connection with FIGS. 15A-D may be used with other examples of main cabinet unit 330 described herein, where appropriate.

Figure 16A:
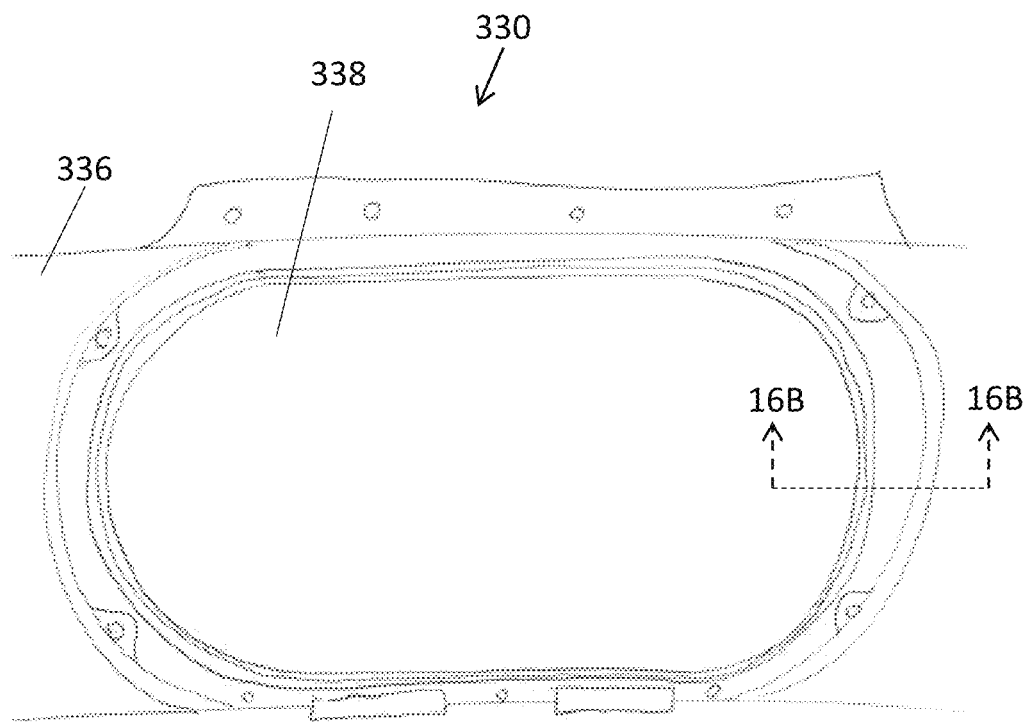
FIG. 16A is a perspective view of a further embodiment of a portion of a main body of a main cabinet unit.
Figure 16B:
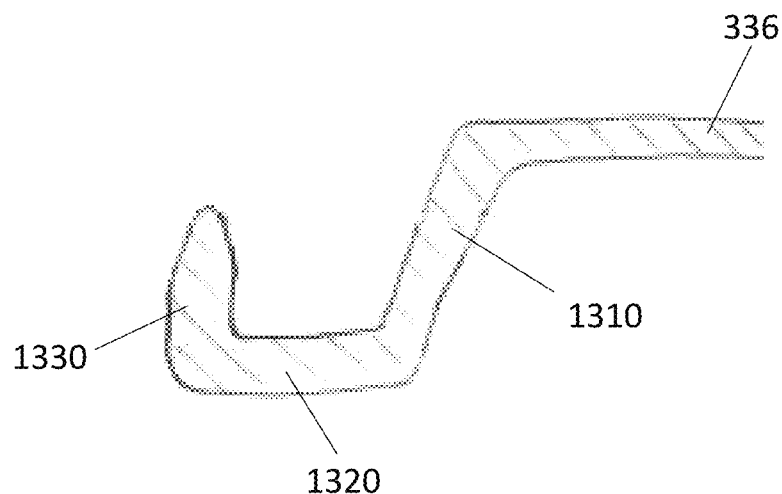
FIG. 16B is a cross-section of a portion of the main body of FIG. 16A at cross-sectional line 16B-16B.
Figure 16C:
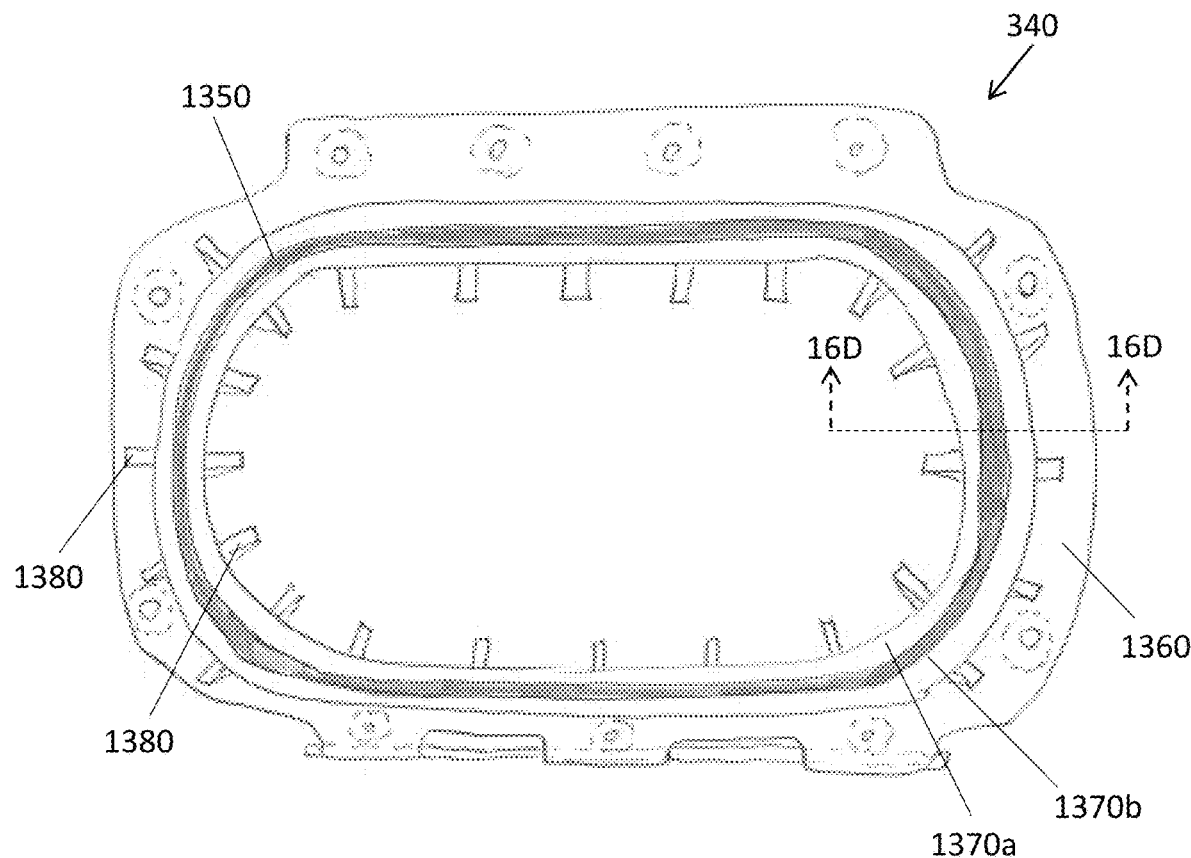
FIG. 16C is a perspective view of a door that may be used in conjunction with the main body of the main cabinet unit of FIG. 16A.

FIG. 16A illustrates another embodiment of a portion of main cabinet unit 330, including main body 336 and opening 338, with which door 340 interacts. Door 340, which is illustrated in isolation in FIG. 16C, is omitted from FIG. 16A for purposes of clarity. Similarly, certain structures for coupling door 340 to main cabinet unit 330, such as locking mechanisms, are omitted from FIGS. 16A and 16C. FIG. 16B illustrates a cross-section of main body 336 along the line 16B-16B of FIG. 16A. Referring now to FIGS. 16A-B, main body 336 may have a first transition section 1310 that extends radially inward toward the longitudinal center of main cabinet unit 330, although transition section need not be perfectly orthogonal to the main body 336, but may rather have an oblique angle with respect to the main body 336. An extension section 1320 may extend from transition section 1310, the extension section 1320 being substantially parallel to the portion of main body 336 from which it extends. A lip 1330 may extend radially outwardly and substantially orthogonally from extension section 1320, the lip 1330 terminating in a pointed tip to engage a gasket, such as O-ring 1350, described in more detail in connection with FIGS. 16C-D.

Figure 16D:
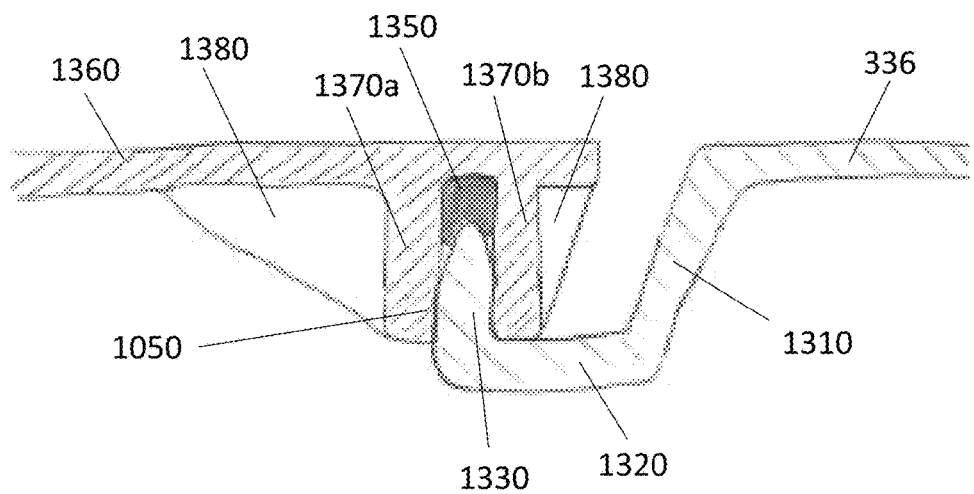
FIG. 16D is a cross-section of a portion of the door of FIG. 16C at cross-sectional line 16D-16D connected to the portion of the main body of FIG. 16B.

FIG. 16C illustrates an embodiment of door 340, and FIG. 16D illustrates a cross-section of door 340 taken along line 16D-16D of FIG. 16C while the door 340 is engaged with the main cabinet 330, which is also shown in cross-section taken along the line 16B-16B of FIG. 16A. Door 340 may include a main body 1360 that has a shape generally corresponding to the shape of the opening 338 of main cabinet unit 330. A pair of interior lips 1370a, 1370b may be spaced apart from one another and each extend substantially orthogonally from the main body 1360, and may each extend along a continuous circumference, the lips 1370a, 1370b being positioned a spaced distance from the outer circumference of main body 1360. A sealing member 1350, such as an O-ring or rectangular profile seal, may be positioned between the pair of interior lips 1370a, 1370b. A first plurality of substantially triangular ribs 1380 may extend from a free end of lip 1370b toward the outer circumferential edge of main body 1360 to provide additional support to the door 340. A second plurality of substantially triangular ribs 1380 may extend from a free end of lip 1370a toward an interior surface of main body 1360 to provide further support to the door 340. As shown in FIG. 16D, when door 340 is in the closed condition, the lip 1330 of the main body 336 is received in the space between the pair of interior lips 1370a, 1370b of the door 340, with the tip of the lip 1330 compressing the sealing member 1350 into the pair of interior lips 1370a, 1370b and the opposing surface of the main body 1360 between the lips 1370a, 1370b. Further, although a space is illustrated in FIG. 16D between the terminal edge of main body 1360 of door 340 and the point at which main body 336 transitions to transition section 1310, it should be understood that less or no space may be provided between those two elements. It should be understood that the configuration of door 340 and main body 336 of main cabinet unit 330 shown and described in connection with FIGS. 16A-16D may be used with any of the main cabinet units 330 and doors 340 described herein.

Figure 17A:
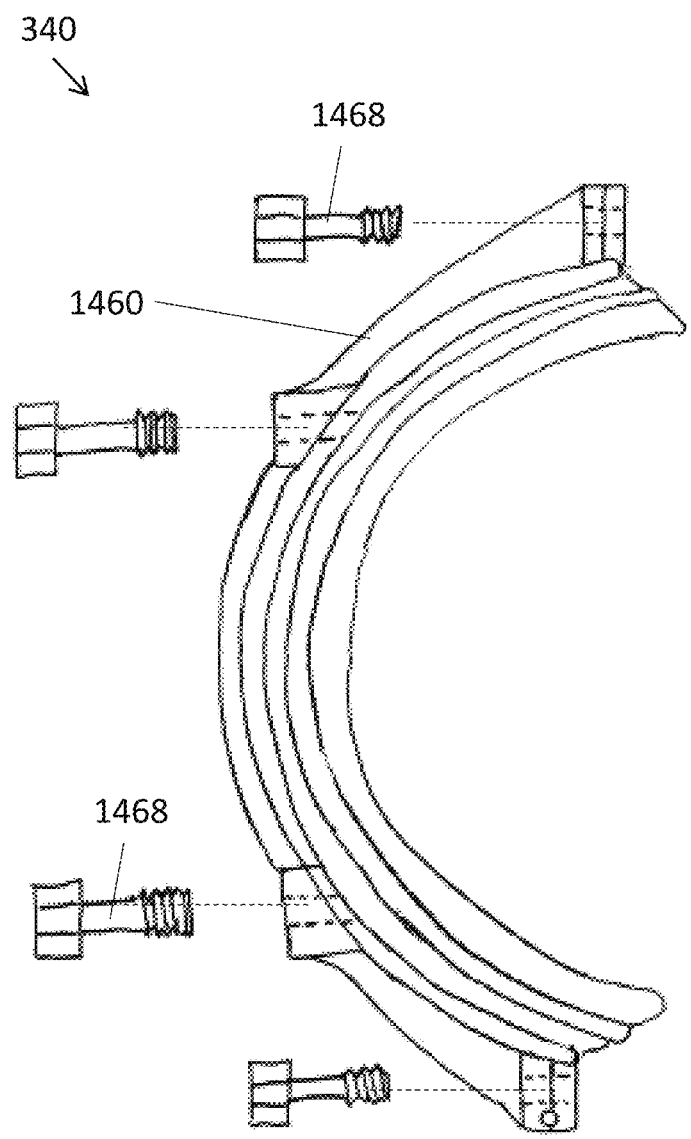
FIG. 17A is a side view of another embodiment of a door of an optical fiber distribution system, as seen from the viewing line 17A of FIG. 17C.
Figure 17B:
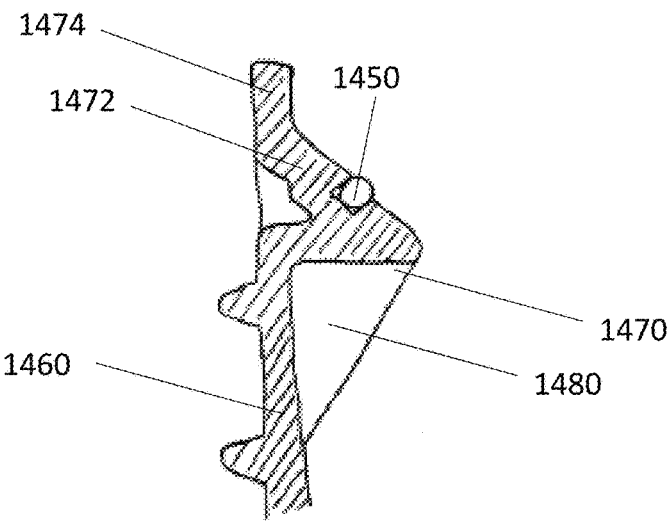
FIG. 17B is a cross-section of the door of FIG. 17A taken along the cross-sectional line 17B-17B of FIG. 17C.
Figure 17C:
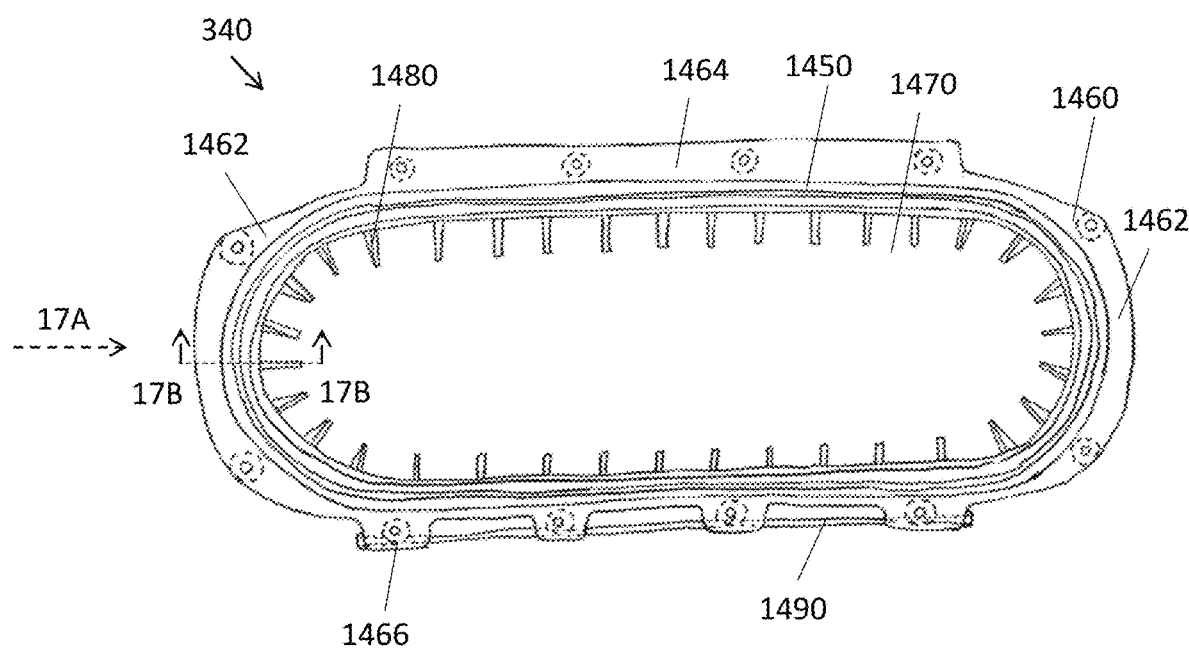
FIG. 17C is a front view of an interior of the door of FIG. 17A.

FIG. 17A illustrates a side view of yet another embodiment of a door 340, shown as viewing the door 340 in FIG. 17C along the viewing line 17A shown in FIG. 17C. FIG. 17B illustrates a cross-section of door 340 along cross-sectional line 17B-17B of FIG. 17C, while FIG. 17C is a front view of the interior portion of door 340 of FIG. 17A. Door 340 may include a main body 1460 that has a shape generally corresponding to the shape of the opening 338 of main cabinet unit 330 with which it pairs, which may be a main cabinet unit 330 similar to other main cabinet units described herein. Main body 1460 may include side extensions 1462, a top extension 1464, and a bottom extension 1466. Each extension may include one or more apertures for receiving fasteners 1468 therein to secure the door 340 to a corresponding main body 336 of a main cabinet unit 330.

As best shown in FIG. 17B, an interior lip 1470 may extend substantially orthogonally from the main body 1460, and may extend along a continuous circumference, the lip 1470 being positioned a spaced distance from the outer perimeter of main body 1460. A plurality of substantially triangular ribs 1480 may extend from a free end of lip 1470 toward an interior of main body 1460 to provide additional support to the door 340. The interior lip 1470 may have an angled transition section 1472 that transitions in a direction back toward main body 1460, and which itself transitions to the terminal edge 1474 of the door 340. Angled transition section 1472 may include a recess therein to receive a gasket, such as O-ring 1450, which may extend continuously around a perimeter defined by the recess. When door 340 is connected to a main body portion 336 of a main cabinet unit 330 and in the closed condition, a corresponding surface of the main body portion 336 may engage transition section 1472 and compress O-ring 1450 to seal the door 340 to the main body portion 336.

Referring to FIG. 17C, a hinge member 1490, which may be a rod, pin, or similar structure, may extend between spaced apart bottom extensions 1466. Hinge member 1490 is configured to engage a corresponding hinge structure on a corresponding main body portion 336 of a main cabinet unit 330, for example similar to that shown in FIGS. 15A-D. When in the closed condition, fasteners 1468 may be inserted through the corresponding apertures in door 340 and into corresponding apertures in the corresponding main body portion 336 of main cabinet unit 330 in order to further secure the door 340 in the closed condition.

Figure 18A:
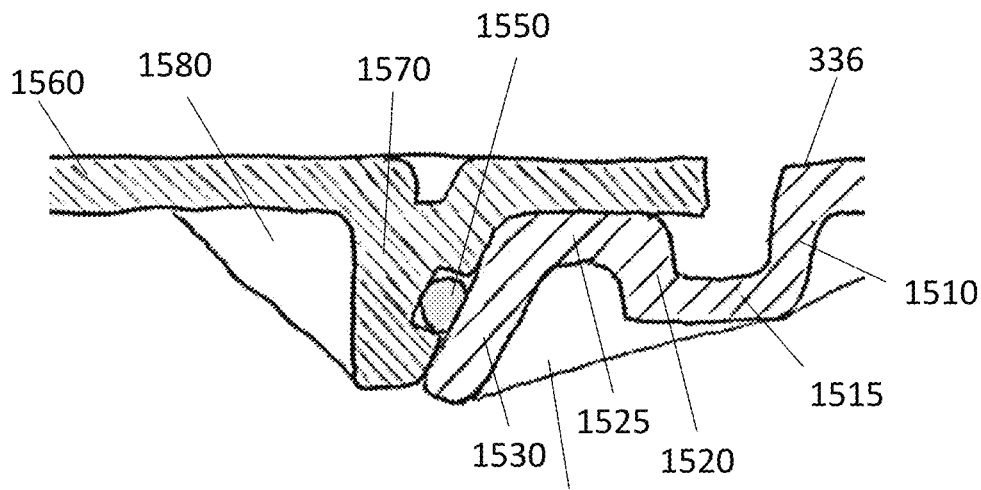
FIGS. 18A-C are cross-sectional views of additional embodiments of a door engaged to a main body portion of a main cabinet unit.
Figure 18B:
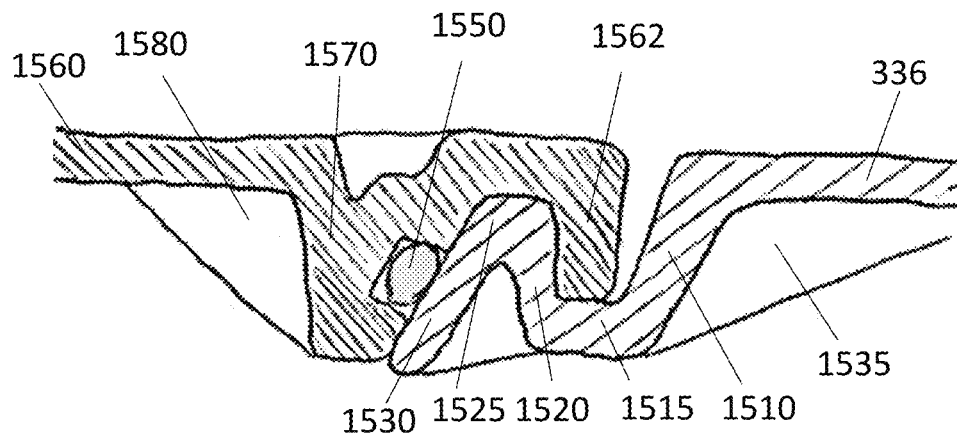
Figure 18C:
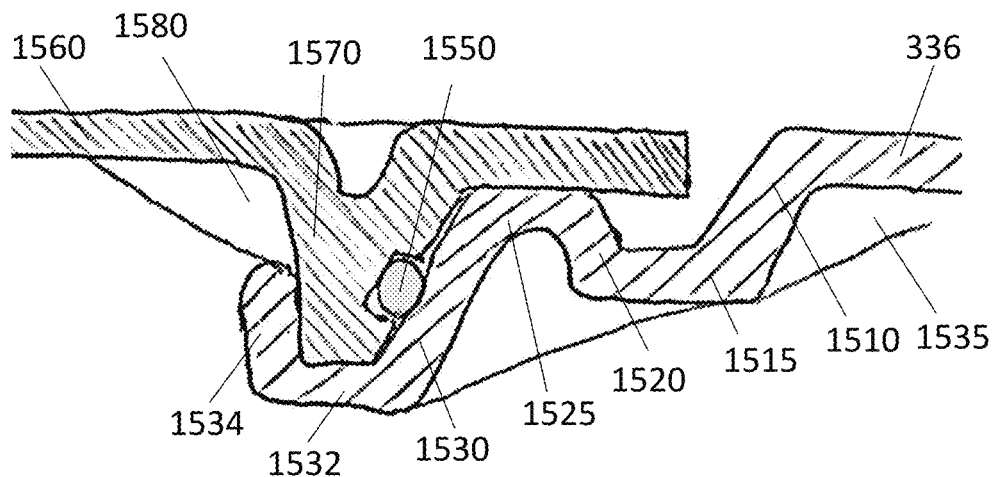

FIGS. 18A-C illustrate additional embodiments of corresponding structures on a door 340 and main body portion 336 of a main cabinet unit 330 for providing effective sealing when the door 340 is in the closed condition. FIGS. 18A-C each show a cross-section of a portion of a door 340 engaged to a main body portion 336 in the closed condition in substantially the same orientation as is shown in FIGS. 14C-E.

Referring to FIG. 18A, the portion of the main body 336 of main cabinet unit 330 illustrated includes a first transition section 1510 extending radially inwardly at an orthogonal or near-orthogonal angle, and a second transition section 1515 extending from the first transition section 1510, the second transition section 1515 being substantially parallel to the portion of main body 336 from which the first transition section 1510 extends. A third transition section 1520 may extend radially outwardly from the end of the second transition section 1520 at an orthogonal or near-orthogonal angle, with a fourth transition section 1525 extending from the end of the third transition section 1520, and being substantially parallel to the second transition section 1515 and to the main body portion 336 from which the first transition section 1510 extends. A lip 1530 may extend inwardly at an angle from the end of the fourth transition section 1525, the lip 1530 defining the terminal edge of the main body portion 336.

Still referring to FIG. 18A, the main body 1560 of door 340 may include an interior lip 1570 extending radially inward at an orthogonal or near-orthogonal angle to the main body 1560. Lip 1570 may have an outer surface that transitions to the terminal edge of main body 1560, to the right in the view of FIG. 18A, with that outer surface being angled to substantially match the angle of the lip 1530. That outer surface may also include a recess to receive a gasket, such as O-ring 1550, which may extend along a continuous perimeter defined by the recess. When in the closed condition shown in FIG. 18a, the outer surface of lip 1570 engages the outer surface of lip 1530 to compress O-ring 1550 and to enhance the seal created in the illustrated closed condition. Substantially triangular fins 1580 may extend from a free end of lip 1570 toward an interior surface of main body 1560 in order to provide additional support to the lip 1570. Fins 1535 may also be provided extending from the free end of lip 1530 to an interior surface of main body portion 336. However, even with fins 1535 and 1580, the compressive forces acting between lip 1570 and lip 1530 may tend to cause the lips to deflect away from each other, which may reduce the effectiveness of the seal formed therebetween.

FIG. 18B illustrates a cross-section of a door 340 in a closed condition engaged to a main body portion 336 of a main cabinet unit 330 that is identical or substantially identical to that shown in FIG. 18A, with one exception. The identical or substantially identical portions include the same part numbers as used in FIG. 18A and are not described again here. The difference of FIG. 18B is that the terminal end of main body portion 1560 of door 340 includes an additional lip 1562 extending inwardly, the lip 1562 sized and angled to engage the outer surface of the third transition section 1520 of the main body portion 336. With this additional feature, the additional lip 1562 and the lip 1570 effectively function to sandwich or otherwise grip the terminal end of main body portion 336, including the third and fourth transition sections 1520, 1525 as well as lip 1530. This additional interaction helps reduce the tendency of lip 1570 and lip 1530 to deflect away from each other when in the illustrated engaged or closed condition.

FIG. 18C illustrates a cross-section of a door 340 in a closed condition engaged to a main body portion 336 of a main cabinet unit 330 that is identical or substantially identical to that shown in FIG. 18A, with one exception. The identical or substantially identical portions include the same part numbers as used in FIG. 18A and are not described again here. The difference of FIG. 18C is that the terminal end of main body portion 336 includes an additional lip transition section 1532 and an additional lip 1534. In particular, additional transition section 1532 extends from lip 1530 so that it is substantially parallel to fourth transition 1525, and additional lip 1534 extends outwardly from the additional transition section 1532 and is sized and angled to engage an inner surface of lip 1570 of door 340. With this additional feature, the additional lip 1534 and the lip 1530 effectively function to sandwich or otherwise grip the lip 1570 of the door 340. This additional interaction helps reduce the tendency of lip 1570 and lip 1530 to deflect away from each other when in the illustrated engaged or closed condition. It should be understood that the additional features shown in FIG. 18C may be combined with the additional features shown in FIG. 18B to even further reduce the tendency of lips 1570 and 1530 to deflect away from each other when in the closed or engaged condition.

Figure 19:
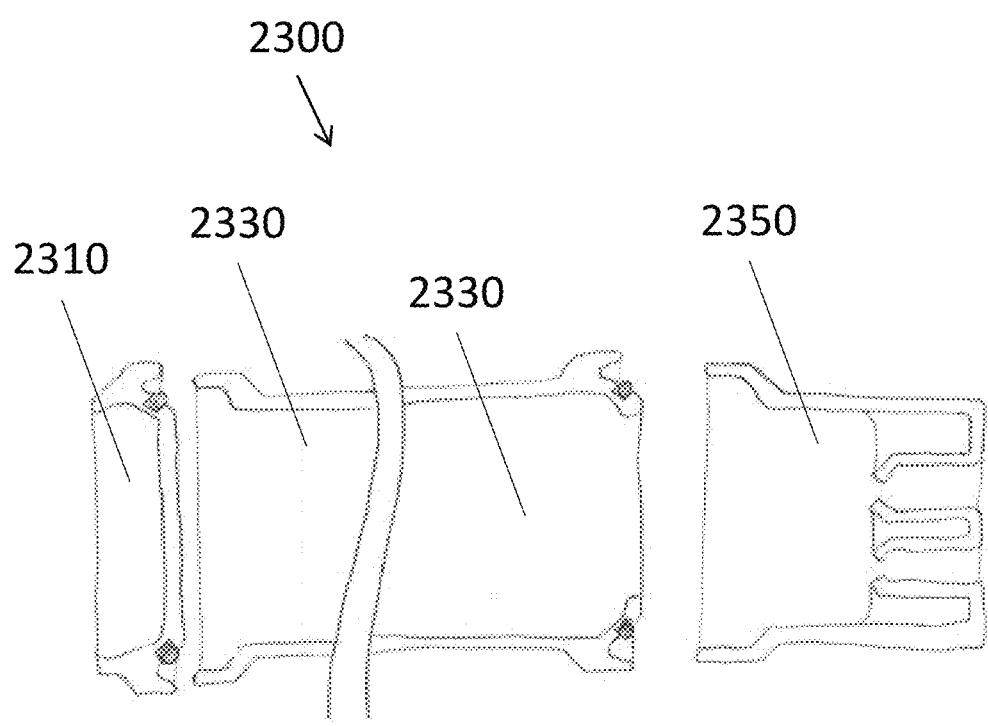
FIG. 19 is a schematic view of another embodiment of an optical fiber distribution system having alternate male and female connection configurations.

FIG. 19 is a schematic view of an optical fiber distribution system 2300 that may include an end cap 2310, one or more main cabinet units 2330, and a fiber termination unit 2350. Fiber distribution system 2300 and the components thereof may be substantially identical to any of the corresponding components described above, including all the variations described therewith, with one main exception. In the view of FIG. 19, the left side of fiber termination unit 2350 and the left side of main cabinet unit 2330 have "male" connections, while the right side of the main cabinet unit 2330 and the right side of the end cap unit 2310 have "female" connections that engage the male connections. In the other embodiments of fiber distribution system 300 and the components thereof described above, this arrangement is generally reversed. In other words, FIG. 19 illustrates that the male and female connection configurations described for any of the fiber distribution systems 300 above may be reversed if desired.

Figure 20A:
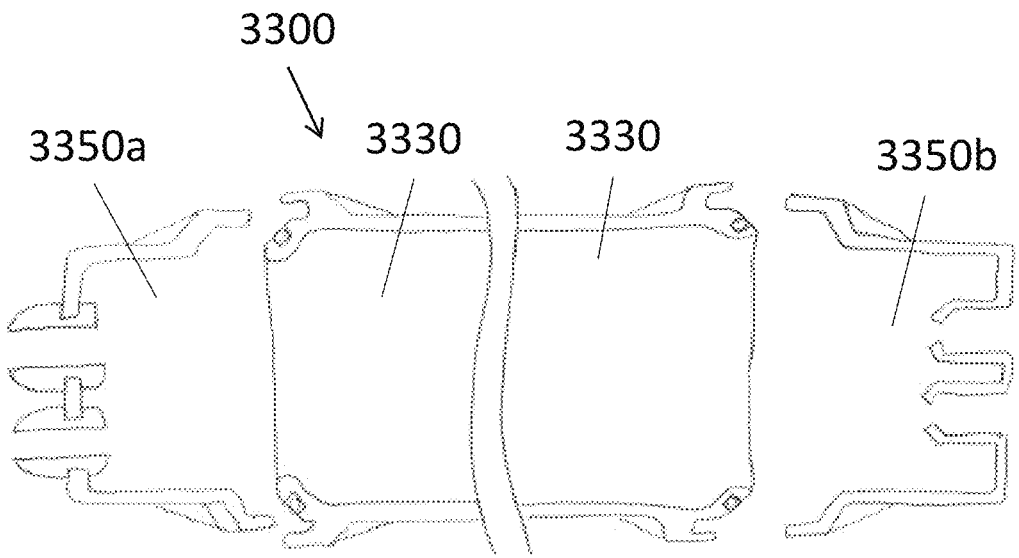
FIGS. 20A-20B are schematic views of another embodiment of an optical fiber distribution system in which respective fiber termination units are used with alternate male and female connection configurations.
Figure 20B:
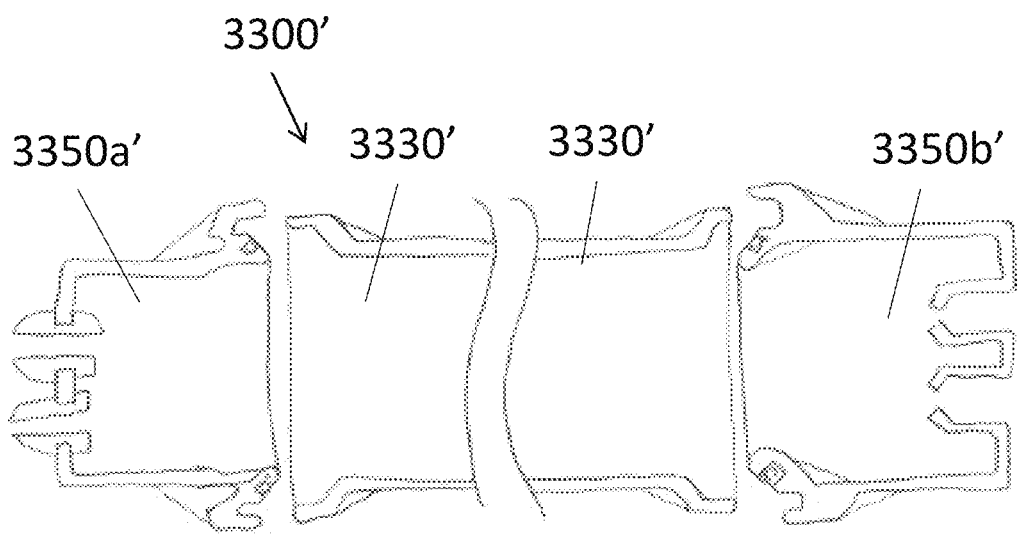

FIG. 20A is a schematic view of a fiber distribution system 3300 that may include one or more main cabinet units 3330, with a first fiber termination unit 3350a at a first end of the system and a second fiber termination unit 3350b at a second end of the system, which may negate the need for an end cap unit similar to those described above. Fiber distribution system 3300 and the components thereof may be substantially identical to any of the corresponding components described above, including all the variations described therewith. The only significant difference of fiber distribution system 3300 is that an end cap unit is replaced with an additional fiber termination unit 3350a. In other words, FIG. 20A illustrates that any of the fiber distribution systems 300 above may use two fiber termination units 350, instead of one fiber termination unit 350 and one end cap 310, which may provide for increased symmetry of the system. Increased symmetry may be desirable not only from an aesthetic standpoint, but also for more evenly distributing the weight of the system. FIG. 20B illustrates an alternate version of fiber distribution system 3300', including first and second fiber termination units 3350a', 3350b' and one or more main cabinet units 3330'. FIG. 20B merely illustrates that the positions of the male connections and the female connections shown in FIG. 20A may be reversed.

Figure 21A:
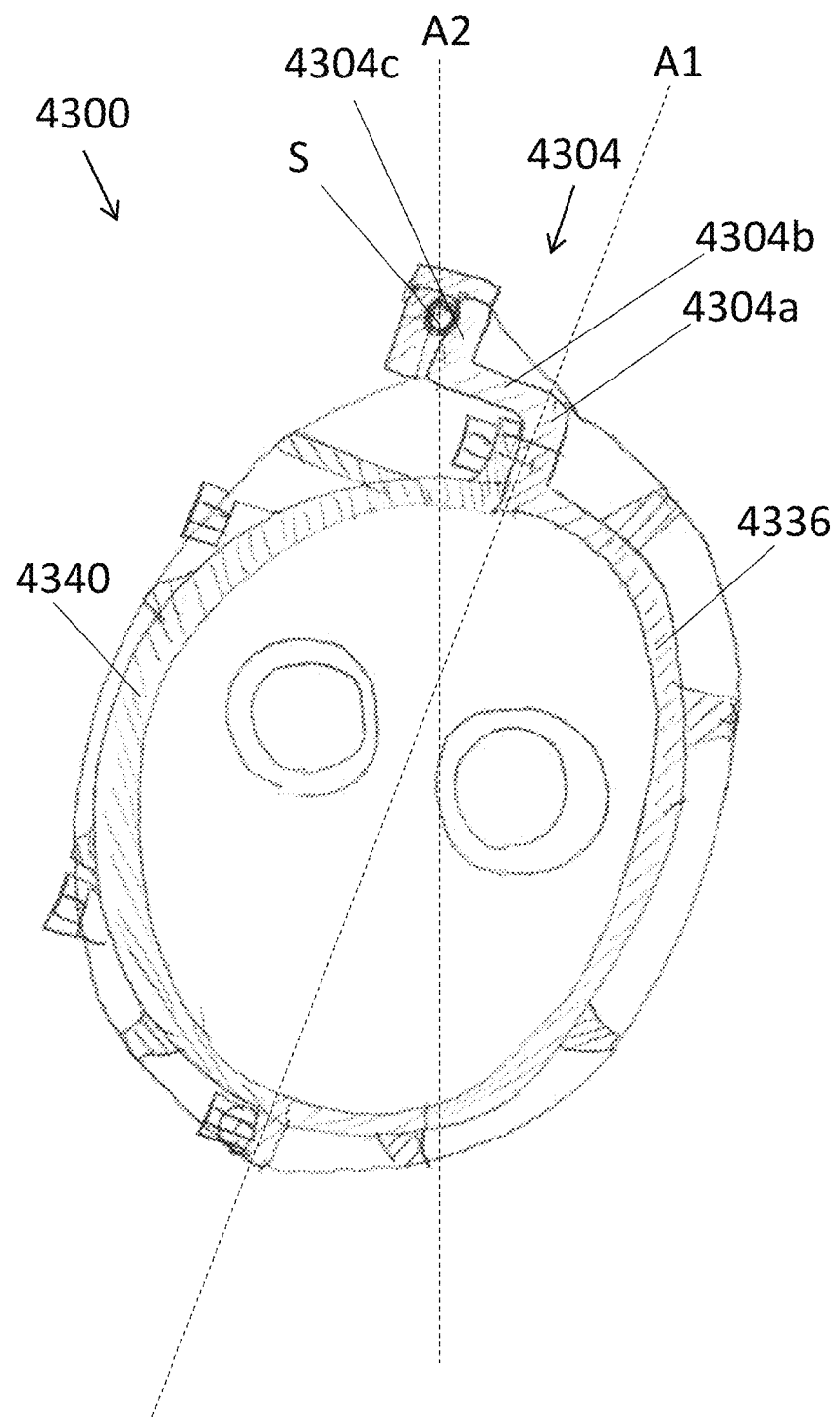
FIGS. 21A-C illustrate different views of another embodiment of an optical fiber distribution system that includes an alternative hanging element configured to provide for a shifting of the weight distribution of the system relative to the hanging element when a door of the system is switched between an open position and closed position.

FIG. 21A shows a cut-away view of a main cabinet unit of another embodiment of an optical fiber distribution system 4300. The illustrated main cabinet unit may include a door 4340 and main body portion 4336 that is similar or identical to any other embodiments of main cabinet units described herein, with at least one difference. In particular, hanging element 4304, which extends from a portion of a periphery of the main body portion 4336, may include a first member 4304a extending substantially along an end-to-end axis A1. End-to-end axis A1 may be substantially parallel to front faces of patch panel cassettes 4600 (or storage cassettes if included) and orthogonal to top and bottom faces of the cassettes 4600, when the cassettes 4600 are in a pushed-in or storage state within an interior of main body portion 4336. Hanging element 4304 may include a second member 4304b extending from first member 4304a, in a direction substantially orthogonal or at an oblique angle relative to the first member 4304a and extending away from the main body portion 4336. Hanging element 4304 may include a third member 4304c extending from second member 4304b, in a direction substantially parallel to end-to-end axis A1. The third member 4304c of hanging element 4304 may be configured to engage a strand S or wire from which the system 4300 may be suspended by hanging therefrom. When system 4300 is hanging from strand S, the direction of gravity is illustrated as gravity axis A2.

Figure 21B:
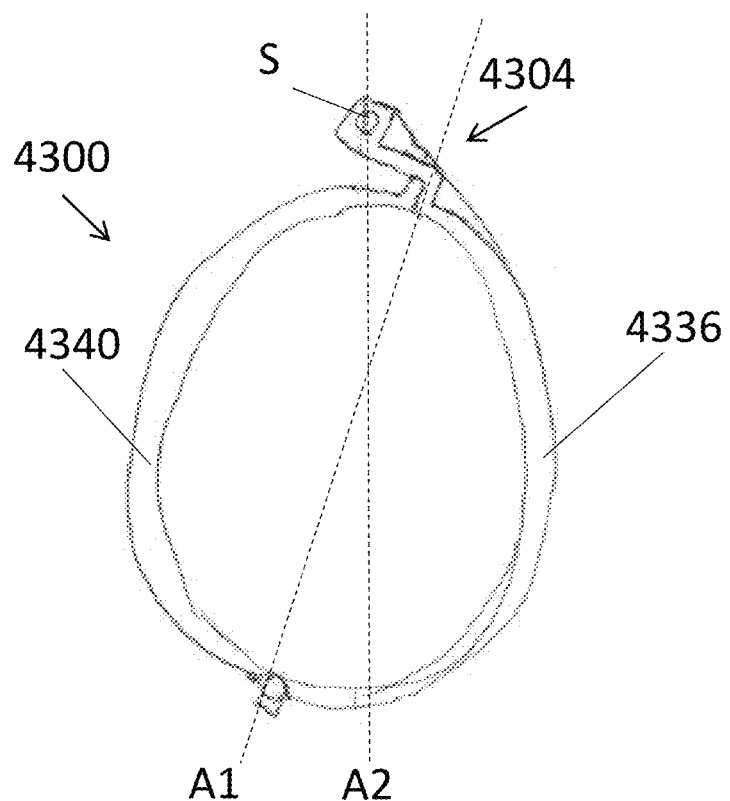
Figure 21C:
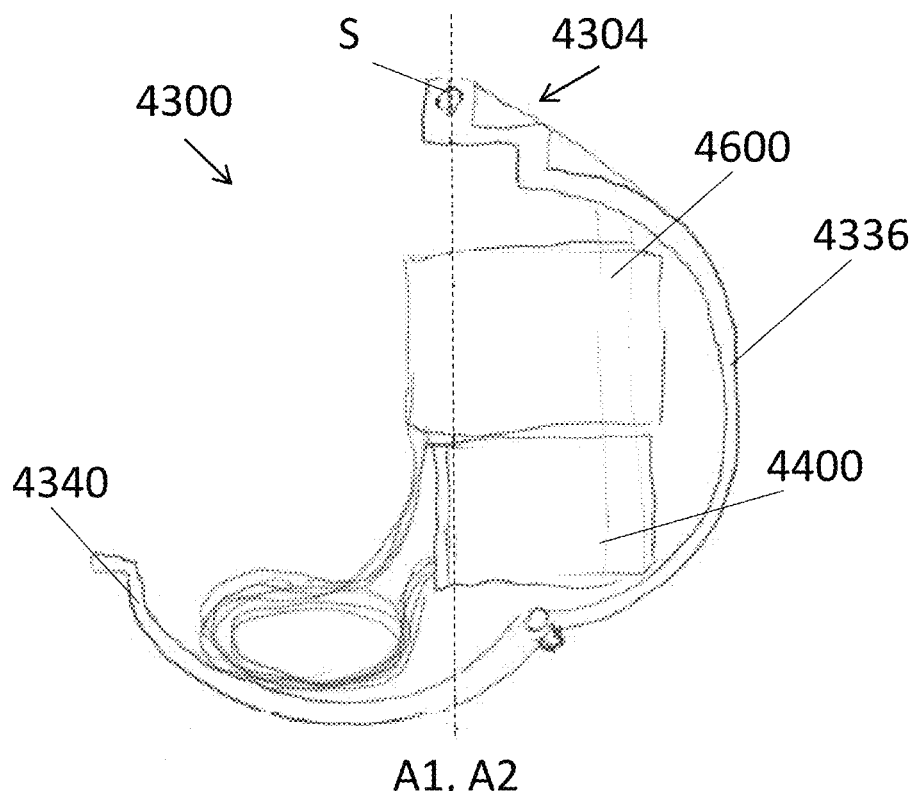

As will be clear from FIGS. 21B and 21C, the system 4300 in an installed state may be hanging from strand S and configured with internal components including trays and the like to provide that, when the system 4300 is in the installed state and the door 4340 is in a closed position or engaged condition with respect to main body portion 4336, the weight distribution of the system 4300 is such that end-to-end axis A1 is non-parallel gravity axis A2. However, as shown in FIG. 21C, when door 4340 is switched from the closed position to the open position so that a user may interact with the interior of system 4300, the change in position of door 4340 may result in the weight distribution of the system 4300 being shifted in relation to third member 4304c of hanging element 4304. In particular, the weight distribution is preferably shifted so that the end-to-end axis A1 may become parallel or substantially parallel to gravity axis A2. With this configuration of system 4300 in an installed state, when a user opens door 4340 to obtain access to and maintain components within system 4300, the position of the system 4300 hanging from the strand S may shift, based on a shift in the weight distribution of the system 4300 relative to third member 4304c, so that cassettes 4600 (and splitters 440 and/or other types of cassettes if included) are positioned in a desired orientation for ease of maintenance. The size and positions of the various members of hanging element(s) 4304 may be configured based on the weight of the system and the shape of the system to ensure that, when door 4340 is switched to an open position, the interior components of systems 4300 are presented to the user in a desirable orientation.

Referring again to FIG. 21A, the angular difference between respective positions of the end-to-end axis A1 and the gravity axis A2 when the system 4300 is in the installed state may be based, in large part, on the length of second member 4304b, although the distribution of the weight of the overall system 4300, including components therein, may also affect the angular difference between the respective positions of the axes A1 and A2 when the system 4300 is in the installed state. However, for a given weight distribution of the system 4300, increasing the length of second member 4304b extending between the first member 4304a and the third members 4304c may generally increase the angular difference between respective positions of the axes A1 and A2 when the system 4300 is in the installed state. Similarly, decreasing the length of second member 4304b may decrease the angular difference between respective positions of axes A1 and A2 when the system 4300 is in the installed state, all else being equal. Similarly, the angular difference between end-to-end axis A1 and gravity axis A2 when the door 4340 of the system 4300 is in the open position may largely depend on the length of second member 4304b and the effect on the overall weight distribution of system 4300 caused by the door 4340 being in the open position shown in FIG. 21C. Thus, the length of second member 4304b may be configured so that, for expected weight distributions of a given system 4300, the end-to-end axis A1 is substantially parallel to the gravity axis A2 when the door 4340 is in the open position. In some embodiments, second member 4304b may be a fixed structure. In other embodiments, second member 4304b may be adjustable, for example by being formed of multiple parts that may telescope into each other to decrease the length of second member 4304b, or that may telescope away from each other to increase the length of the second member 4304b. Providing second member 4304b as an adjustable length member may allow a user to ensure that, when door 4340 is in the open position, the end-to-end axis A1 is substantially parallel to the gravity axis A2. This may be useful, for example, if cables, cassettes, or other components are added to, or removed from, the system 4300, which may change the weight distribution of system 4300. By providing second member 4304b as an adjustable length member, a user may account for such changed weight distribution by lengthening or shortening second member 4304b to ensure that, when the door 4340 is in the open position, the end-to-end axis A1 is substantially parallel to the gravity axis A2.

Although fiber distribution system 300 is described herein in the context of use with a strand-mounted housing, it should be understood that many of the concepts described herein may be used, with or without modification, in optical fiber distribution systems that have other types of housings.

Figure 22:
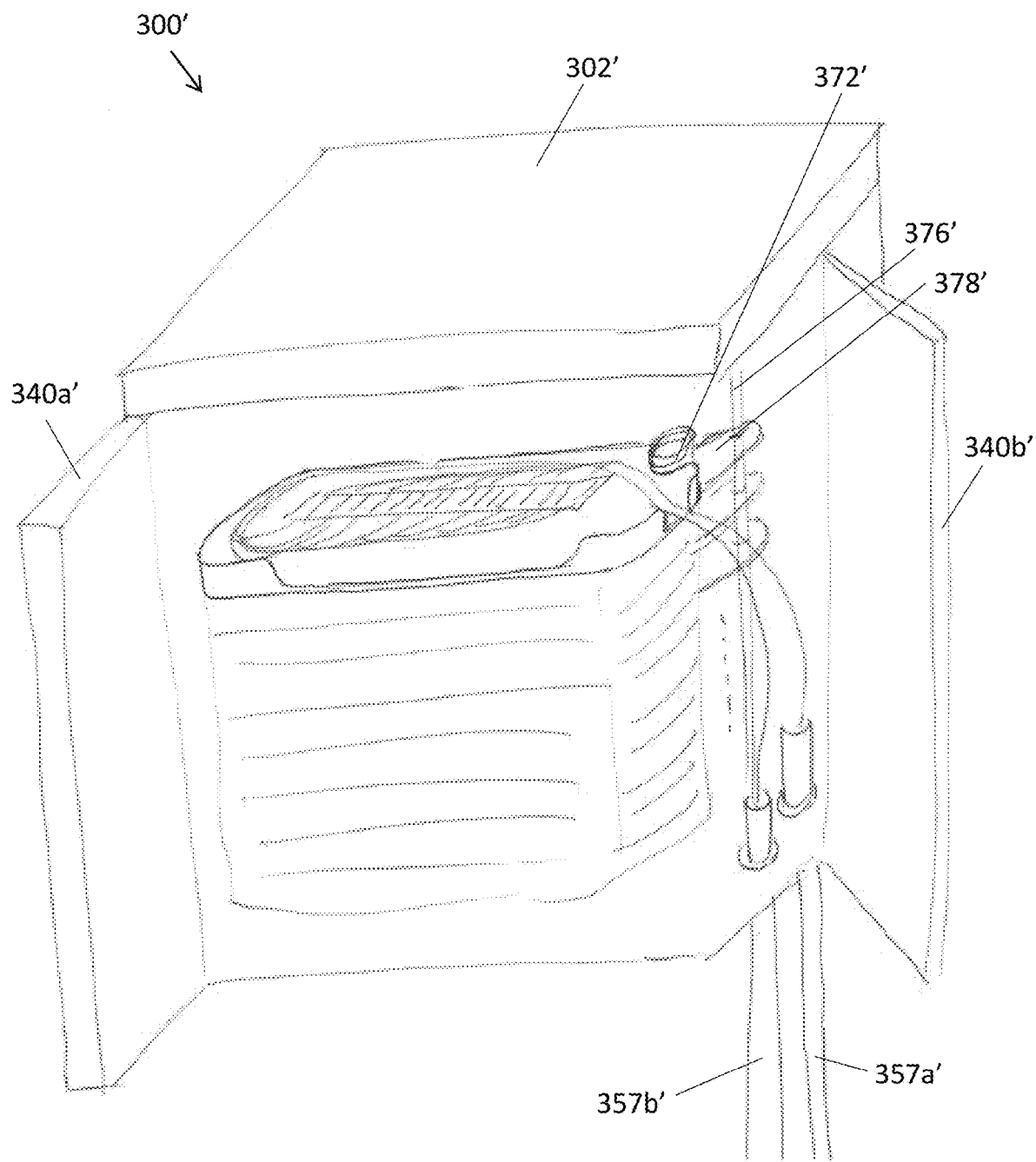
FIG. 22 is a perspective view of an optical fiber distribution system having a housing according to another embodiment of the disclosure.

For example, FIG. 22 illustrates a fiber distribution system 300' that includes a housing 302' that is generally in the shape of a box which may be mounted to another structure, such as a pole or a wall, or may otherwise be used without mounting so that it rests on a supporting surface such as a floor. Fiber distribution system 300' is illustrated as having a cassette support that is similar or identical to cassette support 370' of FIG. 8A, although it should be understood that other cassette supports described herein could be used with fiber distribution system 300'. The cylindrical bar 376' of cassette support 370' may extend along the vertical height of housing 302' between a bottom wall and a top wall, with a plurality of platforms 378' providing a first axis for rotation of cassettes, and cylindrical members 372' providing a second axis for rotation of cassettes, in the same manner as described in connection with FIG. 8A. A plurality of cassettes, including for example patch panel cassettes, storage cassettes, or splice cassettes, may be provided in a vertically stacked orientation and connected to cassette support 370' to provide for rotation of each cassette. Each cassette of fiber distribution system 300' may include a tray and/or lid substantially similar to the trays and/or lids described in connection with patch panel cassette 600 and storage cassettes 500. Cable bundles 357a', 357b' may enter and/or exit housing 302' via one or more ports in the housing 302', and individual cables may be routed from the cable bundles to the desired portion of the desired cassette within fiber distribution system 300'.

In order to allow for rotation of the cassettes out of housing 302' for maintenance, whether about a single axis of rotation or about two axes of rotation, a first door 340a' and a second door 340b' may be provided on housing 302'. In particular, door 340a' may be hingedly coupled to a front left side of housing 302', such that in the closed condition, door 340a' substantially completely covers the front face of housing 302'. Second door 340b may be hingedly coupled to a rear right side of housing 302', such that in the closed condition, door 340b' substantially completely covers the right face of housing 302'. When both doors 340a', 340b' are in the open condition, as shown in FIG. 22, the front and right faces of housing 302' are exposed, so that the cassettes within fiber distribution system 300' can easily be rotated at least partially out of the housing 302' for maintenance by a user of the system. It should be understood that, in the embodiment illustrated in FIG. 22, one or both of the doors 340a' may not need to be hingedly coupled precisely at the corner of the housing, but may be provided as a panel that is narrower than the entire width of the corresponding face of the housing 302'. This configuration may be suitable when the entire face of a side of housing 302' does not need to be exposed in order to rotate the cassettes to the desired maintenance position.

Figure 23A:
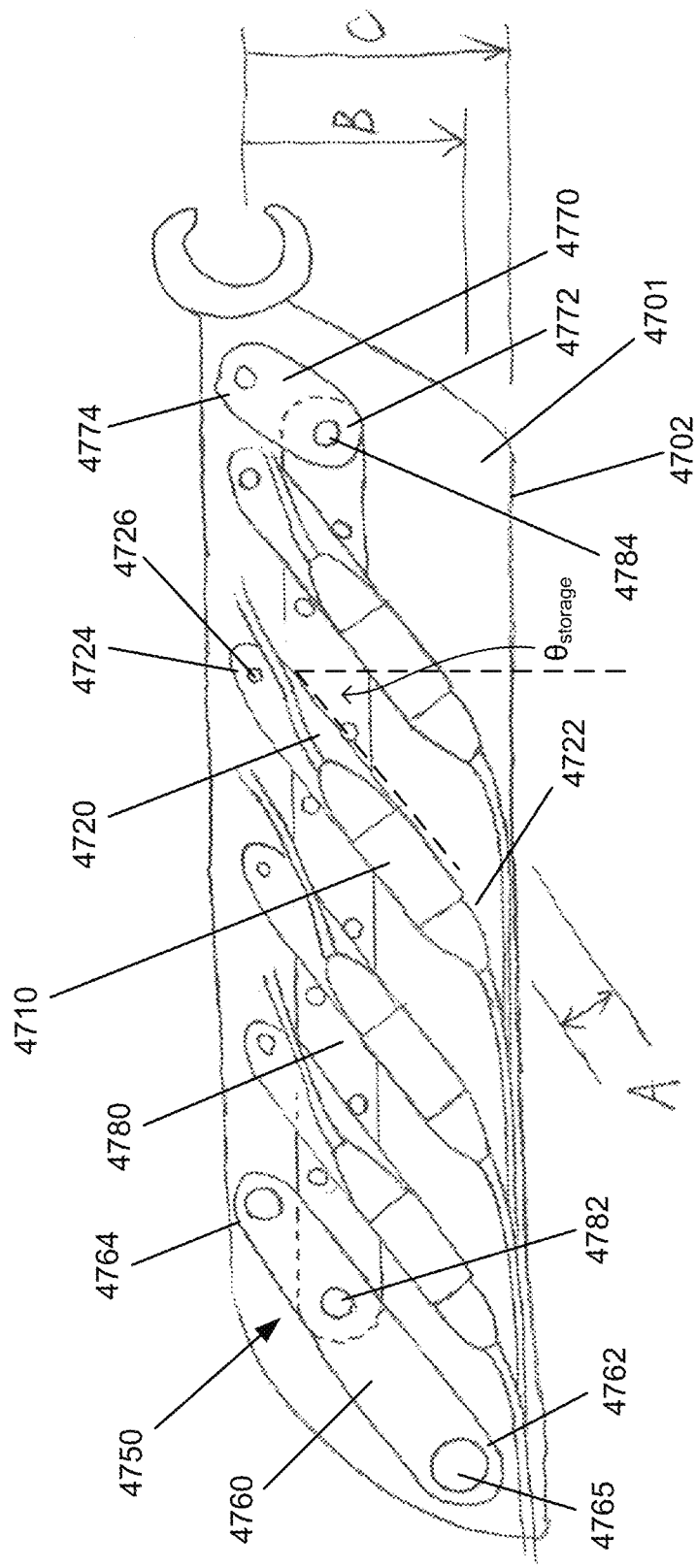
FIG. 23A is a top view of a patch panel device tray shown in a first condition.

FIG. 23A illustrates a top view of one embodiment of an arm used to control the pivoting of connectors or adapters mounted to a patch panel tray 4701. For instance, the tray 231 shown in FIGS. 3A-3B may be adapted to accommodate such an arm in order to improve a user's ability to access the adaptors or connectors 249. In the example of FIG. 23A, each of the connectors 4710 may be mounted to a respective extension member 4720. Each extension member 4720 may in turn be mounted to the tray 4701. For instance, in FIG. 23A, each extension member 4720 may include a free end 4722 and an opposing fixed end 4724. The fixed ends 4724 of the extension members 4720 may be aligned along a width of the tray 4701 (e.g., the x direction in FIG. 3A). Each connector 4710 may be positioned above and mounted to a free end 4722 of a respective extension member 4720. The fixed end 4724 of each extension member 4720 may be mounted to the tray 4701. Each connector 4710 may have a length that extends radially from the fixed end 4724 of its respective extension member 4720.

In the example of FIG. 23A, the fixed end 4724 of each extension member 4720 may be secured by a hinge 4726 that is adapted to pivot along the plane of the tray 4701 (e.g., the x-z plane in the example of FIG. 3A). In this manner, pivoting an extension member 4720 at its hinge may cause the corresponding free end 4722 and connector 4710 to revolve around the fixed end 4724 while remaining extended radially from the fixed end 4724.

Each of the extension members 4720 may further be mounted to an arm 4750 that can be used to pivot each of the extension members 4720 around their respective fixed points at the same time. The arm 4750 may include a handle bar 4760 having a free end 4762 and an opposing fixed end 4764, and a second bar 4770 also having a free end 4772 and an opposing fixed end 4774. In the example of FIG. 23A, the second bar does not include a handle, although in alternative configurations, the second bar may be extended so as to include a handle. The fixed ends of the handle bar 4760 and the second bar 4770 may be in line with the fixed ends 4724 of the extension members 4720. Further, a guide bar 4780 may be hingedly coupled to each of the handle bar and the guide bar 4780 at hinges 4782 and 4784, and may extend along the width of the tray so as to engage each of the extension members 4720. In this manner a movement of each extension member 4720 may be coordinated by the handle bar by manipulating the handle 4765. For example, as the handle bar 4760 is pivoted around its fixed end 4764, each of the second bar 4770 and the extension members 4720 may also pivot around their respective fixed ends 4724, 4774.

FIG. 23A illustrates the above-described arm 4750 in a storage condition. In the storage condition, each extension member 4720 may be rotated to extend in a direction that is offset from a depth direction of the patch panel tray 4701 (e.g., the z-axis in FIG. 3A), by an angular distance $\theta_{storage}$. As a result, each connector 4710 may extend from the fixed end 4724 around which it pivots towards a front edge 4702 of the patch panel tray 4701 by a distance B that is shorter than the fixed distance C from the fixed ends 4724 of the extension members 4724 towards the front edge 4702 of the tray 4701. Stated another way, in the storage condition, the connectors 4710 may be configured so that they do not extend over a front edge 4702 of tray 4701. The offset angle $\theta_{storage}$ at which the connectors 4710 are stored may be any value greater than 0°, and is limited by the thickness of the extension members (since the extension members would interfere with one another if rotationally pivoted too far, such as 90°.)

Figure 23B:
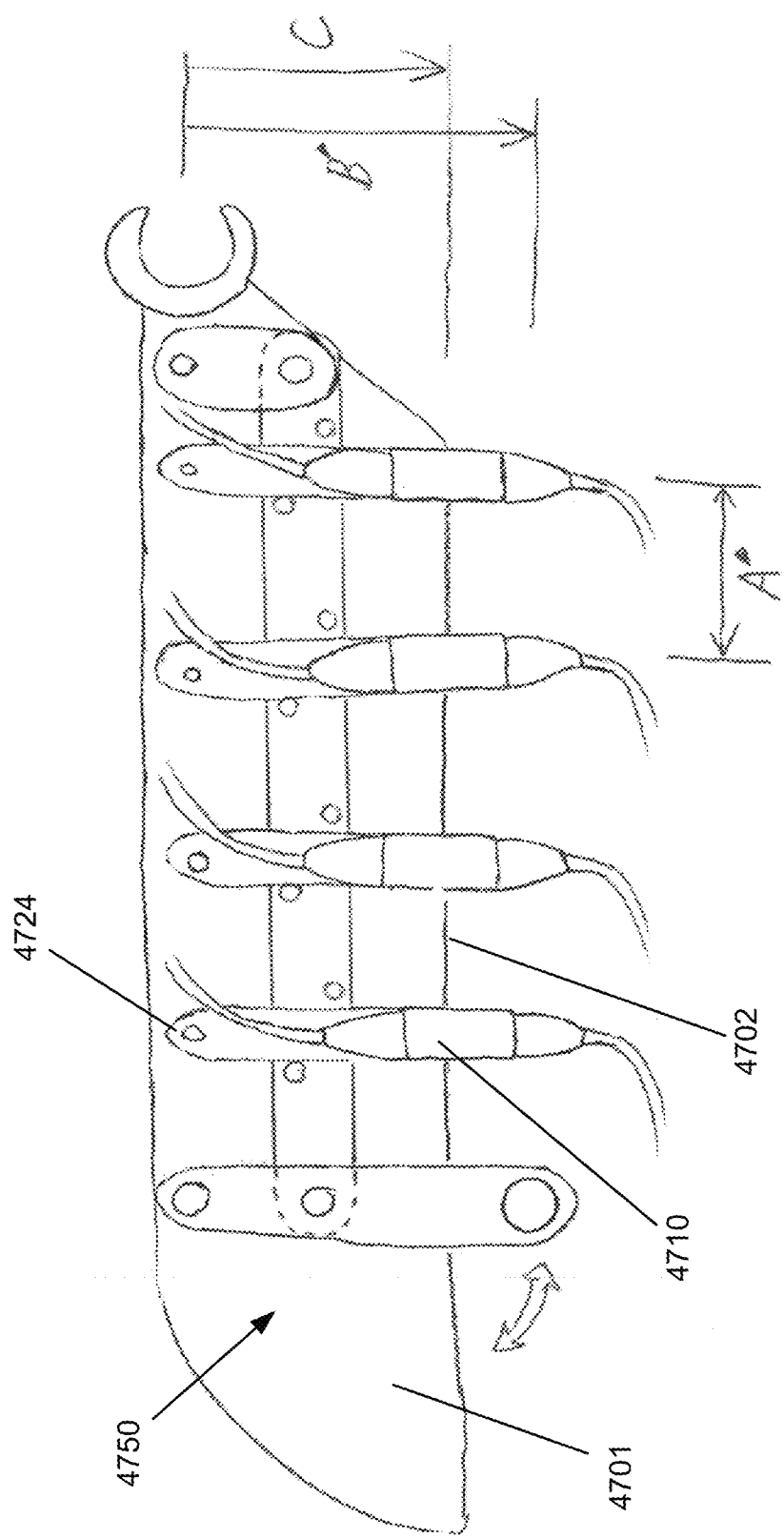
FIG. 23B is a top view of the patch panel device tray of FIG. 23A shown in a second condition.

By contrast, FIG. 23B illustrates the arm 4750 in an access condition. Each extension member may extend in the depth direction of the patch panel tray 4701. In alternative examples, the extension members may remain offset from the depth direction of the tray even in the access condition, so long as there is an angular difference between the respective directions that the extension members extend in the access and storage conditions. In the access condition, As a result, each connector 4710 may extend from the fixed end 4724 around which it pivots towards the front edge 4702 of the patch panel tray 4701 by a distance B', which may be longer than the fixed distance C. Stated another way, in the access condition, the connectors 4710 may be rotated so that they extend over the front edge 4702 of the tray 4701.

Additionally, a lateral space between each connector 4710 (in a direction perpendicular to the longitudinal direction of the connectors, extension members, or both) may be narrower in the storage condition and wider in the access condition. This is illustrated in FIGS. 23A-23B, in which the lateral space of distance A between connectors 4710 in the storage condition is relatively narrow compared to the lateral space of distance A' between the connectors 4710 in the access condition. This may allow for relatively compact storage of the connectors 4710 in the storage condition while improving accessibility to the connectors 4710 in the access condition.

FIGS. 23C-23D illustrate example configurations for a guide bar to guide movement of the extension members. In the example of FIG. 23C, for each of the extension members 4720 engaged by the guide bar 4780, the guide may include a pair of protrusions 4791, 4792 extending vertically (in the example of FIG. 3A, in the y-direction) from the guide bar 4780 in the direction of the extension member 4720. The pair of protrusions 4791, 4792 may be positioned on opposing sides of the extension member 4720, such that the extension member 4720 is bracketed between the protrusions 4791, 4792. Then, as the guide bar 4780 translates laterally, the free end 4722 of the extension member 4720 is swiveled by a pushing force applied by one of the protrusions 4791, 4792.

The protrusions 4791, 4792 may be positioned at a distance apart that is greater than a width of the extension member 4720. This may ensure that the extension member 4720 does not get locked in place as the guide bar 4780 moves to the side. Furthermore, the protrusions may be positioned on opposing edges 4780A, 4780B of the guide bar 4780. This may ensure that the extension member 4720 gets locked in place when moved to one side but not when moved to the other side. For instance, in the example of FIG. 23C, the protrusions are positioned diagonally from one another (with a first protrusion 4791 closer to a first edge 4780A of the guide bar 4780, and a second protrusion 4792 closer to a second edge 4780B of the guide bar 4780) to ensure that the extension member 4720 does not get locked in place as the guide bar 4780 translates to the left, but does get locked in place if one attempts to move the guide bar 4780 further to the right.

In the alternate example of FIG. 23D, the protrusions may be replaced by a hinge 4795. For instance, the hinge may be a hole in one of the guide bar 4780 or the extension member 4720 and a protrusion extending vertically from the other of the guide bar 4780 and extension member 4720 into the hole. The hinge may be adapted to permit the extension member 4720 to pivot around its fixed end 4724 while the hinge point of hinge 4795 remains loosely or tightly connected to a point on the guide bar 4780 as the guide bar 4780 moves laterally relative to the tray. This results in the same freedom of motion for the extension member as illustrated in FIG. 23C, except without limitation of motion to either side, while requiring a connection point between the extension member 4720 and the guide bar 4780 to remain fixed. Additionally, in this configuration, each of the extension members 4720 may double as a second bar, thereby making the addition of a separate second bar unnecessary.

Figure 24A:
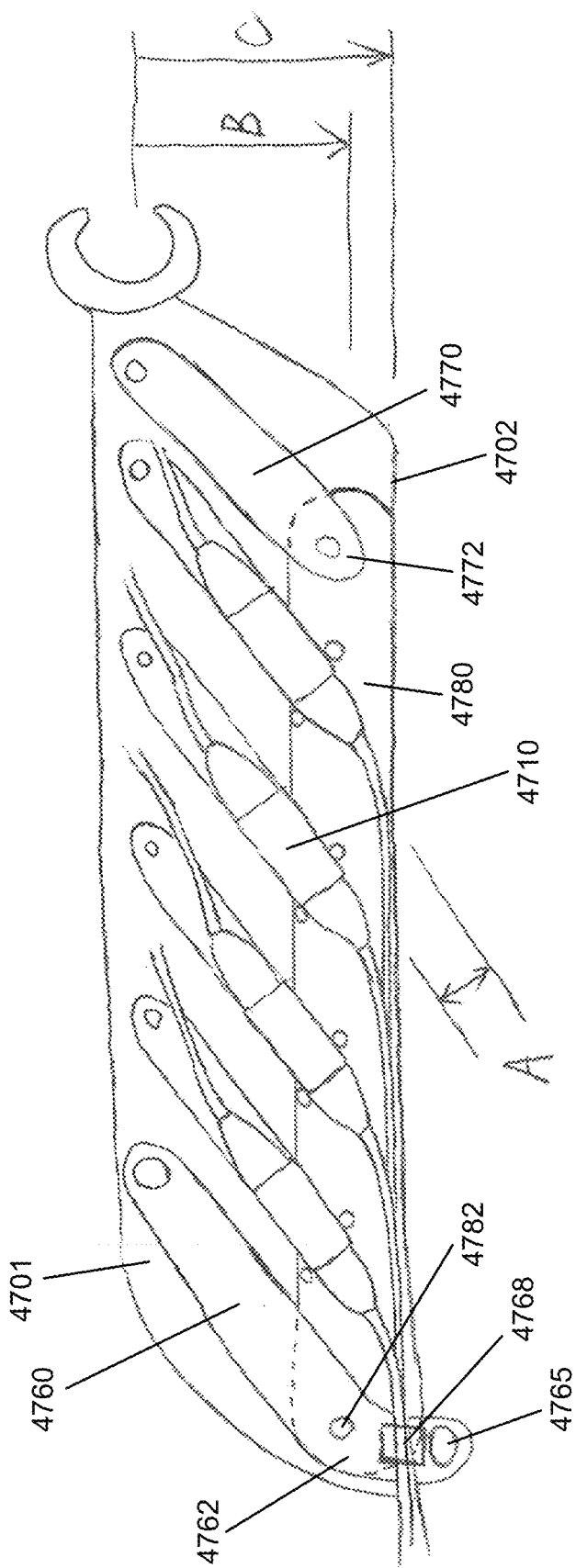
FIG. 24A is a top view of an alternate embodiment of a patch panel device shown in a first condition.
Figure 24B:
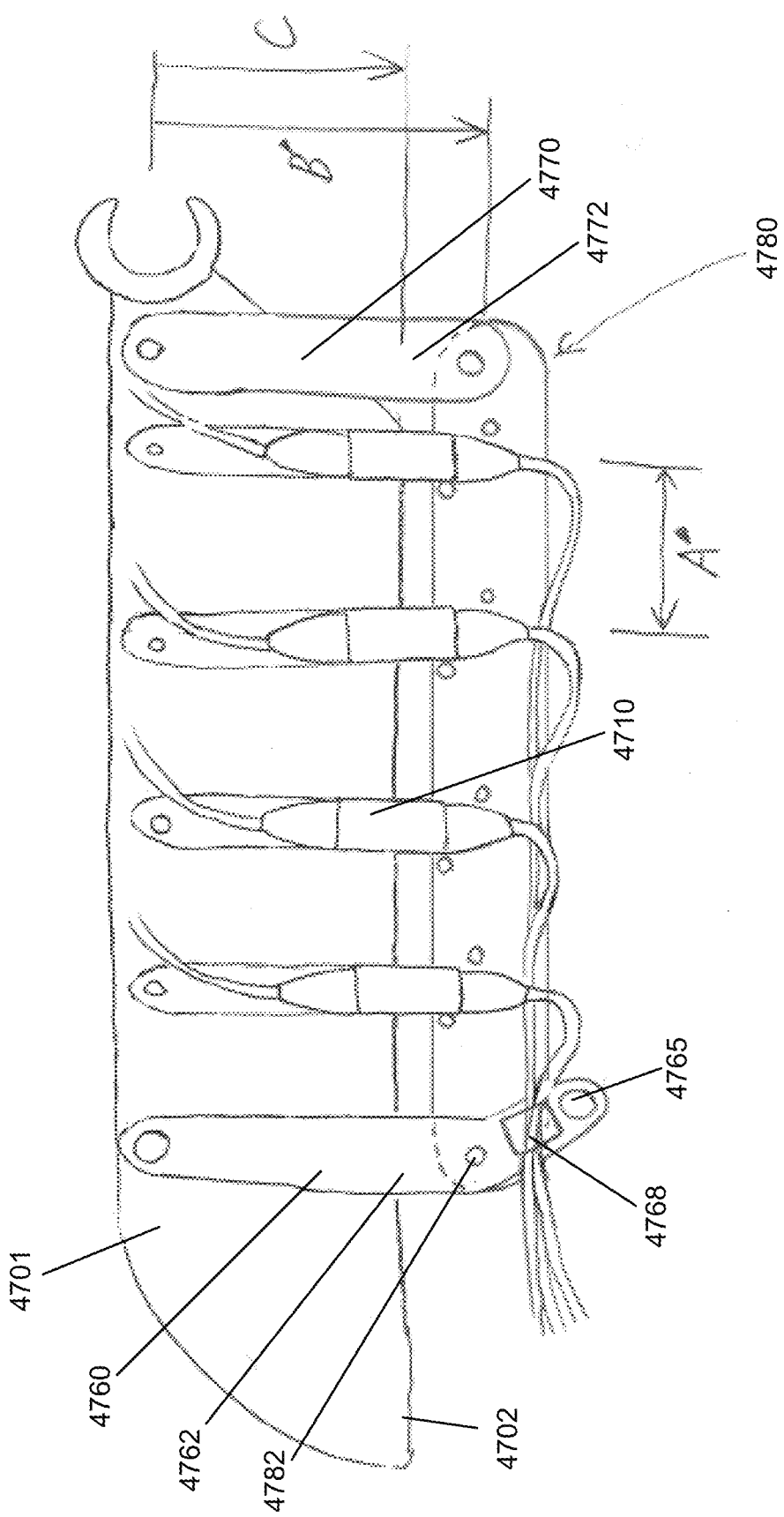
FIG. 24B is a top view of an alternate embodiment of the patch panel device of FIG. 24A shown in a second condition

FIGS. 24A-24B illustrate an alternative example configuration of an arm used to control the pivoting of connectors or adapters mounted to a patch panel tray. FIG. 24A shows the alternative configuration in a storage condition. FIG. 24B shows the configuration in an access condition. The features of the example configuration of FIGS. 24A-24B may be compared to those previously described in connection with FIGS. 23A-23D, but for one or more differences described below.

The second bar 4770 may have a length that is comparable to that of the handle bar 4760. In this manner the handle at the free end of the handle bar 4760 may be positioned at or close to the hinge that connects that the guide bar 4780 to the handle bar 4760. Further, the second bar 4760 may extend beyond an edge 4702 of the tray 4701 when moved to the access position. This in turn may result in the guide bar 4780, which is positioned between the hinges of the handle bar 4760 and second bar 4770 (which itself may be positioned at the respective free ends of those bars 4762, 4772) to extend outside of an airspace of patch panel and beyond the edge 4702 of the tray 4701. In order to accommodate the extended guide bar 4780, the free ends 4722 of the extension members 4720, or an end of the connector 4710 itself, may be used to engage the protrusions of the guide bar (as in FIG. 23C), or alternatively connect to a hinge of the guide bar (as in FIG. 24D).

Additionally, the free end 4762 of the handle bar 4760 may include a cable holder 4768, such as an aperture through which wires could be drawn, or a clip capable of clamping a plurality of wires to a surface of the handle bar 4760. As shown in FIG. 24B, the cable holder 4768 may be positioned between hinge 4782 and handle 4765. In this manner, the wire collecting mechanism may be positioned to be laterally displaced from the front ends of the connectors 4710 so that wires inserted into the connectors 4710 from the front end of the tray 4701 could run along a length of the guide bar 4780 until reaching the cable holder 4768.

Figure 25:
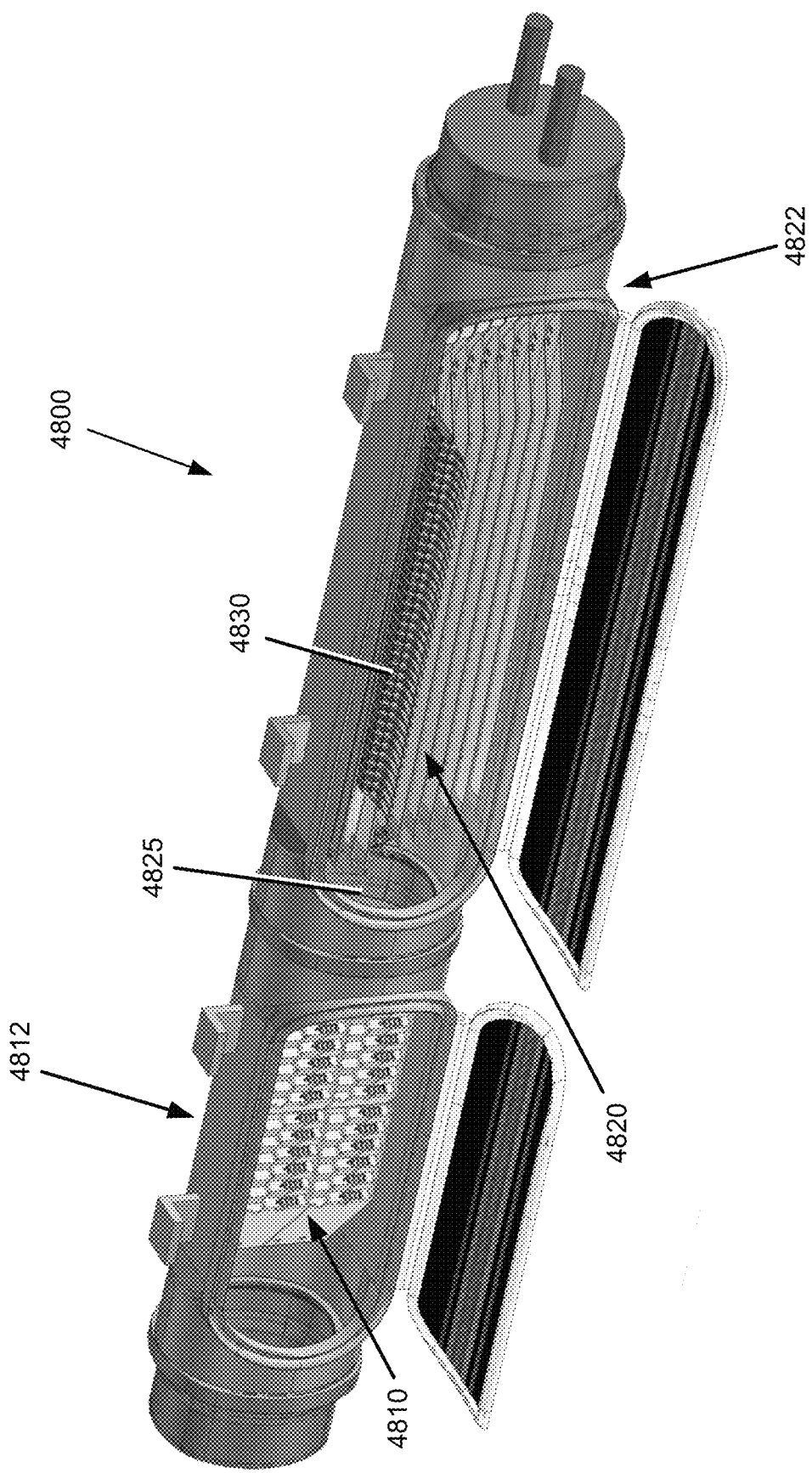
FIG. 25 is a perspective view of an embodiment of a strand-mounted optical fiber distribution system that includes main and side cabinets.

FIG. 25 illustrates a perspective view of an alternate embodiment for positioning splitters in a fiber distribution system adjacent to patch panels. In the example of FIG. 5D, splitters 400, storage cassette 500 and patch panels 600 are arranged in a stacked configuration, with the storage cassette 500 positioned on top of the splitters 400, and stacked patch panels 600 positioned above the storage cassette 500. In the alternative configuration of FIG. 25, the fiber distribution system 4800 may include splitters 4810 and patch panels 4820 positioned at a common height within the main body 4830. In some instances, the configuration may be of accommodating 144 connections. In other configurations, it may be capable of accommodating 288 connections. For instance, if the overall height of the unit is increased, then additional connections may be housed within the unit In particular, in the example of FIG. 25, each of the splitters 4810 and the patch panels 4820 is positioned in a separate cabinet unit. The splitters 4810 are contained in a first cabinet unit 4812, and the patch panels 4820 are contained in a second, separate, cabinet unit 4822. The cabinet units 4812, 4822, may be positioned adjacent to one another, and further may be attached to one another in series along the strand on which the units hang.

In operation, cables (not shown) may be guided between the splitters 4810 of the first cabinet unit 4812 and patch panel connectors 4830 in the second cabinet unit 4822. The cables may extend through an aperture 4825 between each of the cabinet units 4812, 4822. In this manner, the distribution system may be built modularly, with multiple cabinet units being positioned adjacent to one another, and cables being guided from one cabinet to a next cabinet without the cables becoming exposed at any time.

The configuration of FIG. 25 may maintain alignment between the connection points in either of the adjacent cabinet units and the cable bundles entering at the cable termination unit, thereby improving routing of the cables in the distribution system. For instance, in some configurations, a cabinet unit may include a plurality of vertically aligned channels through which cables may be guided from an exterior to an interior of the cabinet unit, and each channel may be vertically aligned with a corresponding cassette of the patch panels. By moving the splitters to the side of the cabinet unit, the cassettes of the patch panels may be further extended over the height of the cabinet unit, thereby improving alignment between the cassettes and the channels. Additionally, since the cables are routed primarily horizontally instead of vertically, each cable is more likely to be extended a significant length between the splitter and the patch panel, which further ensures that the cable remains relatively taut within the system.

Figure 26A:
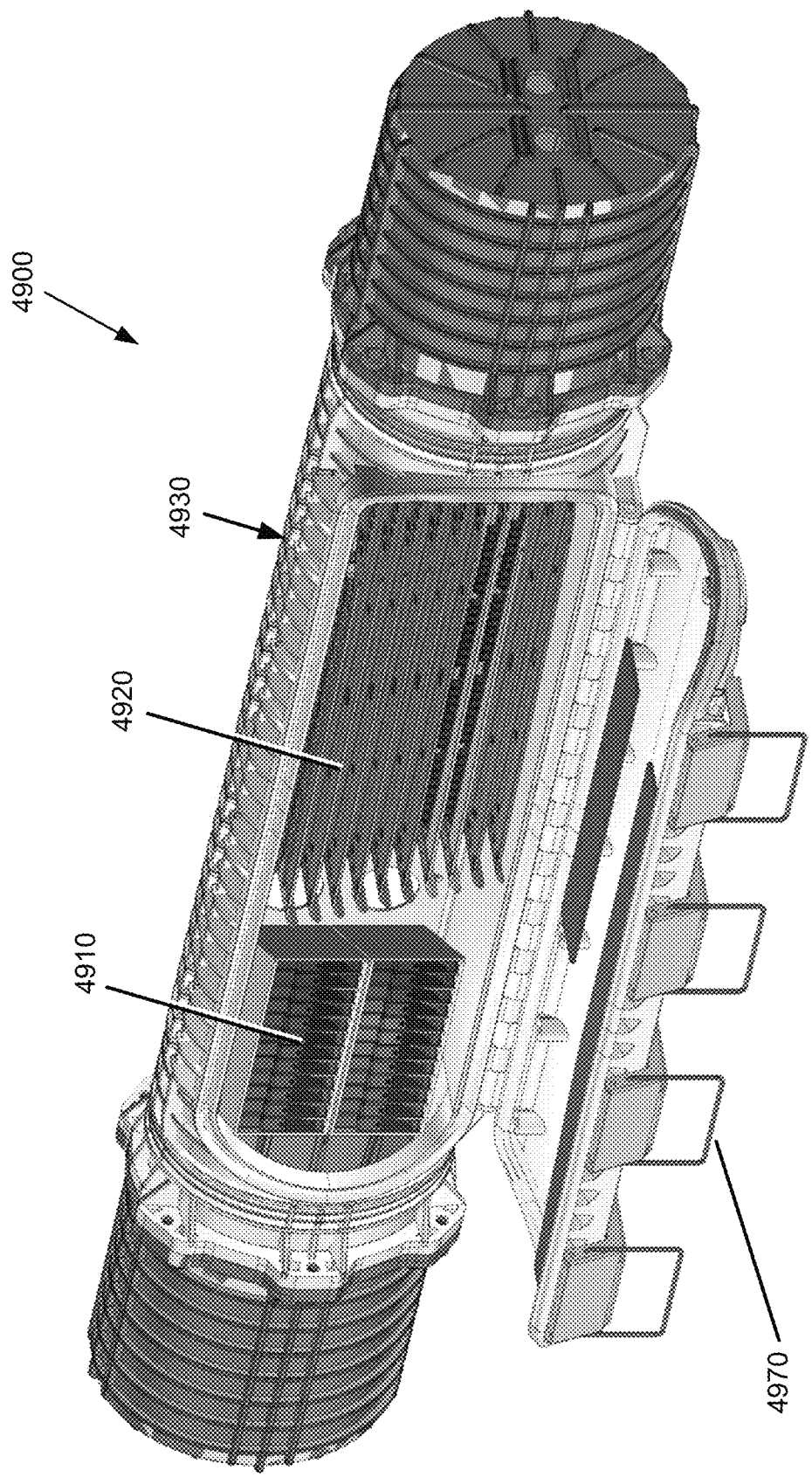
FIGS. 26A-26B illustrate different views of another embodiment of an optical fiber distribution system that includes a patch panel and splitters in a side-by-side configuration in a main cabinet.
Figure 26B:
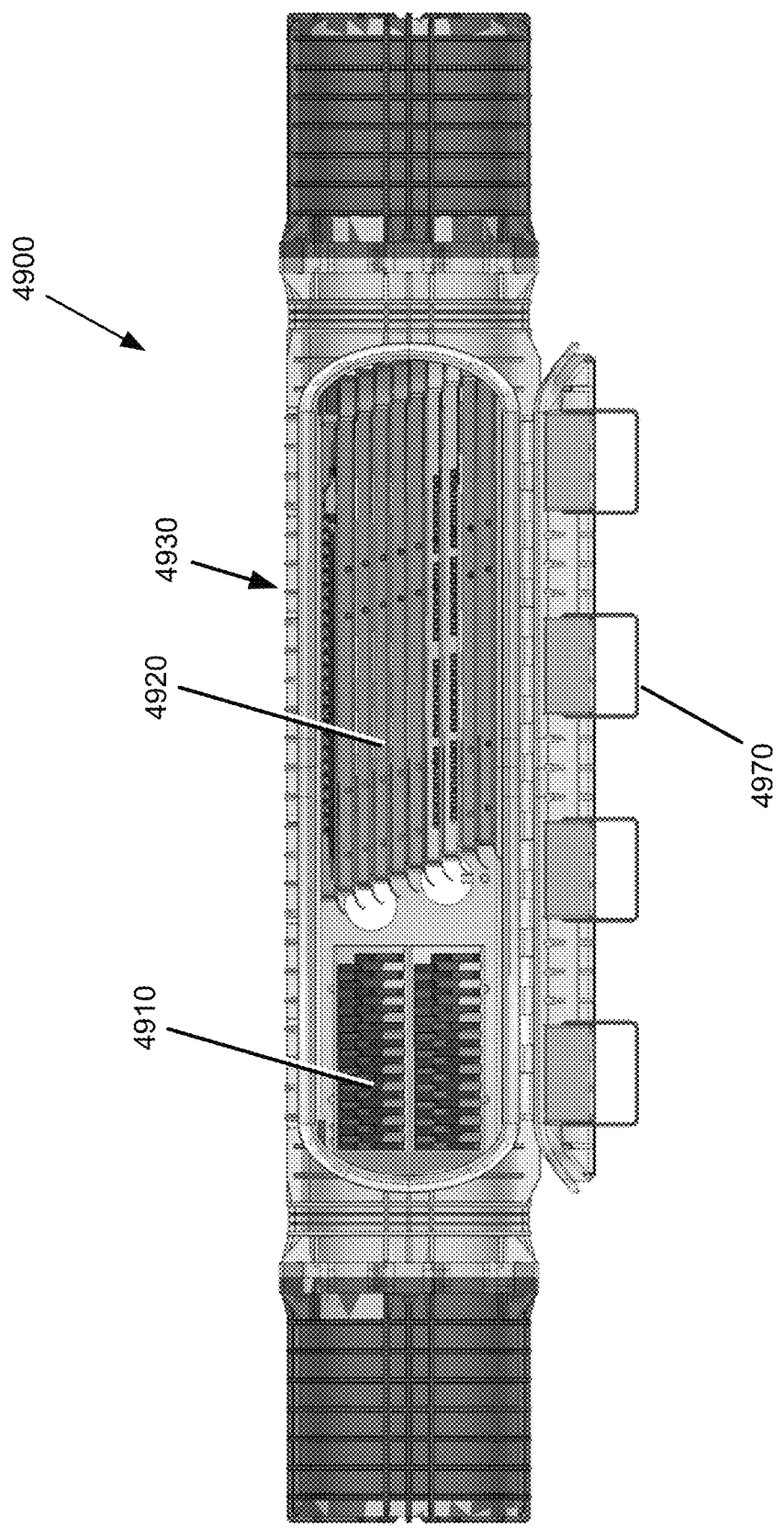

FIGS. 26A-26B illustrate an alternative configuration of a fiber distribution system 4900 in which the splitters 4910 and patch panels 4920 positioned adjacent to one another. In FIG. 26A, the configuration is shown from a perspective view. In FIG. 26B, the configuration is shown from a front view.

The splitters 4910 of the present configuration are comparable to the splitters 4810 shown in FIG. 25. Similarly, the patch panels 4920 of the present configuration are comparable to the patch panels 4820 shown in FIG. 25. But, unlike the configuration of FIG. 25, the splitters 4910 and patch panels 4920 of the present configuration are housed in a common cabinet unit 4930. In this regard, cables may be routed between the splitters 4910 and the patch panels 4920 without exiting the cabinet unit 4930. An example routing configuration for cables is shown in connection with the embodiment of FIGS. 27A-27C.

Figure 27A:
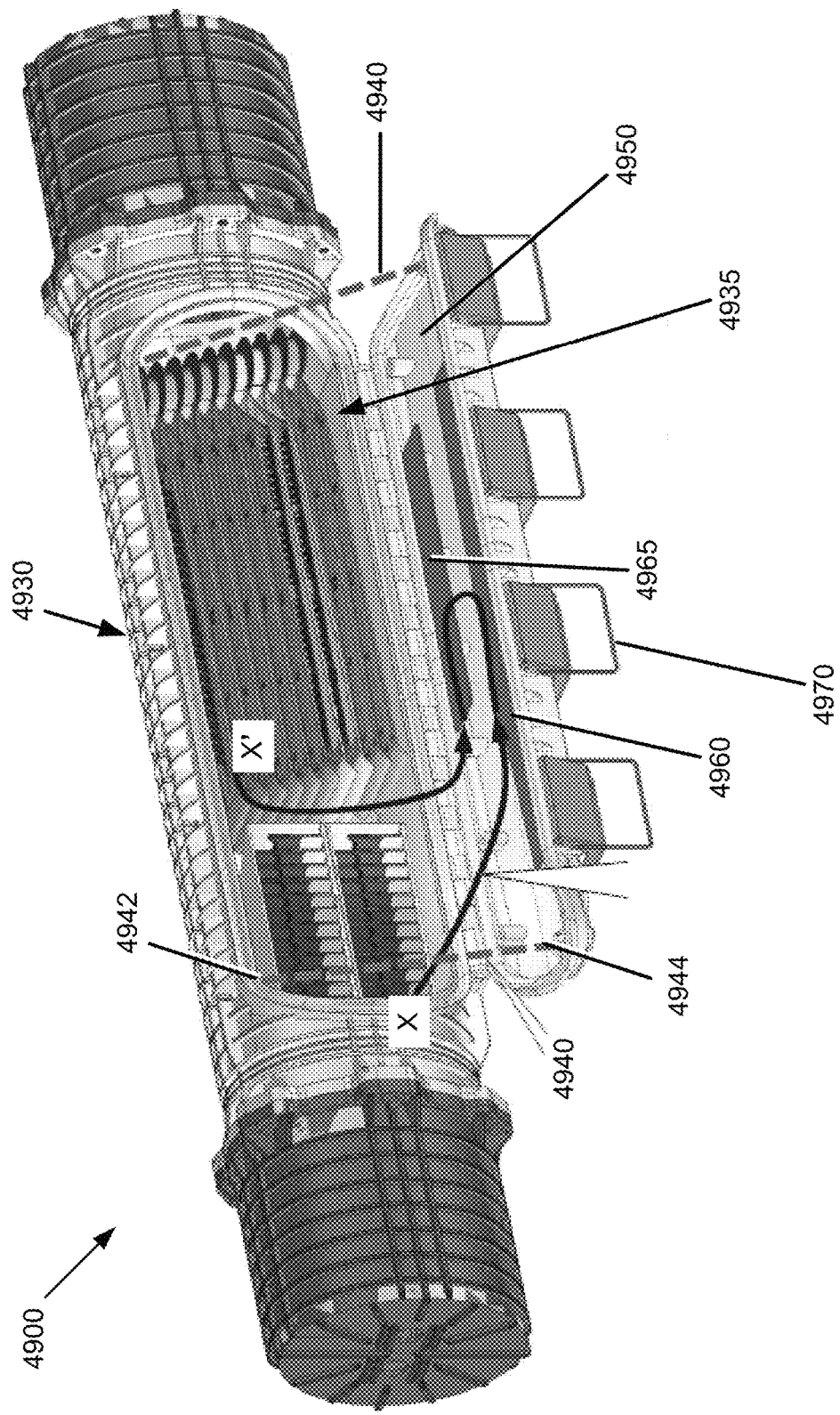
FIGS. 27A-27C illustrate different views of another embodiment of an optical fiber distribution system that includes a limiting chain.
Figure 27B:
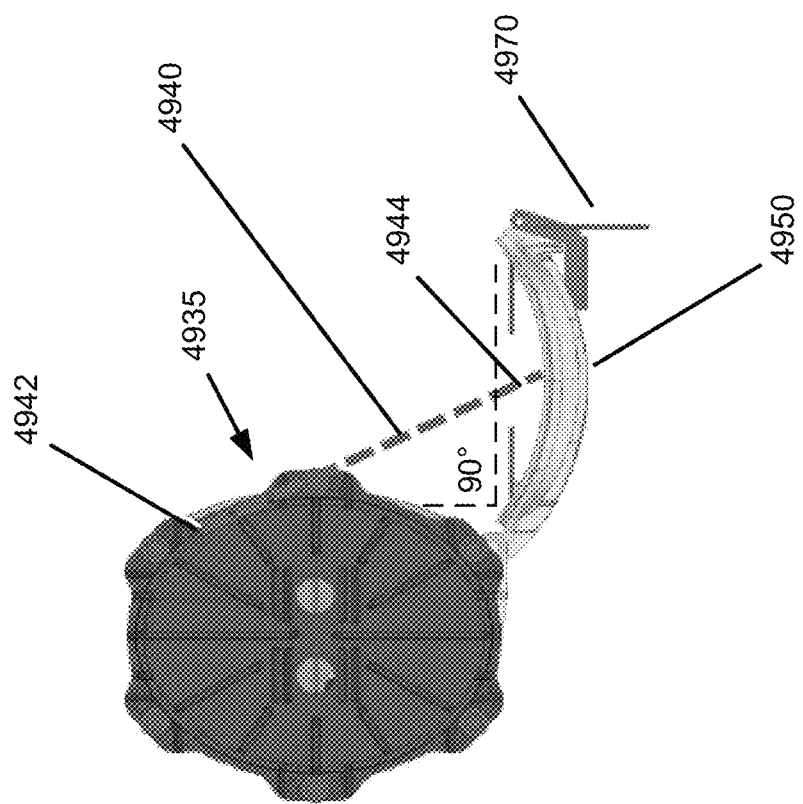
Figure 27C:
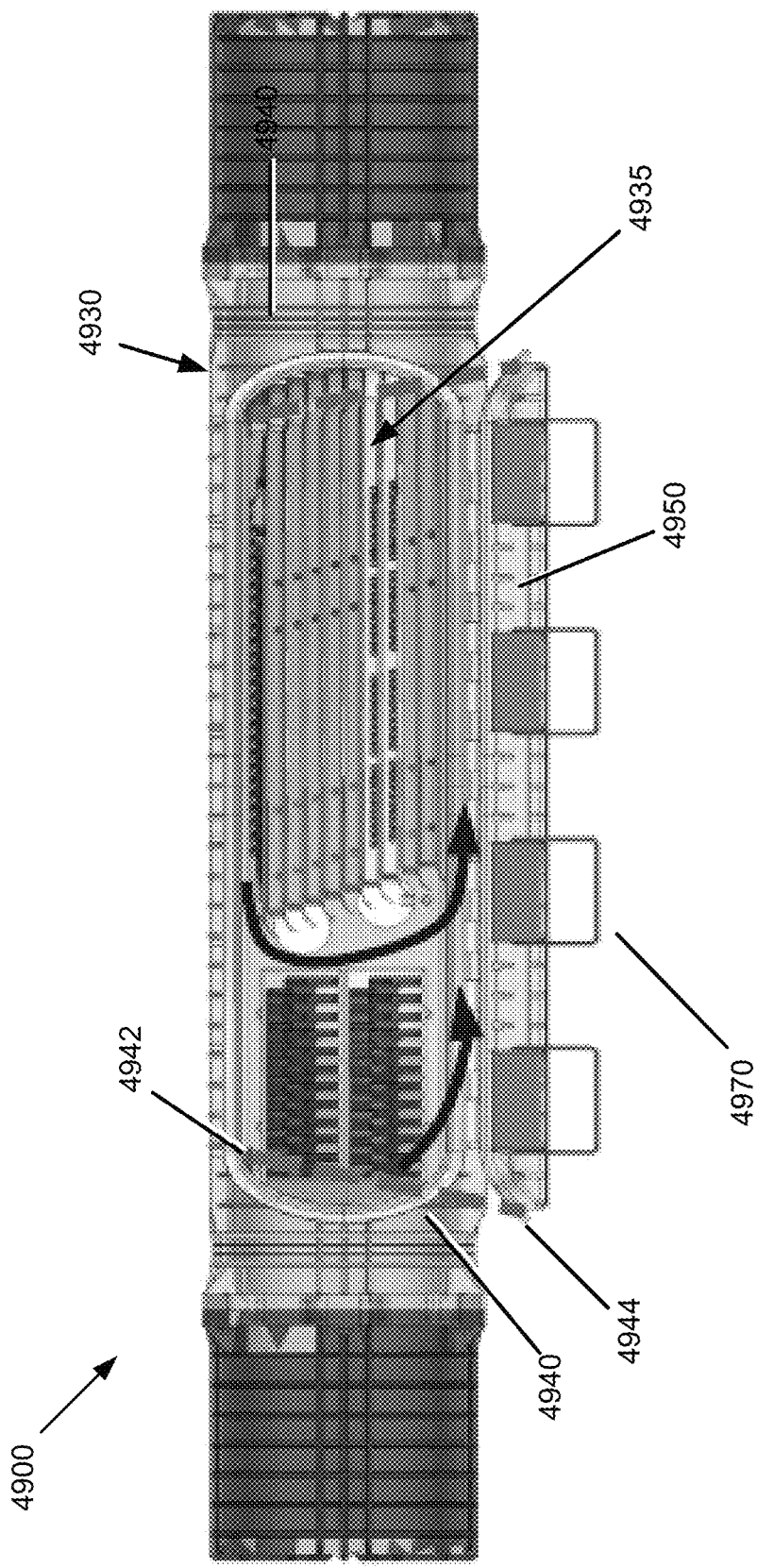

The fiber distribution embodiment of FIGS. 27A-27C is largely comparable to that of FIGS. 26A-26B, except that in FIG. 27A-27C, the cabinet unit 4930 further includes one or more support members 4940, such as chains, wires, bands, strings, etc. FIG. 27A is a perspective view of the system 4900. FIG. 27B is a side view of the system 4900. FIG. 47C is a front view of the system 4900.

Each support member 4940 may have a first end 4942 coupled to an interior surface of the cabinet unit 4930 close to an upper edge of the cabinet unit opening 4935, and a second end 4944 coupled to an inner surface of the coupling door 4950 configured to seal the cabinet unit opening 4935. In the example of FIGS. 27A-27C, two chains are shown, although in other examples a single support member or additional support members may be included. The chain 4940 may have a length designed to permit the coupling door 4950 to open to a predetermined angle without opening past the predetermined angle. For instance, the support member may have a length that permits the door 4950 to open until it is substantially parallel with the floor. For instance, in FIG. 27B, the support member 4940 is configured to permit the door 4950 to open about 90 degrees. Also, the inner surface of the door 4950 may be concave. Thus, the door 4950 may function as a surface or a receptacle for supporting cables while the door 4950 is open.

The door 4950 may further include one or more tracks or guides for holding and guiding cables between the splitters and the patch panels. For instance, two guides 4960, 4965 are shown in FIG. 27A. Each guide 4960, 4965 may be slat or board positioned at a surface of the inner surface of the door 4950, thereby forming a crevice underneath the slat into which the cables may be tucked. Each of the guides may have a length along which the cables are guided, and the lengths of the guides may be substantially parallel to one another. The arrows in FIGS. 27A and 27C show an example routing for a cable. One end of the cable (e.g., at point X) may extend from the splitters 4910 towards a first guide 4960 positioned at an inner surface of the cabinet unit coupling door 4950. An opposite end of the cable (e.g., at point X') may extend from a connector of the patch panels 4920 towards a second guide 4965 positioned at the inner surface of the door 4950. The guides 4965 may be configured to permit the cable ends extending thereto to run in the same direction. In this manner, a given cable can be wound through both guides 4960, 4965 while from a side of the opening 4935.

As noted above, support members may improve functionality of the guides mounted to the inner surface of the coupling door. The cables may be routed a certain amount of slack such that opening the cabinet unit door does not place undue tension on the cables. However, the amount of slack provided may be limited. The support members may then ensure that the opening of the door does not exceed the provided slack such that the door places undue tension on the cables. Additionally, the support members may be positioned on the side edges of the cabinet unit opening 4935. In this manner, the support members may not interfere with the routing of the cables.

The door of the cabinet unit may further include one or more latches for securing the door in a closed position. For instance, latches 4970 may be connected to a bottom edge of the door 4950 opposite the edge of the door that is hingedly connected to the cabinet main body. The latches 4970 may be connected by hinges, whereby each latch 4970 may pivot along a transverse plane of the cabinet unit (e.g., the plane shown in FIG. 27B). The cabinet unit main body may further include corresponding hooks (not shown) or other connecting elements positioned at or close to an upper edge of the opening 4935, whereby when the door 4950 is closed, each latch 4790 may be pivoted on its hinge towards the top of the main body until engaging a corresponding hook or other connecting element positioned in alignment with the latch. In the example of FIGS. 26A-26B and 27A-27C, four latches are shown in alignment along a width of the bottom edge of the door 4950, although more or fewer latches may be provided in other examples.

Figure 28A:
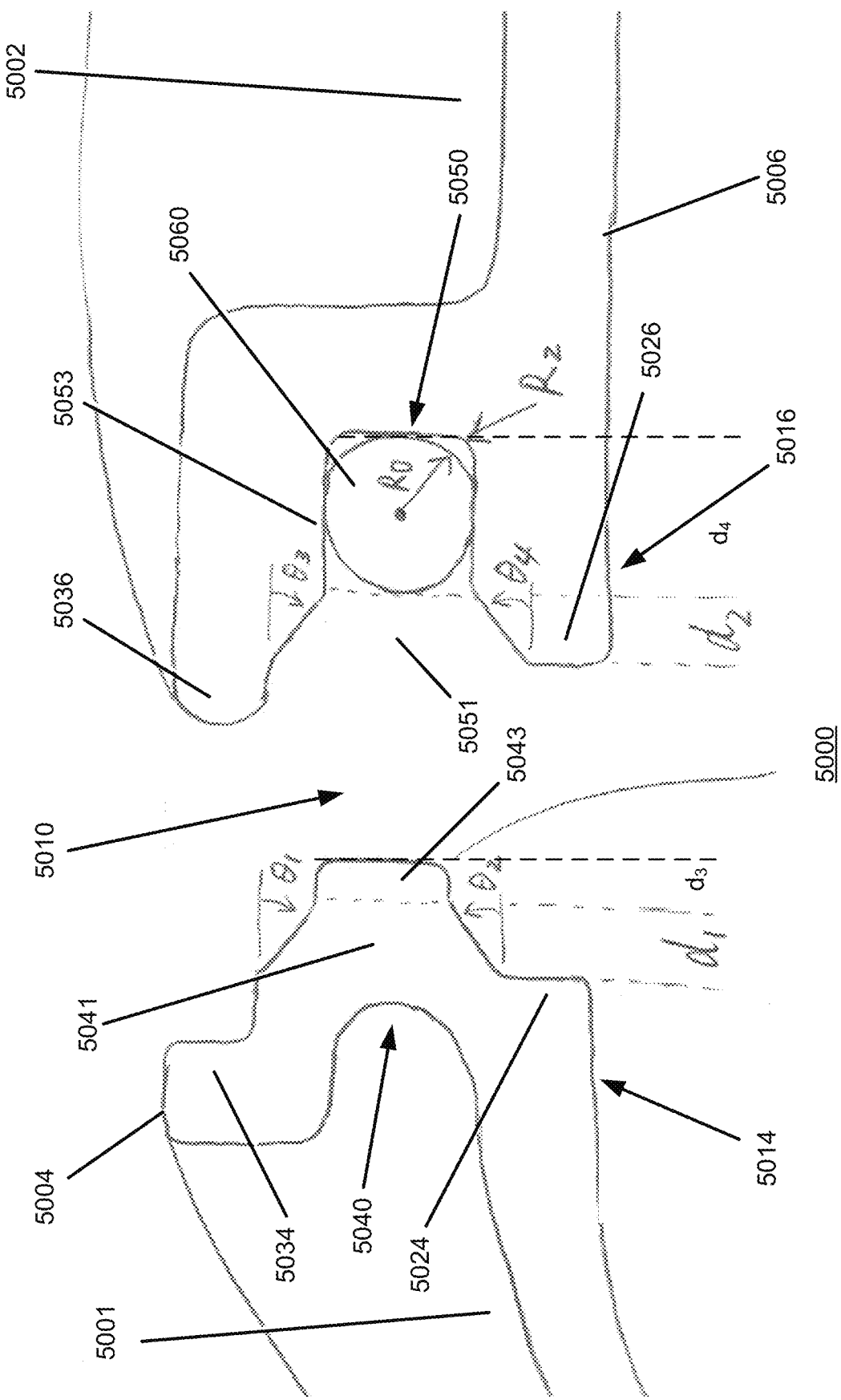
FIG. 28A is a cross-section of a portion of an alternate embodiment of a door connected to a main body of a cabinet unit.
Figure 28B:
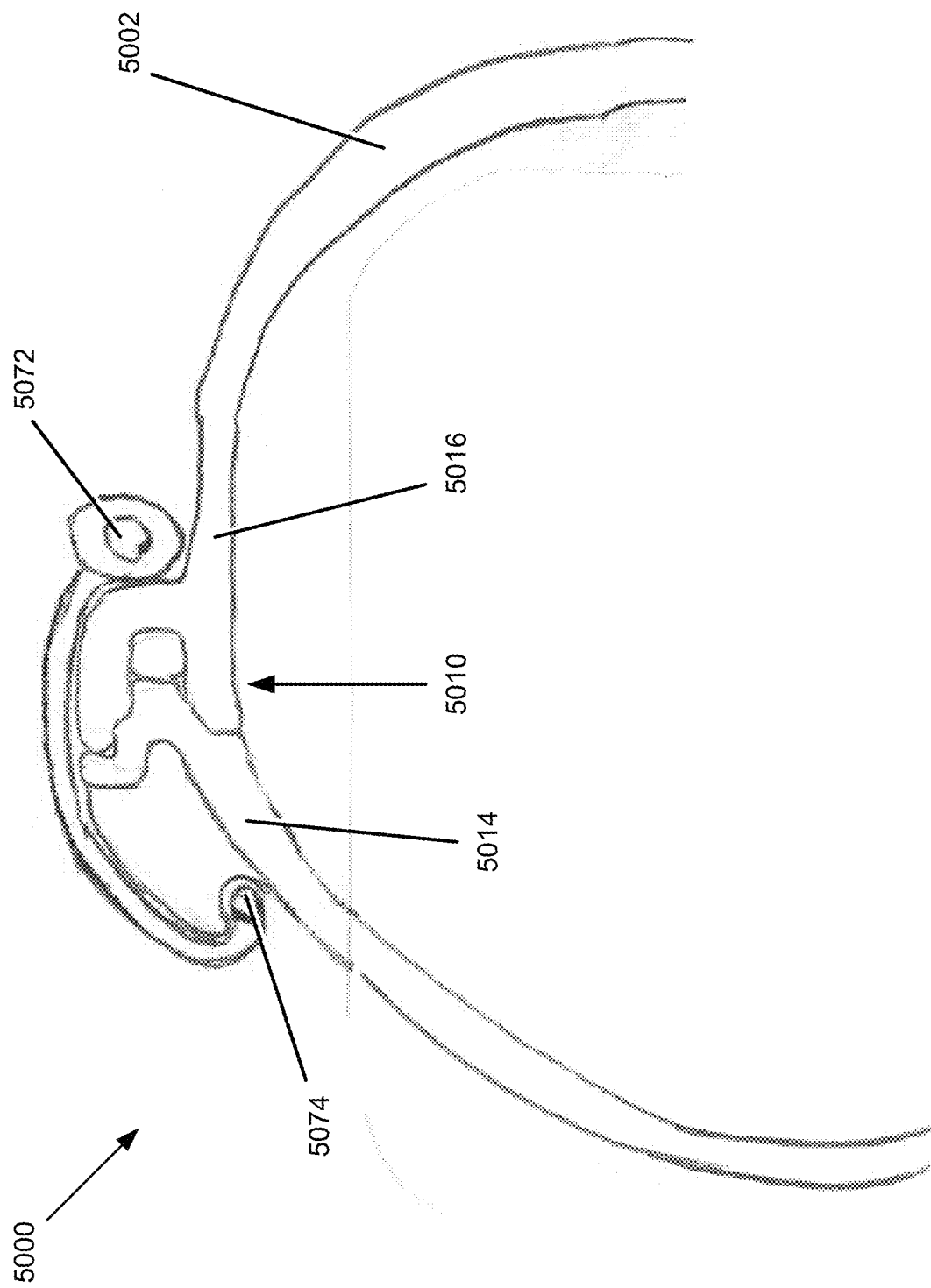
FIG. 28B is a zoomed-out view of a the cross-section of FIG. 28A.

The latches may be provided to properly seal the cabinet unit from external environment, such as water or other natural elements. An example latch configuration is shown in FIGS. 28A-28B, with the latch being shown more clearly in FIG. 28B and the resulting seal more clearly in FIG. 28B. FIG. 28A illustrates a cross-section of a portion of a door 5001 connected to a main body 5002 of a cabinet unit 5000. The portion shown in FIG. 28A is a portion of a seal 5010 for sealing the door 5001. The seal 5010 may be tightened and loosened using a latch, screw, or other appropriate mechanism. Internal components of the cabinet unit 5000 are omitted from the illustration for purposes of clarity.

An outer surface 5004 of the main body 5002 and door 5001 may be rounded, forming a cylinder or an oblong or oval shaped cylinder. An inner surface 5006 of the main body 5002 may be curved like the outer surface 5004 or may be relatively flat compared to the outer surface 5004. As shown in FIG. 28A, the door 5001 and main body 5002 are separated by a break or gap, whereby a first end 5014 is configured to removably engage a second end 5016. The first end 5014 may be an edge of the door, and the door 5001 may be hingedly affixed to the main body 5002 from an opposite edge (not shown). The second end 5016 may be an edge of the main body 5002.

As shown in FIG. 28A, the first end 5014 may include an inner shoulder 5024 and an outer shoulder 5034, configured to engage a corresponding inner shoulder 5026 and outer shoulder 5036 of the second end 5016. Surfaces of the shoulders 5024, 5026, 5034, 5036 may be substantially perpendicular to a direction in which the ends 5014, 5016 move to engage and disengage from one another.

Additionally, the first end 5014 may include a protrusion 5040 that extends outward from the inner and outer shoulders 5024, 5034, towards the second end 5016. Conversely, the second end 5016 may include a recess 5050 dimensioned to receive the first end 5014. In some examples, the protrusion 5040 may be tapered. In other instances, the protrusion may not be tapered. In the particular example of FIG. 28A, a lower portion 5041 (e.g., closer to the shoulders, farther from the recess 5050) of the protrusion 5040 is tapered whereas an upper portion 5043 (e.g., farther from the shoulders 5024, 5034, closer to the recess 5050) of the protrusion 5040 is not tapered. Similarly, the recess 5050 may be tapered, or not tapered, or may have a combination of shallow portion 5051 that is tapered and a deep portion 5053 that is not tapered. The shoulders 5024, 5026, 5034, 5036, may not be configured with a taper, such that each end 5014, 5016 has a tapered portion layered in between non-tapered portions on either side. The non-tapered portions may improve both an overall rigidity and fit of the seal 5010, for instance to withstand external forces exerted on the cabinet as well as to prevent substances from leaking into the cabinet. In this regard, a width of the upper portion 5043 of the protrusion 5040 may be equal to or just slightly less than (e.g., on an order of millimeters, less than a millimeter) a width of the shallow portion 5051 of the recess 5050 in order to provide a sufficiently tight fit between the ends 5014, 5016.

A depth $d_1$ of the lower portion 5041 of the protrusion 5040 may be equal to or greater than a depth $d_2$ of the shallow portion 5051 of the recess 5050. In the example of FIG. 28A, $d_1$ is only slightly greater than $d_2$ on the order of millimeters or even less than a millimeter. This may ensure a proper seal between the tapered edges of the protrusion and the recess, even if a small space remains between opposing shoulders of the ends of the main body. Additionally, a depth $d_3$ of the upper portion 5043 of the protrusion 5040 may be less than or equal to a depth $d_4$ of the deep portion 5053 of the recess 5050. In the example of FIG. 28A, $d_3$ is much less than $d_4$. This may leave a space for positioning an O-ring 5060 within the recess 5050. The O-ring 5060 may have a radius $R_0$ that is less than half of a width $R_2$ of the recess 5050, such that there is excess space to allow for deformation of the O-ring 5060 when the protrusion 5040 is pushed into and engages the recess 5050.

In some examples, the protrusion 5040 may further include a force concentrator, which may be a smaller protrusion that extends outward from the protrusion 5040 towards the recess 5050. The force concentrator may provide an additional force on the O-ring 5060 in order to ensure a proper seal. In this regard, a length of the force concentrator may be equal to or greater than a difference between $d_3$ and $d_4$ minus the width of the O-ring 5060. This would result in the force concentrator contacting and exerting force on the O-ring 5060 when the seal 5010 is closed.

An angle $\theta_1$ of a taper at the outer shoulder side of the protrusion 5040 may be greater than or equal to an angle $\theta_3$ of a taper at the corresponding outer shoulder side of the recess 5050 wall. In the example of FIG. 28A, $\theta_1$ is slightly greater than $\theta_3$ in order to ensure a proper fit between the engaging outer shoulders of the two main body ends. Similarly, an angle $\theta_2$ of a taper at the inner shoulder side of the protrusion 5040 may be greater than or equal to an angle $\theta_4$ of a taper at the corresponding inner shoulder side of the recess 5050 wall. In the example of FIG. 28A, $\theta_2$ is slightly greater than $\theta_4$ in order to ensure a proper fit between the engaging inner shoulders of the two main body ends. Also, in the example of FIG. 28A, the protrusion 5040 and recess 5050 may be symmetrical (e.g., $\theta_1=\theta_2$, $\theta_3=\theta_4$). However, in other examples, the angles may be different, for instance, having a shaper taper on the inside shoulder than the outside shoulder, or vice versa.

As noted above, the example geometries shown in FIG. 28A are intended to ensure a proper seal at the gap when the cabinet door is properly closed. Those skilled in the art will appreciate that a proper seal may be achieved using other configurations or geometries. For instance, the upper portion 5043 of the protrusion 5040 may be omitted entirely, and a depth of the deep portion 5053 of the recess 5050 may be shortened such that the O-ring 5060 extends into the shallow portion 5051 of the recess 5050. In this manner, the tapered portion of the protrusion may be capable of deforming the protruding part of the O-ring and thus forming a proper seal.

FIG. 28B illustrates a zoomed out view of the portion shown in FIG. 28A. In FIG. 28B, a latch 5070 is visible. The latch 5070 may be mounted to one end of the main body 5002 and may be removeably connectable to an opposing end of the main body 5002. For instance, in FIG. 28B, the second end 5016 includes a hinge 5072 mounted to an outer surface of the main body 5002, and the first end 5014 includes a hook or groove 5074 to which a free end of the latch 5070 may be hooked. A body of the latch may be made out of a flexible material, such as a metal wire. The metal wire may be countered to a shape of the outer surface of the main body 5002.

In some examples, the latch may be made of a bar that is configured to be hooked and a lever hingedly coupled to the unit in order to pull the bar in a direction towards the hook, for instance as shown in FIGS. 26A-B and 27A-C. In those examples, the bar is U-shaped in order to improve engagement with a hook. In other examples, the latch may be a bar that is itself hingedly coupled to the unit, whereby the bar may be rotated in and out of the hook without an additional force exerted by a level. In such an instance, the bar may be slightly flexible to allow for it to stretch over the hook when being pulled into or out of engagement. In some examples, the force applied by the latch or the hinge connected to the bar (in order to maintain the seal) may be in at least a direction that tangents an outer surface of the main body. Additionally or alternatively, the seal 5010 may be configured to protrude from the main body (e.g., as shown in FIG. 28B), such that each of the hinge 5072 and the groove 5074 are recessed relative to the seal 5010. This may result in the body of the latch 5070 curling from the hinge 5072 over the seal 5010 and back towards the main body 5002, thus providing a force in a radial direction of the cabinet unit 5000.

In the example of FIG. 28B, the latch 2070 may be positioned on a side of the main body. Thus, when a user is facing the fiber distribution system, the user may be able to see or at least access at least the free end of the latch in order to open the door. However, the fixed end of the latch may not be visible or accessible to the user. Additionally, positioning the latch on the side of the main body may allow the door to be positioned on the front of the body and to swing open towards the front when released.

Although fiber distribution systems 300 and 300' described above are generally described as including splitters 400, storage cassettes 500, and/or patch panel cassettes 600, it should be understood that many of all of the concepts described herein could be equally applicable to systems having the same general housing structures, sealing and locking mechanisms, and accessibility features such as rotation of trays, while having different functional components positioned on the trays housed in the system. Thus, it should be understood that the disclosure is not limited to the particular functionality of the cassettes described herein, but rather encompasses similar structural features that have different functional components, such as splice cassettes, fusion cassettes, etc.

Figure 29A:
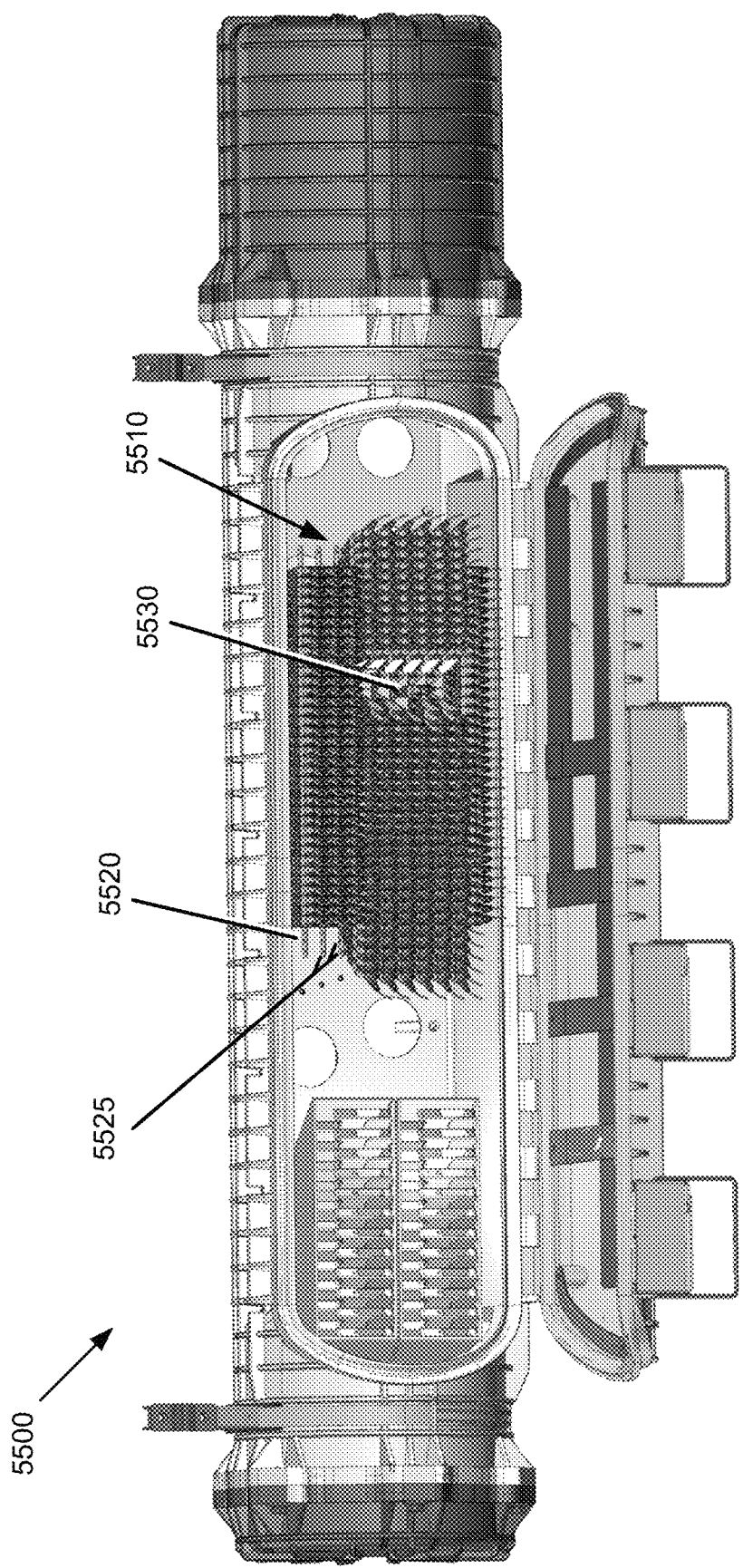
FIG. 29A is a perspective view of another embodiment of a strand-mounted optical fiber distribution system.
Figure 29B:
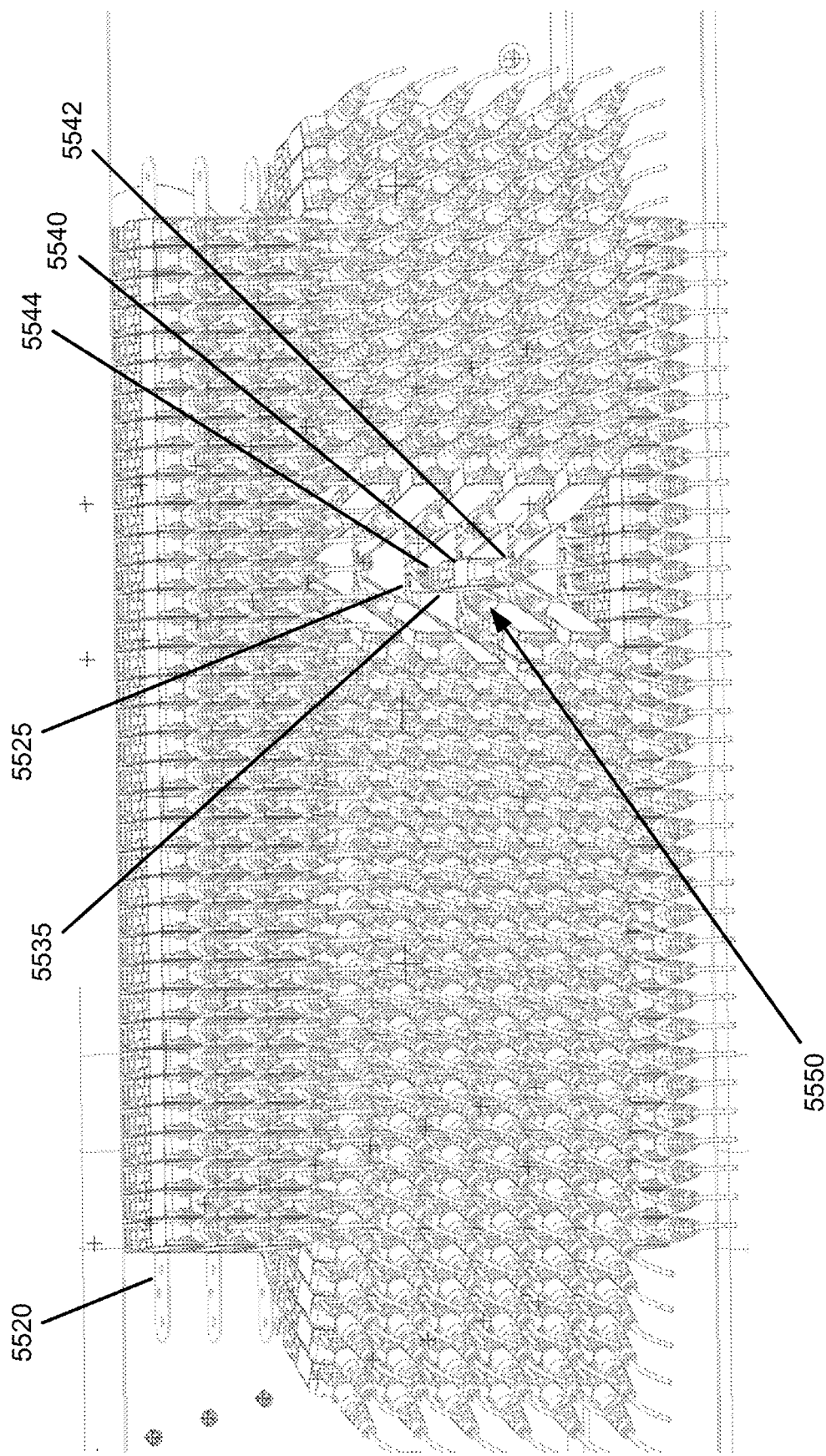
FIG. 29B is a zoomed-in view of a portion of the perspective view of FIG. 29A

The above examples demonstrate how one may improve accessibility of patch panel cables that have been positioned on a rotating arm or tray. However, in other example, accessibility to individual cables may be achieved by making each cable adapter individually rotatable. An example configuration is shown in FIGS. 29A and 29B, in which a main body of a cabinet unit 5500 is shown. FIG. 29A illustrates a perspective view of an interior portion of the cabinet unit 5500, including an array 5510 of optical fiber connectors. A portion of the array 5510 is shown in greater detail in the zoomed illustration of FIG. 29B.

A plurality of support bars 5520 are mounted to an inner surface of the cabinet unit 5500. In the example of FIGS. 29A and 29B, the support bars 5520 are shown as mounted to an inner surface of a back wall of the cabinet unit 5500, although in other arrangements it may be possible to mount the support bars to a sidewall, ceiling or floor of the cabinet unit 5500. Also, in the example of FIGS. 29A and 29B, the support bars 5520 are shown as extending along a length of the inner surface of the cabinet 5500. However, in other cases, the support bars may run vertically, or in any other direction. The support bars 5520 may be stacked so as to form an array. In the case of FIGS. 29A and 29B, the support bars 5520 run horizontally, so the stacking is in a vertical arrangement.

Each bar 5520 may include a plurality of apertures 5525. The apertures 5525 may be arranged in series along a length of the support bar 5520 at fixed intervals in order to facilitate equal spacing of the cables. Each aperture 5525 may be configured to support an extension portion 5530 extending therefrom and outward from the support bar 5520 and the inner surface of the cabinet unit 5500. Each extension portion 5530 may support a separate port of the patch panel array to connect two cables—one from in front and one from in back—within the housing, as shown in FIGS. 29A and 29B.

The support bars 5220 shown in FIGS. 29A and 29B are generally flat. However, in other case, support bars may be angled. For example, a support bar may form a right angle, whereby the fold in the support bar runs along the length the support bar. One leg of the right angle may then be mounted to the inner surface of the housing, while the other leg of the right angle may extend outward from the inner surface. The angled or bracket-shaped support bar may be arranged to partially support weight of the extension portions coupled to the apertures of the support bar.

The extension portion 5530 is illustrated in greater detail in FIG. 29B. As shown in FIG. 29B, the extension portion may be a bar 5535 extending outward from the aperture 5525 having a length and a width sufficient to support a connector 5540 for connecting two cables. In the example of FIG. 29B, a width of the bar 5535 is approximately equal to that of the width of the connector 5540 and adaptors 5542, 5544, and a length of the bar 5535 may be equal or greater than a length of the connector 5540 and one adapter 5544 positioned between the connector 5540 and the inner surface of the cabinet unit 5500. In other examples, the bar 5535 may extend outward to support both cables 5542, 5544.

The extension portion 5530 may be hingedly connected to the support bar 5520 such that the extension portion 5530 may be a rotatably fixable section of the array that may pivot side-to-side around the point of connection at the aperture 5525. Pivoting the extension portions laterally may allow for additional clearance to be made between laterally adjacent pairs of extension portions. For example, in FIG. 29B, an increased clearance is shown between a single extension portion 5550 and the adjacent extension portions. The clearance is created in two ways. Firstly, for the extension portions positioned on the same support bar as the single extension portion 5550, extension portions to the left are pushed further to the left and extension portions to the right are pushed further to the right, in order to create clearance on the sides of the single extension portion 5550. Secondly, extension portions one or more rows above and below the single extension portion 5550 are also pushed to the left and right in order to create clearance above and below the single extension portion 5550.

The arrangement of FIGS. 29A and 29B provides an increase in clearance for accessing the connector 5540 and both adapters 5542, 5444 of the port supported by the single extension portion 5550. The same clearance can be created for any other ports of the array 5510. Furthermore, the clearance for a port can be created without affecting connectivity of any of the other ports.

The arrangement of FIGS. 29A and 29B does not require any sliding tray or any mechanism for sliding or rotating the support bars towards a front of the cabinet unit. This simplifies the materials needed for assembly, as well as the assembly process for constructing the array 5510. Furthermore, the amount of clearance created with this arrangement allows for a higher density of cables to be included in the array, as compared to other arrangements.

In the above example of FIGS. 29A and 29B, the extension portions are hingedly coupled to support bars. However, in other examples, extension portions may be directly and individually mounted to the inner surface of the cabinet unit housing. This may be particularly beneficial in those cases where a support bar would take up unwanted space within the cabinet unit. Conversely, in other examples, the support bars may be provided with additional thickness. This may be particularly beneficial in those cases where a cabinet unit housing is relatively deep, and the thickness of the support bar may advance the extension members mounted to a back wall of the housing closer to an opening at the front of the housing.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical fiber distribution system comprising:
a housing having at least one main cabinet unit and at least one hanging element configured to engage a strand to suspend the housing from the strand;
a door coupled to the at least one main cabinet unit and having a closed condition in which an inside of the at least one main cabinet unit is substantially unexposed, and an open condition in which the inside of the at least one main cabinet unit is exposed;

a plurality of cassettes positioned within the at least one main cabinet unit in a stacked arrangement, wherein each cassette is positioned along a respective plane; and a cassette support inside the at least one main cabinet unit and coupled to the at least one main cabinet unit, the cassette support extending along a first support axis transverse to the respective planes of the plurality of cassettes;

wherein the plurality of cassettes is rotatably coupled to the cassette support so that, when the door is in the open condition, each of the plurality of cassettes is individually rotatable within its respective plane about the first support axis to a position at least partially outside of the at least one main cabinet unit.

2. The system of claim 1, further comprising:
a sealing member configured to create a seal between the door and the at least one main cabinet unit by interfacing with a surface of the door and a surface of the at least one main cabinet unit when the door is in the closed condition.

3. The system of claim 1, wherein the housing is tubular with a transverse cross-section that is generally oval-shaped or generally circular.

4. The system of claim 3, wherein the plurality of cassettes includes a plurality of patch panel cassettes and at least one storage cassette.

5. The system of claim 1, wherein the plurality of cassettes includes a plurality of adapters for receiving cables therein, each of the adapters configured to extend along an adapter axis that is obliquely angled with respect to a longitudinal center axis of the housing when the plurality of patch panel cassettes is within the inside of the main cabinet unit and the door is in the closed condition.

6. The system of claim 5, wherein the plurality of adapters is pivotably coupled to trays of corresponding patch panel cassettes.

7. The system of claim 6, further comprising, for a given tray of a corresponding cassette:
a plurality of extension members, each adapter coupled to the tray mounted to a respective extension member, each extension member having a fixed end hingedly coupled to the tray, wherein the fixed ends of the plurality of extension members are aligned along a width of the tray;
a guide bar coupled to each of the extension members and configured to translate in a width direction of the tray, wherein translation of the guide bar causes each extension member to pivot about its respective fixed end,
wherein the plurality of extension members has a storage condition in which the adapters do not extend over an edge of the tray, and an access condition in which the adapters extend over the edge of the tray.

8. The system of claim 3, wherein the main cabinet unit includes a plurality of splitters positioned therein, each of the splitters extending along a splitter axis between a front face and a rear face.

9. The system of claim 8, wherein the splitter axis is obliquely angled relative to a longitudinal center axis of the housing.

10. The system of claim 9, wherein the splitters are positioned transversely adjacent to the plurality of cassettes and the cassette support.

11. The system of claim 1, wherein the door includes an interior surface that confronts the inside of the at least one main cabinet unit when the door is in the closed condition, the interior surface of the door including a cable guide configured to support cables thereon.

12. The system of claim 11, wherein the main cabinet unit includes a plurality of splitters positioned therein, the splitters being positioned transversely adjacent to the plurality of cassettes and the cassette support, and wherein the cable guide is configured to support cables extending from each of the plurality of cassettes and the splitters.

13. The system of claim 12, wherein the interior surface of the door includes a plurality of cable guides aligned longitudinally and in parallel to one another, a first one of the cable guides adapted to receive a cable from the splitters, and a second one of the cable guides adapted to receive a cable from the plurality of cassettes.

14. The system of claim 1, wherein the cassette support includes a plurality of cylindrical members spaced apart from one another along the first support axis, and each of the cassettes includes a tray having an arcuate recess configured to receive a corresponding one of the cylindrical members therein.

15. The system of claim 14, wherein the cassette support includes a plurality of intermediate members spaced apart from one another along the first support axis, each of the cylindrical members being positioned between a pair of adjacent intermediate members, the intermediate members having a diameter that is larger than a diameter of the cylindrical members.

16. The system of claim 1, wherein the cassette support includes a cylindrical bar member extending along the first support axis, and a plurality of platforms rotatably coupled to the cylindrical bar at spaced apart locations along the first support axis, each of the platforms including a cylindrical member extending along a second support axis parallel to the first support axis and spaced apart from the first support axis.

17. The system of claim 16, wherein each of the cassettes includes a tray having an arcuate recess configured to receive a corresponding one of the cylindrical members therein so that each of the cassettes is rotatable about both the first and second support axes.

18. The system of claim 17, wherein each of the cylindrical members terminates in an enlarged member having a diameter that is greater than a diameter of the cylindrical member.

19. The system of claim 1, wherein the at least one main cabinet unit includes a main body portion that is substantially "C"-shaped in transverse cross-section, and the door is substantially "C"-shaped in transverse cross-section.

20. The system of claim 19, wherein a first end of the door is hingedly coupled to a first end of the main body portion, and a second end of the door is adapted to be fastened to a second end of the main body portion.

21. The system of claim 20, wherein in the open condition of the door, substantially an entire height dimension of the main body portion extending from the first end of the main body portion and the second end of the main body portion is exposed.

22. A main cabinet unit for use in an optical fiber distribution system, the main cabinet unit comprising:
a door coupled to the main cabinet unit and having a closed condition in which an inside of the main cabinet unit is substantially unexposed, and an open condition in which the inside of the main cabinet unit is exposed;
a plurality of cassettes positioned within the main cabinet unit in a stacked arrangement, the plurality of cassettes being moveable relative to the main cabinet unit so that, when the door is in the open condition, each of the plurality of cassettes is individually moveable to a position at least partially outside of the main cabinet unit;

a first terminal end having a first configuration; and a second terminal end having a second configuration adapted to mate with a structure having a shape and size corresponding to the first configuration, wherein the first and second terminal ends of the main cabinet unit are at opposite ends of the main cabinet unit along a longitudinal axis of the main cabinet unit, and wherein the main cabinet unit is tubular with a cross-section that is generally oval-shaped or generally circular along a plane transverse to the longitudinal axis.

23. The main cabinet unit of claim 22, wherein the first terminal end includes a peripheral edge having a plurality of arcuate projections and an arcuate first recess positioned between each pair of adjacent ones of the projections, and the second terminal end includes a peripheral rim coupled to an outer surface of a main body of the main cabinet unit by a plurality of ribs, each rib extending substantially orthogonally to the main body and being spaced apart along a circumference of the main body to form a second recess positioned between each pair of adjacent ribs, each of the second recesses having a shape and size that corresponds to a shape and size of each of the projections.

24. The main cabinet unit of claim 22, wherein the first terminal end includes a continuous peripheral edge having a diameter that is larger than a diameter of a main body of the main cabinet unit, and the second terminal end includes a continuous circumferential rib forming a continuous circumferential recess, the continuous peripheral edge having a size and shape corresponding to a size and shape of the continuous circumferential recess.

25. An optical fiber distribution system comprising:

a first main cabinet unit according to claim 22; and a second main cabinet unit according to claim 22, wherein the first terminal end of the first main cabinet unit is directly coupled to the second main cabinet unit so that a first central longitudinal axis of the first main cabinet unit substantially coincides with a second central longitudinal axis of the second main cabinet unit.

26. The optical fiber distribution system of claim 25, wherein the first main cabinet unit contains a plurality of cassettes, wherein the second main cabinet unit contains a plurality of splitters, and wherein an aperture between the first and second main cabinet units is configured for routing of cables between the plurality of cassettes and the plurality of splitters.

27. The main cabinet unit of claim 22, wherein a first end of the door is hingedly coupled to a first end of the main cabinet unit, and a second end of the door is adapted to be fastened to a second end of the main cabinet unit, the main cabinet unit further comprising:

a protrusion extending from one of the first end or the second end;

a recess formed in an opposite one of the first end or the second end, wherein the protrusion is adapted to engage the recess to form a seal;

a latch hingedly coupled to an outer surface of the main cabinet unit in proximity to an edge of the door; and a groove formed in the outer surface of the main cabinet unit and adapted to receive a free end of the latch, wherein the latch is configured to lock the door in the closed condition when the free end is engaged to the groove.

28. The main cabinet unit of claim 27, wherein the protrusion includes a tapered lower portion extending from the first end or second end, and a not-tapered upper portion extending from the lower portion, and wherein the recess includes a tapered shallow portion, and a not-tapered deep portion formed in the shallow portion, wherein the tapered portion of the protrusion is adapted to fit into the tapered portion of the recess, and wherein the not-tapered portion of the protrusion is adapted to fit into the not-tapered portion of the recess.

29. The main cabinet unit of claim 28, wherein a height of the not-tapered portion of the protrusion is less than a depth of the not-tapered portion of the recess, and wherein the main cabinet unit further comprises an O-ring positioned in the not-tapered portion of the recess.

* * * * *